United States Patent
Altheimer et al.

(10) Patent No.: US 8,888,280 B2
(45) Date of Patent: Nov. 18, 2014

(54) AUTOMATIC MODIFICATION OF A PROGRESSIVE LENS DESIGN

(75) Inventors: Helmut Altheimer, Baisweil-Lauchdorf (DE); Wolfgang Becken, Munich (DE); Gregor Esser, Munich (DE); Dietmar Uttenweiler, Icking (DE); Andrea Welk, Munich (DE)

(73) Assignee: Rodenstock GmbH, Munich (DE)

( * ) Notice: Subject to any disclaimer, the term of this patent is extended or adjusted under 35 U.S.C. 154(b) by 749 days.

(21) Appl. No.: 13/145,495

(22) PCT Filed: Dec. 9, 2009

(86) PCT No.: PCT/EP2009/008812
§ 371 (c)(1),
(2), (4) Date: Sep. 22, 2011

(87) PCT Pub. No.: WO2010/083860
PCT Pub. Date: Jul. 29, 2010

(65) Prior Publication Data
US 2012/0016645 A1    Jan. 19, 2012

(30) Foreign Application Priority Data

Jan. 20, 2009    (DE) .................. 10 2009 005 214

(51) Int. Cl.
G02C 3/00    (2006.01)
G02C 7/00    (2006.01)
G02C 7/02    (2006.01)

(52) U.S. Cl.
CPC ............... *C02C 7/063* (2013.01); *G02C 7/025* (2013.01); *G02C 7/028* (2013.01)
USPC ...................... 351/159.75; 703/2

(58) Field of Classification Search
CPC ........ G02C 7/043; G02C 7/048; G02C 7/028; G02C 7/06; G02C 7/061; G02C 7/02; G02C 7/04; G06F 17/5004; G06F 17/5018; G06F 17/5036; G06F 17/50
USPC ........... 703/1, 2; 351/159.07, 159.22, 159.46, 351/159.52, 159.74, 159.75, 159.73
See application file for complete search history.

(56) References Cited

U.S. PATENT DOCUMENTS 6,597,368 B1    7/2003    Arai et al.
2003/0048410 A1    3/2003    Baumbach et al.
(Continued)

FOREIGN PATENT DOCUMENTS

EP    0880046 A1    11/1998
JP    2001-076177    3/2001
(Continued)

OTHER PUBLICATIONS

Japanese Patent Application No. 2011-545633 Office Action dated Sep. 27, 2013 (with English translation).

*Primary Examiner* — James Greece
(74) *Attorney, Agent, or Firm* — Schiff Hardin LLP

(57) ABSTRACT

A method and apparatus for creating a progressive spectacle lens design by transforming a starting design. The starting design is defined to include specifications for the course of a principal line and specification of at least one base target isoastigmatism line with a constant base target astigmatism, in which the base target isoastigmatism line passes through a first predetermined control point $\vec{r}_1=(u_1,y_1)$. The method and apparatus transform the starting design by shifting the first control point $\vec{r}_1=(u_1,y_1)$ along a predetermined or predeterminable curve, taking into account the design and/or the spectacle lens wearer-specific data; modifying the course of the base target isoastigmatism line such that it passes through the shifted first control point $\vec{r}'_1=(u'_1,y'_1)$; and calculating a target astigmatism distribution A(u,y), which exhibits the modified base target isoastigmatism line. Furthermore, the method and apparatus are provided to create the spectacle lens on the basis of the progressive spectacle lens design.

22 Claims, 41 Drawing Sheets

(56) References Cited

U.S. PATENT DOCUMENTS

| | | | |
|---|---|---|---|
| 2005/0270482 A1* | 12/2005 | Fisher et al. | 351/177 |
| 2006/0050236 A1 | 3/2006 | Menezes | |
| 2010/0296055 A1 | 11/2010 | Esser et al. | |

FOREIGN PATENT DOCUMENTS

| | | |
|---|---|---|
| JP | 2005-308490 | 11/2005 |
| JP | 2006-506667 | 2/2006 |
| WO | WO-01/57584 A2 | 8/2001 |
| WO | WO-2004/086125 A1 | 10/2004 |
| WO | WO-2007/004070 A1 | 1/2007 |
| WO | WO 2007/010806 | 1/2007 |
| WO | WO-2008/089995 A1 | 7/2008 |
| WO | WO-2008/089996 A1 | 7/2008 |
| WO | WO-2008/089998 A1 | 7/2008 |
| WO | WO 2008/089999 | 7/2008 |

* cited by examiner

| Adapt local weighting | |
|---|---|
| Weighting=1/targetAst**P, power = | 0.05000000 |
| Weighting=1/targetAst**P, AstMin = | 0.05000000 |
| Weighting=1/targetAst**P, AstMax = | 1.00000000 |
| Additonal weighting HL = | 0.00000000 |
| Additional weighting BN = | 0.00000000 |
| Additonal weighting distance portion | 0.00000000 |
| Change full width at half maximum DP | 0.00000000 |
| Additonal weighting near portion | 0.00000000 |
| Change full width at half maximum NP | 0.00000000 |

O.K    Cancel

Fig. 11 mean refractive power S0
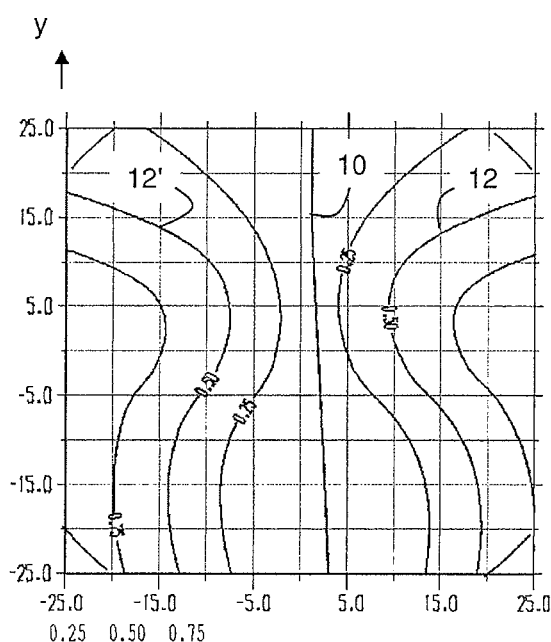
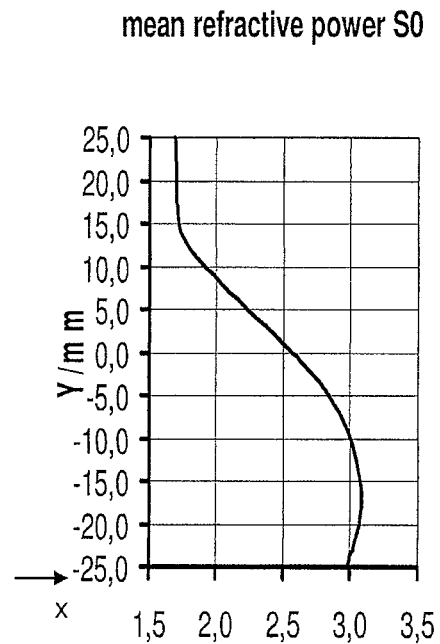
Fig. 12a-1    Fig. 12a-2
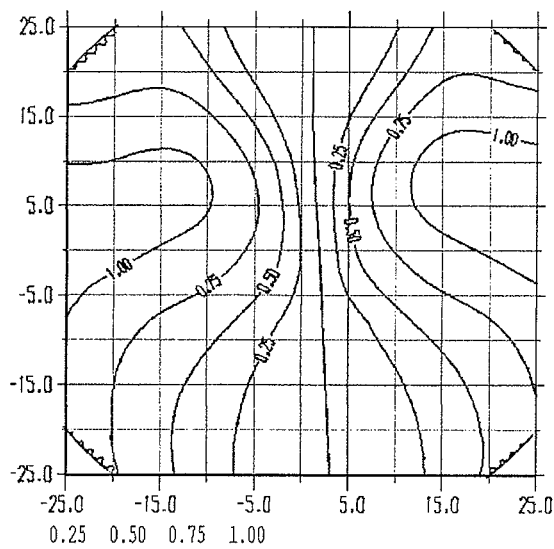
Fig. 12a-3 mean refractive power S0
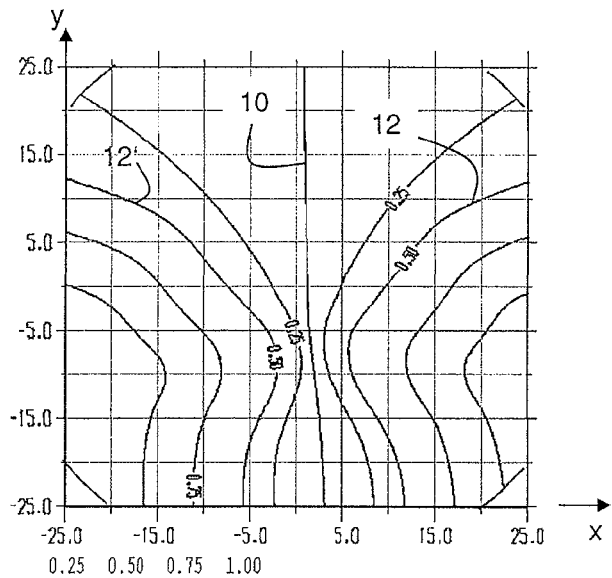
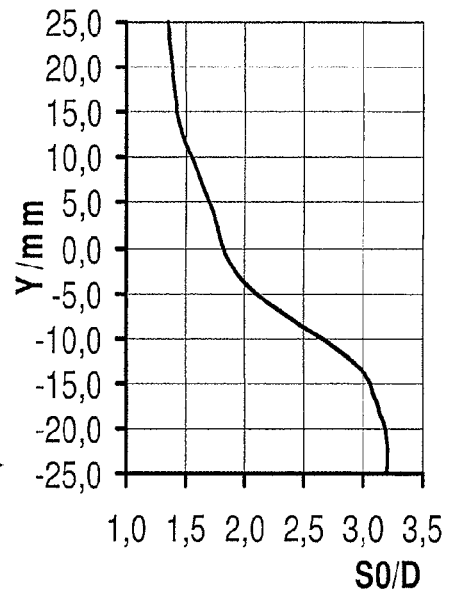
Fig. 12b-1    Fig. 12b-2
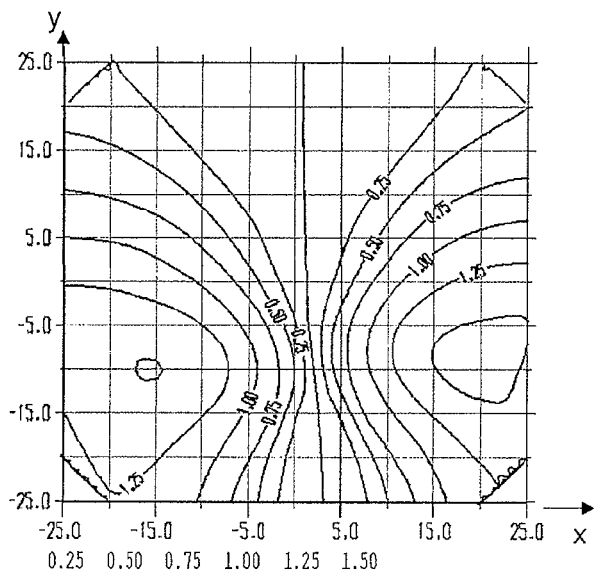
Fig. 12b-3

Spline of the asti=0.5-isoline around the progression channel

|  | temporal | nasal |
|---|---|---|
| ymax distance portion | -4.00000 | -4.00000 |
| ymin near portion | -10.00000 | -10.00000 |
| y step width | 1.00000 | 1.00000 |
| delta (u shift) | 0.10000 | 0.10000 |

Input specifications for spline
Specifications from actual values

○ Pos. of wear value
□   ○ Pseudo Minkwitz
○ Minkwitz dS0(y)/dy
⊙ Minkwitz d(A1-Akk

Distance portion isolines (0.25/0.50 D):
⊙ Polyn.   ○ Arctan   ○ „Both"

Symmetry of asti specific.
○ Nas =! Temp  ○ Tem

58

Representation in outer region:
⊙ Standard   ○ Truncated cone   ○

Transition
⊙ linear u05 central acc. to Minkwitz, other model: u05 = u + k * g(dA/du) * (uMink - u)
☑ active     min increase dA/du: 0.0100    k= 1.00

60

General specifications:           Temporal       Nas

Fig. 14b

| @@@ points | temporal | | | near portion | | nasal | | |
|---|---|---|---|---|---|---|---|---|
| | u | y | a | row 0.50 D | u | y | | a |
| | 5.00000 | -20.00000 | mm | 3.50000 | -5.00000 | -20.00000 | mm | -3.50000 |

| | temporal | distance port. | | nasal | | | |
|---|---|---|---|---|---|---|---|
| | u | y | arctan 0.25 dpt | u | y | | Solution with: |
| | 10.00000 | 9.00000 | mm | -10.00000 | 9.00000 | | ⦿ Least Squares |
| | 17.00000 | 14.00000 | mm | -17.00000 | 14.00000 | | ○ Netwon scheme |
| y limit 23: | 1.00000 | | y limit 23: | 1.00000 | | | |

| | | arctan 0.50 dpt | | |
|---|---|---|---|---|
| 10.00000 | 6.00000 | mm | -10.00000 | 6.00000 |
| 22.00000 | 9.00000 | mm | -22.00000 | 9.00000 |

| Design no. | Design triangle | Control points | | | | | |
|---|---|---|---|---|---|---|---|
| Distance zone | | uP1 | yP1 | uP | yP | uP2 | yP2 |
| 0.25 – inward | | -2.00 | 3.00 | -2.50 | 5.00 | -3.00 | 7.00 |
| 0.25 - outward | | 0.00 | -3.00 | 1.50 | -4.00 | 3.00 | -5.00 |
| 0.5 – inward | | -1.00 | 2.00 | -1.75 | 4.50 | -2.50 | 7.00 |
| 0.5 - outward | | 1.00 | -2.00 | 1.75 | -3.00 | 2.50 | -4.00 |
| Near zone | | | | | | | |
| delta(u) for 0.5 D asti line: | | | | fact inw. | 0.67 | fact outw. | 1.50 |

| | | | | near portion | | | nasal | | |
|---|---|---|---|---|---|---|---|---|---|
| @@@ points | temporal | | | | | | | | |
| u | y | a | | row 0.50 D | u | y | a | | |
| 12.50000 | -20.00000 | mm | 3.50000 | | -12.50000 | -20.00000 | mm | -3.50000 | |

| | temporal | distance port. | | nasal | | | |
|---|---|---|---|---|---|---|---|
| u | y | arctan 0.25 dpt | u | y | | Solution with: | |
| 8.00000 | 12.00000 | mm | -8.00000 | 12.00000 | | ⊙ Least Squares | |
| 14.00000 | 21.00000 | mm | -14.00000 | 21.00000 | | ○ Netwon scheme | |
| y limit 23: | 1.00000 | | y limit 23: | 1.00000 | | | |

| | arctan 0.50 dpt | | | |
|---|---|---|---|---|
| 9.00000 | 8.00000 | mm | -9.00000 | 8.00000 |
| 19.50000 | 16.00000 | mm | -19.50000 | 16.00000 |

| @@@ points | temporal | | | near portion | | nasal | | |
|---|---|---|---|---|---|---|---|---|
| u | y | a | row 0.50 D | u | y | a | | |
| 2.99900 | -20.00000 | mm | 3.50000 | -2.99900 | -20.00000 | mm | -3.50000 | |

| | temporal | distance port. | | nasal | | | |
|---|---|---|---|---|---|---|---|
| u | y | arctan 0.25 dpt | u | y | | Solution with: | |
| 10.00000 | 7.80000 | mm | -10.00000 | 7.80000 | | ⦿ Least Squares | |
| 18.20000 | 12.00000 | mm | -18.20000 | 12.00000 | | ○ Netwon scheme | |
| y limit 23: | 1.00000 | | y limit 23: | 1.00000 | | | |

| | arctan 0.50 dpt | | | |
|---|---|---|---|---|
| 10.40000 | 5.20000 | mm | -10.40000 | 5.20000 |
| 23.00000 | 7.40000 | mm | -23.00000 | 7.40000 |

| @@@ points | temporal | | | near portion | | nasal | | |
|---|---|---|---|---|---|---|---|---|
| u | y | a | row 0.50 D | u | y | | a | |
| 2.99900 | -20.00000 | mm | 3.50000 | -2.99900 | -20.00000 | mm | -3.50000 | |

| | temporal | | | distance portion | | nasal | | |
|---|---|---|---|---|---|---|---|---|
| u | y | exp | polynomial 0.25 D | u | y | | exp | |
| 15.00000 | 7.50000 | mm | 2.00000 | -15.00000 | 7.50000 | mm | 2.00000 | 74 |
| y limit 23: | 1.00000 | mm | | y limit 23: | 1.00000 | mm | | |

| | temporal | | | | | nasal | | |
|---|---|---|---|---|---|---|---|---|
| u | y | exp | polynomial 0.50 D | u | y | | exp | |
| 17.75000 | 4.50000 | | 2.00000 | -17.75000 | 4.50000 | | 2.00000 | |

Fig. 22

| | temporal | | | near portion | | nasal | | |
|---|---|---|---|---|---|---|---|---|
| @@@ points | | | | | | | | |
| u | y | a | row 0.50 D | u | y | a | | |
| 2.33200 | -20.00000 mm | 3.50000 | | -2.33200 | -20.00000 mm | -3.50000 | | |

| | temporal | | | distance portion | | nasal | | |
|---|---|---|---|---|---|---|---|---|
| u | y | exp | polynomial 0.25 D | u | y | exp | | |
| 15.00000 | 7.50000 mm | 2.00000 | | -15.00000 | 7.50000 mm | 2.00000 | | |
| y limit 23: | 1.00000 mm | | | y limit 23: | 1.00000 mm | | | |

| | temporal | | | | | nasal | | |
|---|---|---|---|---|---|---|---|---|
| u | y | exp | polynomial 0.50 D | u | y | exp | | |
| 17.75000 | 4.50000 | 2.00000 | | -17.75000 | 4.50000 | 2.00000 | | |

AUTOMATIC MODIFICATION OF A PROGRESSIVE LENS DESIGN

The disclosure herein relates to a method for calculating a progressive spectacle lens design, a method for producing a progressive spectacle lens, corresponding apparatuses for calculating a progressive spectacle lens design and for producing a progressive spectacle lens, corresponding computer program products and storage media, as well as a use of a spectacle lens.

BACKGROUND

The calculation and optimization of progressive spectacle lenses in the respective position of wear and situation of wear has achieved a high technical and optical standard since. For example, according to the prior art, progressive spectacle lenses can be optimized and calculated as one-of-a-kind online after receipt of order, taking into account the individual prescription (sph, cyl, axis, add, prism, base) and the individual positions or arrangements of the lenses in front of the spectacle wearer's eye (e.g. corneal vertex distance (CVD), face form angle (FFA), forward inclination or pantoscopic angle), as well as physiological parameters (e.g. pupillary distance). As a rule though, a customer may only choose from few (usually 2) spectacle lens designs, which only differ by the progression length.

Moreover, according to the prior art, own or individual target values (designs) are created and deposited for each design to be newly developed and also particularly for each progression zone length. For example, in addition to the universal progressive lenses, designs are also developed for various special progressive lenses, which often only differ with respect to the main visual tasks and thus with respect to the principal directions of sight in the near and distance zones. Therefore, WO 2001/057584 suggests specifying the design for different applications (driver, pilot, watchmaker, etc.) right away. Despite this very complex procedure concerning design creation and also concerning the logistics of the many different designs with the manufacturer and also the necessary product training courses with the optician, it is often not possible to satisfactorily react to individual situations of wear with these standard designs.

SUMMARY

The disclosure herein provides a fast, efficient, and flexible method for calculating a spectacle lens design and a method for producing a spectacle lens according to the calculated spectacle lens design. Moreover, a corresponding apparatus is provided for producing a spectacle lens and corresponding computer program products and storage media. Further, a method for calculating a spectacle lens design is disclosed herein, in which the spectacle lens design is tailored to the (individual) preferences, main focuses of use, frame data, as well as other (individual) data of the spectacle wearer in an improved way.

BRIEF DESCRIPTION OF THE DRAWINGS

In the following, the disclosure herein will be exemplarily described with reference to the figures, which show:

FIGS. 4a and 4b provides an example of a scaling of the target astigmatism values by multiplication by a scaling factor, in which FIG. 4a illustrates the original target astigmatism distribution and FIG. 4b illustrates the scaled target astigmatism distribution;

FIG. 5 provides another example of a scaling of the target astigmatism values by multiplication by a scaling factor, in which

FIG. 7c illustrates a three-dimensional representation of the scaling factor $s(u,y)$ shown in FIG. 7a;

FIG. 8c illustrates a three-dimensional representation of the scaling factor $s(u,y)$ shown in FIG. 8a;

FIG. 11 illustrates an example of a graphical user interface for inputting and changing the local weightings;

FIGS. 12a-1, 12a-2 and 12a-3 provide an example of a first derived design and a corresponding progressive spectacle lens, in which FIG. 12a-1 illustrate the target astigmatism distribution, FIG. 12a-2 illustrate the refractive power course along the principal line, and FIG. 12a-3 illustrates an actual astigmatism distribution (in the position of wear) of a progressive spectacle lens calculated or optimized on the basis of the target astigmatism distribution shown in FIG. 12a-1;

FIGS. 12b-1, 12b-2 and 12b-3 provides an example of a first derived design and a corresponding progressive spectacle lens, in which FIG. 12b-1 illustrates a target astigmatism distribution, FIG. 12b-2 illustrates a refractive power course along the principal line, and FIG. 12b-3 illustrates an actual astigmatism distribution (in the position of wear) of a progressive spectacle lens calculated or optimized on the basis of the target astigmatism distribution shown in FIG. 12b-1;

FIGS. 14a and 14b provide examples of graphical user interfaces for inputting the parameters of the base target isoastigmatism line;

FIG. 16a provides an example of a graphical user interface for inputting and changing the control points with input parameters of a starting design;

FIG. 16b provides an example of a graphical user interface for inputting and changing the maximum variation of the control points of the starting design;

FIG. 17b illustrates target astigmatism distribution of the starting design illustrated in FIG. 17a;

FIG. 18 provides example of a graphical user interface for inputting and changing the control points with input parameters of a first transformed design;

FIG. 19b illustrates a target astigmatism distribution of the transformed design illustrated in FIG. 19a;

FIG. 20 provides an example of a graphical user interface for inputting and changing the control points with input parameters of a second transformed design;

FIG. 21b illustrates a target astigmatism distribution of the transformed design illustrated in FIG. 21a;

FIG. 22 provides an example of a graphical user interface for inputting and changing the control points with input parameters of a third transformed design;

FIG. 23b illustrates a target astigmatism distribution of the transformed design illustrated in FIG. 23a;

FIG. 24 provides an example of a graphical user interface for inputting and changing the control points with input parameters of a fourth transformed design;

FIG. 25b illustrates target astigmatism distribution of the transformed design illustrated in FIG. 25a;

FIG. 26 provides an example of a graphical user interface for obtaining customer preferences;

DETAILED DESCRIPTION

Figure 1:
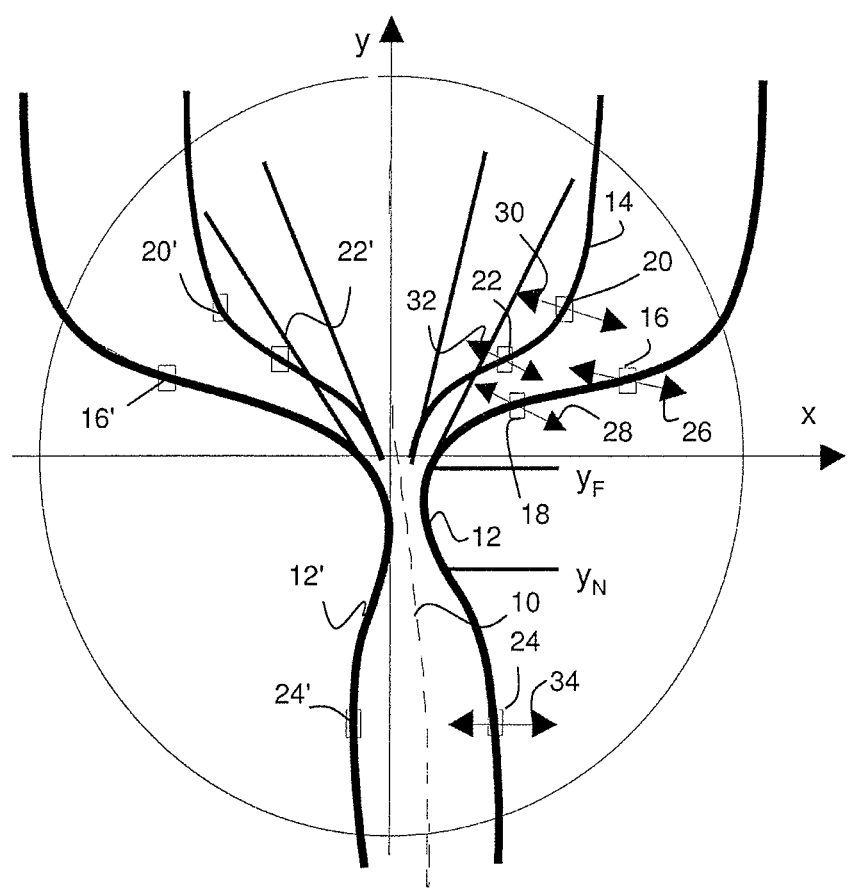
FIG. 1 illustrates an example of a design with arctangent representation of the base target isoastigmatism line in the distance portion or zone.

According to the disclosure herein, a computer-implemented method for creating or calculating a progressive spectacle lens design, in particular an individual progressive spectacle lens design, by a transformation of a starting design is provided, the method comprising the following steps:

defining a starting design, comprising:
  specifications for the course of a principal line HL; and
  specification of at least one base target isoastigmatism line $I_G$ with a constant base target astigmatism $A_G$=const, wherein the base target isoastigmatism line $I_G$ passes through at least a first predetermined control point $\vec{r}_1 = (u_1, y_1)$;

transforming the starting design, comprising:
  shifting the first control point $\vec{r}_1(u_1, y_1) \to \vec{r}'_1(u'_1, y'_1)$ along a predetermined or predeterminable curve, wherein shifting of the first control point $\vec{r}_1 = (u_1, y_1)$ is performed taking design and/or spectacle lens wearer-specific data into account;
  modifying $I_G \to I'_G$ the course of the base target isoastigmatism line $I_G$ such that it passes through the shifted first control point) $\vec{r}'_1(u'_1, y'_1)$, and
  creating or calculating a target astigmatism distribution A(u,y), which exhibits the modified base target isoastigmatism line $I'_G$, wherein:
x designates the horizontal coordinate;
y designates the vertical coordinate;
u designates the horizontal distance of a point (x,y) from the principal line; and
A(u,y) designates the target astigmatism distribution of the transformed starting design.

The optimization of progressive spectacle lenses usually takes place by minimizing a target function in which desired or target values for at least one optical parameter (e.g. astigmatism and/or refractive power) or desired or target values for at least one aberration (e.g. astigmatic error or astigmatic deviation and/or refractive error) of the progressive spectacle lens are taken into account. The refractive error is the difference of the refractive power of the spectacle lens from the refractive power determined by a refraction determination. The astigmatic deviation or the astigmatic error is the difference of the astigmatism of the spectacle lens from the astigmatism determined by a refraction determination. Preferably, these are values in the position of wear of the spectacle lens, i.e. taking the system spectacle lens/eye into account.

The desired or target values of the at least one optical property (in particular the astigmatism) or the at least one aberration (in particular the astigmatic deviation), are taken into account in the target function, characterize the design of a spectacle lens. Target astigmatism values A as defined by this application are in particular understood to be the target values of the astigmatic deviation $Ast_{t\ arg\ et}$, or the target values for the astigmatism of the spectacle lens (surface astigmatism or astigmatism in the position of wear).

For example, a design-based optimization of a progressive spectacle lens can be performed by minimizing a target function of the form:

$$F(\vec{x}) = \sum_{i=1}^{m} [g_{i,\Delta R}(\Delta R_i - \Delta_{i,target})^2 + g_{i,Ast}(Ast_i - Ast_{i,target})^2 + \ldots]$$

In the above formula:

$\Delta R_{i,t\ arg\ et}$ is the target value of the local refractive error at the $i^{th}$ evaluation point;

$\Delta R_i$ is the actual local refractive error at the $i^{th}$ evaluation point;

$Ast_{i,t\ arg\ et}$ is the target value of the local astigmatic deviation or the local astigmatic error at the $i^{th}$ evaluation point;

$Ast_i$ is the actual local astigmatic deviation or the actual local astigmatic error at the $i^{th}$ evaluation point;

$g_{i,\Delta R}$ is the local weighting of the refractive error at the $i^{th}$ evaluation point;

$g_{i,Ast}$ is the local weighting of the astigmatic deviation or the astigmatic error at the $i^{th}$ evaluation point.

The spatial distributions of the aberrations $\Delta R_i$ and $\Delta R_{i,t\ arg\ et}$, and $Ast_i$ and $Ast_{i,t\ arg\ et}$ can be indicated in the form $\Delta R(x,y)$, $\Delta R_{t\ arg\ et}(x,y)$ and $Ast(x,y)$ and $Ast_{t\ arg\ et}(x,y)$, respectively.

Here, the coordinate system e.g. relates to a coordinate system in the (object-side or eye-side) to-be-optimized surface of the spectacle lens, wherein the origin of the coordinate e.g. coincides with the geometric center of the (raw-round) spectacle lens or with the centration or fitting point of the spectacle lens. The vertical ("y") and horizontal ("x") axes lie in the tangential plane with respect to the respective (eye-side or object-side) surface of the spectacle lens in the geometric center or the centration or fitting point. The vertical direction preferably relates to the vertical direction in the position of wear of the spectacle lens, wherein the spectacle lens is for example disposed in an average position of wear (as is defined e.g. in DIN 58 208 part 2) or in an individual position of wear. Preferably, the spectacle lens is disposed in an individual position of wear. Of course, it is possible to indicate the spatial distribution of the aberrations in other suitable coordinate systems.

In particular, it is preferred to indicate the optimization values in the coordinate system of the surface to be optimized with respect to the principal line (wherein u=0 holds on the principal line), and not with respect to the y axis (x=0), i.e. in the form $\Delta R(u,y)$, $\Delta R_{t\ arg\ et}(u,y)$, $Ast(u,y)$ and $Ast_{t\ arg\ et}(u,y)$. If the target values or the optimization target values are specified with respect to the principal line, it is sufficient, when the position of wear of the spectacle lens to be taken into account is varied, in particular when the pupillary distance, the corneal vertex distance, the forward inclination, the object distance model, etc. are varied, to merely match the principal line to the varied principal line of sight. The target values or the optimization target values are then adjusted automatically.

The spatial distribution of the target values of the aberrations (in particular the astigmatic deviation $Ast_{i,t\ arg\ et}$ or $Ast_{t\ arg\ et}(x,y)$ or $Ast_{t\ arg\ et}(u,y)$) across the spectacle lens, which are taken into account as target values in the optimization of the spectacle lens, and optionally their local weightings ($g_{i,A}$, $g_{i,\Delta R}$) characterize the design of a progressive spectacle lens. Stated differently, the design of a spectacle lens usually comprises the distribution of the target values for one or more aberrations (in particular the astigmatic deviation $Ast_{i,t\ arg\ et}$ or $Ast_{t\ arg\ et}(x,y)$ or $Ast_{t\ arg\ et}(u,y)$), which are taken into account as target values in the optimization of the spectacle lens.

Here, in particular the principal line and the spatial distribution of the target values $Ast_{i,t\ arg\ et}$ or $Ast_{t\ arg\ et}(x,y)$ or $Ast_{t\ arg\ et}(u,y)$ of the astigmatic deviation across the spectacle lens play a central role in the design definition and optimization of progressive spectacle lenses. For example, the classification of the progressive lens design and the assessment of the field of view sizes suitably take place on the basis of the astigmatism distribution. Moreover, a spectacle lens design can also comprise the distribution of the target values for refractive error, magnification error, distortion error or other aberrations. Here, these values can be surface values or preferably wear values, i.e. values in the position of wear of the spectacle lens.

In addition, the spectacle lens design can comprise a suitable object distance model. For example, the object model can comprise an object distance function defined as the reciprocal object distance along the principal line. A standardized object distance model is e.g. indicated in DIN 58 208 part 2 (cf. image 6). However, the object distance model can deviate from this standardized object distance model.

A principal line is understood to be a substantially straight or curved line along which the desired increase of the refractive power of the spectacle lens from the distance to the near portion is achieved. The principal line is substantially centered with respect to the spectacle lens top down, i.e. along a substantially vertical direction. Thus, the principal line constitutes a construction line in the coordinate system of the (object-side or eye-side) to-be-optimized surface for the description of the target values. The course of the principal line of the spectacle lens is selected such that it at least approximately follows the principal line of sight. A method for matching the principal line to the principal line of sight is described in EP 1 277 079, for example, which is hereby incorporated by reference.

A principal line of sight is understood to be the sequence of the penetration points of the main rays through the respective spectacle lens surface when looking at a line lying in the perpendicular plane that splits the distance of the two ocular centers of rotation in half (so-called cyclopean eye plane). The spectacle lens surface may be the object-side or the eye-side surface. The position of the line in the cyclopean eye plane is determined by the selected object distance model.

A progressive spectacle lens design usually comprises a distance, a near and an intermediate or progression zone. The delimitation of the inner zones with good imaging properties against the peripheral zones, in which higher aberrations are allowed, is usually achieved by a stipulated target isoastigmatism line. In eyewear optics, the isoastigmatism line along which the amount of the astigmatism is equal to 0.5 D is mostly used to this end. Preferably, this line is used for the construction of the astigmatism model for the target specifications, as will be described in detail below.

In order to produce progressive spectacle lenses (progressive lenses) with different designs (i.e. with different target specifications for the optical properties of the spectacle lens or for the aberrations, in particular with different target values for the astigmatism or for the astigmatic deviation), the corresponding different design or target specifications have to be created or calculated, and the optimization has to be performed afterward. Consequently, creating or calculating a spectacle lens design as defined by this application comprises calculating or creating the target specifications or target values for the individual aberrations associated with the spectacle lens design, in particular the target specifications for the astigmatic deviation or the target astigmatism.

According to the exemplary embodiment, unlike the usual approach, the new target specifications are derived from deposited, older target specifications. Thus, with the exemplary method, progressive spectacle lens designs (progressive lens designs in short) with different widths of the distance and/or the near viewing zone(s) and/or low or high astigmatism gradient can be directly created from an existing progressive lens design (referred to as starting or basic design hereinafter) with known target specifications. Since all design modifications are derived from the same starting design, the transition is smooth. Thus, an arbitrary number of design variations can be created in order to always meet customer needs in the best possible way.

The design modification is performed by a suitable variation of the optimization target specifications of the starting design, in particular the course of the base target isoastigmatism line.

To this end, first of all a starting design is defined, which comprises
- a specification of a principal line or specifications for the course of a principal line; and
- a specification of at least one base target isoastigmatism line $I_G$ with a constant base target astigmatism $A_G$=const.

In order to be able to better control the course of the base target isoastigmatism line $I_G$, at least a first control point $\vec{r}_1=(u_1,y_1)$ is defined or specified on the base target isoastigmatism line $I_G$.

In particular, to construct the astigmatism specifications or to calculate the target astigmatism distribution across the spectacle lens, at least one base target isoastigmatism line (or its course), preferably one base target isoastigmatism line on the nasal and temporal sides of the spectacle lens each, is indicated. The amount $A_G$ of the base target isoastigmatism line can be selected freely, advantageous amounts being between 0.25 D and 1.0 D, and in particular 0.5 D.

Furthermore, the starting design can comprise specifications for the refractive power course along the principal line and specifications for the target astigmatism values along the principal line HL. Further parameters of the starting design, such as
- the maximally admissible target astigmatism in the periphery of the spectacle lens; and/or
- the maximum target isoastigmatism line; and/or
- the distances of the maximum target isoastigmatism line from the base target isoastigmatism line in the distance and near portions in a predetermined or predeterminable direction can also be specified.

The spatial distribution of the target astigmatism values associated with the starting design can be determined by a suitable interpolation on the basis of the above specifications.

Alternatively, the starting design or the starting specifications can comprise the spatial distribution of the target astigmatism values across at least a part of the to-be-optimized region of the spectacle lens. Thus, the course of the principal line, the target astigmatism values along the principal line, the course of the base target isoastigmatism line, and optionally further parameters associated with the starting design are uniquely determined.

Moreover, the starting design can comprise a starting surface, which is defined by its vertex depths, for example. When the starting surface is specified, the courses of the principal line HL and of the base target isoastigmatism line $I_G$ are uniquely specified as well.

Furthermore, the maximally admissible design modifications can be specified or defined in advance depending on the starting design.

The principal line and the spatial distribution of the target astigmatism values can be indicated and calculated in a suitable Cartesian coordinate system having a horizontal axis x and a vertical axis y, such as the above-described coordinate system, i.e., for example in a coordinate system in the to-be-optimized surface of the spectacle lens, preferably in the eye-side surface of the spectacle lens, the origin of the coordinate system for example coinciding with the geometric center of the (raw-round) spectacle lens or with the centration or fitting point of the spectacle lens. The vertical ("y") and horizontal ("x") axes lie in the tangential plane with respect to the respective (eye-side or object-side, preferably eye-side) to-be-optimized surface of the spectacle lens at the geometric center or the centration or fitting point. The vertical direction preferably relates to the vertical direction in the position of wear of the spectacle lens, wherein the spectacle lens is for example disposed in an average position of wear (as is defined e.g. in DIN 58 208 part 2) or in an individual position of wear. Preferably, the spectacle lens is disposed in an individual position of wear. In this coordinate system $\{x, y\}$, the horizontal coordinate $x_{HL}$ of a point on the principal line $(x_{HL},y)$ can be described by a function of the form $f_u(y)$, i.e. $x_{HL}=f_u(y)$.

However, it has proven advantageous to perform a coordinate transformation $\{x,y\} \rightarrow \{u,y\}$, wherein $x=u+f_u(y)$ and u designates the distance of a point (u,y) from the principal line. In the following, all calculations will be performed in the coordinate system $\{u,y\}$. In the coordinate system $\{u,y\}$, all points on the principal line have coordinates (u=0,y), and all points on the base target isoastigmatism line have coordinates $(u_G(y),y)$.

However, it is of course also possible to perform all calculations in the coordinate system $\{x,y\}$ or in another suitable coordinate system.

The principal line HL and the base target isoastigmatism line $I_G$ can be specified mathematically by a suitable parametric representation. For example, the course of the principal line HL can be described by a one-dimensional, preferably continuous function of the form $f_u(y)$. Put differently, it holds for the points on the principal line HL: $(x_{HL}=f_u(y),y)$. The principal line is defined when the function $f_u(y)$ is specified. Preferably, the course of the principal line is not varied in the transformation of the starting design.

The course of the base target isoastigmatism line $I_G$ can also be described by a one-dimensional function of the form $u_G(y)$. Put differently, it holds for the points on the base target isoastigmatism line $I_G$: $(x_{I_G}(y)=u_G(y),y)$. The base target isoastigmatism line is defined $I_G$ when the function $u_G(y)$ is specified. Preferably, the function $u_G(y)$ is a continuous function. Further preferably, the first derivative of the function $u_G(y)$ is also an at least one time continuously differentiable function.

The base target isoastigmatism line can be described by a number of suitable, one-dimensional, preferably at least one time continuously differentiable functions $u_G(y)$. Surprisingly, it was found that the function $u_G(y)$ can be described already by a few, variable parameters in a suitable way, which significantly simplifies and accelerates the calculation and transformation of the starting design.

In particular, by specifying two vertical coordinates $y_F$ and $y_N$, the base target isoastigmatism line can be divided into different zones, for example a distance, a progression, and a near zone. In the individual zones, the base target isoastigmatism line can be described by different functions $u_G(y)$. Preferably, the individual zones are directly contiguous.

In the progression zone (i.e. when $y_N \leq y \leq y_F$), the course of the base target isoastigmatism line can be specified directly or be calculated e.g. either according to the Minkwitz theorem with a predetermined refractive power course along the principal line, or from a predetermined starting surface, which is e.g. comprised in the starting design. Likewise, as will be described in the following, the course of the base target isoastigmatism line can be calculated from the current object distance course and the accommodation model.

To calculate the coordinate $u_{O5}$ of the 0.5 D base target isoastigmatism line at a specific y coordinate, a linear approach can be used in the vicinity of the principal line:

$$A(u) = A_0 + \frac{dA}{du} u + \dots,$$

wherein A(u) designates the target astigmatism value at a distance (u) from the principal line in horizontal section with the specified y coordinate.

The linear approach approximately applies to smaller distances from the principal line. If the increase or rise of the refractive power along the principal line is relatively large (a condition that almost always applies in the progression zone), the distance $u_{O5}$ can be calculated with great precision.

In the above equation, the slope or derivative of the astigmatism $$\frac{dA}{du}$$

is the unknown quantity to be determined. The lateral rise of the astigmatism or the increase of the astigmatism $$\frac{dA}{du}$$

can be determined according to the Minkwitz theorem by the refractive power increase along the principal line. Thus, the horizontal distances of the points of the boundary line from the principal line or the u coordinates of the base target isoastigmatism line can be determined as well. It holds:

$$\frac{dA}{du} = 2\frac{dD}{dy},$$

wherein:

$$\frac{dA}{du}$$

designates the increase of the target astigmatism in the horizontal direction with the distance from the principal line; and $$\frac{dD}{dy}$$

designates the gradient of the refractive power in the vertical direction.

The distance $u_{O5}$ of the 0.5 D base target isoastigmatism line from the principal line in the progression zone can then be calculated as follows:

$$u_{O5} = \frac{0{,}5 dpt}{\frac{dA}{du}} = \frac{0{,}5 dpt}{2\frac{dD}{dy}}.$$

According to an aspect of the disclosure herein, it is proposed to not calculate the course of the base target isoastigmatism line in the progression zone on the basis of the predetermined refractive power course along the principal line, but from the current object distance course and the accommodation model (shortly referred to as asti model hereinafter). In particular, it is proposed to $$\frac{dA}{du} = 2\frac{dD}{dy} = 2\frac{d(-A1-Akk)}{dy},$$

wherein:

$$A1 = \frac{1}{a_1}$$

designates the reciprocal object distance, with $a_1$ designating the object distance on the principal line; and
Akk designates the accommodation success of the eye on the vertex sphere.

The reciprocal object distance A1(y), which also determines the design characteristics of the spectacle lens, can be specified as an at least continuous function for the spectacle lens. An exemplary object distance function A1(y) is the following:
  in the distance zone it holds A1(y)=1/(target distance distance);
  in the near hone it holds A1(y)=1/reading distance;
  the vertical transition or the vertical course of the function A1(y) along the principal line can be described by a double-asymptote function or as a spline function, for example.

The distances in the object space (i.e. in front of the spectacle lens) are usually indicated to be negative according to the rule of signs in technical optics. For standard progressive lenses, the distance zone of which is adapted for infinite vision, it holds A1(y=$y_{BF}$)=0 D in the distance reference point and $$A1(y = y_{BN}) = -2{,}5 dpt = -\frac{1}{0{,}4 m}$$

for additions ≤2.5 D and A1(y=$y_{BN}$)=–Add for additions >2.5 D in the near reference point. For near-vision and room lenses, A1($y_{BF}$) can be adapted to the considered room distance.

Akk designates the accommodation success of the eye on the vertex sphere or the necessary accommodation of the eye to obtain the desired correction. In general, it holds for imaging along a principal ray through the points on the principal line:

$S'(y)=A1(y)+D(y)+Akk(y)$ with $Akk$ as a function of $y$ or $S'(y)=A1(y)+D(y)+Akk(A1(y))$ with $Akk$ as a function of $A1$ (i.e. the overall refractive power is equal to (D+Akk)).

In the above formulae:

S' designates the vergence of the eye-side wavefront (corresponding to the visual defect of the customer);

A1 designates the object-side vergence;

D designates the refractive power of the spectacle lens; and

Akk designates the accommodation success of the eye on the vertex sphere.

An exemplary approach for principal line construction is:

Specifying the reciprocal object distance A1(y) along the principal line (e.g. by double-asymptote function, by superposing a spline function, etc.).

Equating S'(y) with the distance refraction of the spectacle wearer, i.e. $S'(y)=S'_F$=distance refraction of the spectacle wearer.

Defining the accommodation model, e.g. Akk(A1(y) as a linear model in A1.

Determining the accommodation via the two value pairs:
distance accommodation $Akk_0=Akk(A1=0)=0$ (i.e. no accommodation for objects at infinity); and
near accommodation $Akk_N=Akk(A1_{BN})$, which is calculated from the order data as follows $$Akk_N = S'_F - A1_N \cdot S'_N,$$

wherein $S'_N = S'_F + Z$ and $Z$=addition.

Here, it is merely required to define the function course for A1(y). All other parameters are automatically obtained by calculation.

The base target isoastigmatism lines $u_{Minkwitz}$ and $u_{Asti-Modell}$ calculated according to the Minkwitz theorem and according to the asti model substantially coincide in the progression zone of the starting design. In the transition zone, the base target isoastigmatism lines $u_{Minkwitz}$ and $u_{Asti-Modell}$ calculated according to the Minkwitz theorem and according to the asti model can deviate slightly. In the (stabilized) distance and near zones, the base target isoastigmatism lines ($u_{Minkwitz}$ and $u_{Asti-Modell}$) calculated according to the Minkwitz theorem and according to the asti model can differ considerably.

Likewise, it is possible to calculate the course of the base target isoastigmatism line of the starting design by combining the course determined using the Minkwitz theorem (Minkwitz model in short) and the course determined from the current object distance course and the accommodation model (asti model in short). Thus, a change of the object distance function of the starting design in the design variation can be taken into account in an improved way. In particular, it can be ensured that the physical laws are observed when specifying the base target isoastigmatism line. Moreover, it is possible to stabilize the target astigmatism specifications.

The distance $u_{OS}$ of the base target isoastigmatism line from the principal line can e.g. be determined according to the formula:

$$u_{OS} = u_{Asti-Modell} + g(u_{Minkwitz} - u_{Asti-Modell}),$$

wherein:

$u_{Asti-Modell}$ designates the distance of the base target isoastigmatism line from the principal line determined from the current object distance course and the accommodation model;

$u_{Minkwitz}$ designates the distance of the base target isoastigmatism line from the principal line determined according to the Minkwitz theorem; and g designates a weighting of the two models.

The control takes place via the factor g, wherein the condition $0 \leq g \leq 1$ holds.

For g=1, $u_{OS}=u_{Minkwitz-Modell}$ holds (course according to Minkwitz). For g=0, $u_{OS}=u_{Asti-Modell}$ holds (course according to astigmatism model).

The factor g can be determined from the extreme values of the horizontal increase of the astigmatism or target astigmatism along the principal line. Here, the smallest derivative or increase $$A'_{min} = \left(\frac{dA}{du}\right)_{min}$$

and the largest $$A'_{max} = \left(\frac{dA}{du}\right)_{max}$$

derivative or increase of the target astigmatism in the u direction along the principal line are searched or calculated. Where the increase of the astigmatism in horizontal section is at a maximum ($A'=A'_{max}$), g=1. Where the increase of the astigmatism in horizontal section is at a minimum ($A'=A'_{min}$), g=0.

Here, the factor g varies linearly between the values 0 and 1 as a function of A':

$$g(A'(y)) = \frac{A'(y) - A'_{min}}{A'_{max} - A'_{min}},$$

wherein:

$$A' = \frac{dA}{du}$$

designates the increase of the astigmatism in the horizontal direction where (u=0,y) y=const, $$A'_{max} = \left(\frac{dA}{du}\right)_{max}$$

designates the largest derivative or increase of the target astigmatism in the horizontal direction in the area of the principal line; and $$A'_{min} = \left(\frac{dA}{du}\right)_{min}$$

designates the smallest derivative or increase of the target astigmatism in the horizontal direction in the area of the principal line.

The increase $$A' = \frac{dA}{du}$$

can e.g. be calculated according to the Minkwitz theorem or according to the asti model:

$$A' = \frac{dA}{du} = 2\frac{d(-A1 - Akk)}{dy}.$$

If the reciprocal object distance A1(y) is not changed in the design change, the above-described combination of the two models can be omitted.

The calculation of the course of the 0.5 base target isoastigmatism line according to the above-proposed method, namely from the current object distance course and the accommodation model or by a combination of the course determined according to the Minkwitz theorem or the course determined from the current object distance course and the accommodation model is independent of the further transformation of the 0.5 isoastigmatism line or independent of the further transformation of the target astigmatism values. Therefore, an aspect of the disclosure herein relates to a computer-implemented method for creating or calculating a progressive spectacle lens design, comprising a distribution of the target astigmatism A(u,y) in at least one zone of a progressive spectacle lens, the method comprising:

specifying an object distance model and an accommodation model;

calculating the course of a base target isoastigmatism line $I_G$ with a constant base target astigmatism $A_G$=const on the basis of the specified object distance model and the accommodation model;

creating or calculating a target astigmatism distribution A(u,y), which exhibits the base target isoastigmatism line $I_G$, wherein:

x designates the horizontal coordinate;

y designates the vertical coordinate;

u designates the horizontal distance of a point (x,y) from a predetermined principal line.

Moreover, the disclosure herein further relates to a corresponding apparatus and a computer program product, which are configured to perform the above-described method for producing or calculating a progressive spectacle lens.

In the distance and/or near portion(s), the continuation or the course of the base target isoastigmatism line can be specified independently or be modified freely and infinitely (within certain predetermined limits), and thus the design specification can be made.

For example, the base target isoastigmatism line in the near portion or zone can be described or specified by the function:

$$u_G(y) = a_n + \frac{b_n}{y} + \frac{c_n}{y^2} + \frac{d_n}{y^3}$$

with the parameters or coefficients $a_n, b_n, c_n, d_n$.

In the distance portion, the base target isoastigmatism line can e.g. be described or specified by an $n^{th}$-order polynomial:

$$u_G(y) = a_f + b_f y + c_f y^n$$

with the parameters or coefficients $a_f, b_f, c_f$ (in the following also referred to as polynomial representation in short). A function of this type is particularly suitable to describe a hard design.

Alternatively, in the distance portion, the base target isoastigmatism line can be described or specified by the function:

$$u_G(y) = a + b\left(\text{atan}\left(\frac{y-c}{d}\right) + \frac{\pi}{2}\right)$$

with the parameters or coefficients a,b,c,d (in the following also referred to as an arctangent representation in short). Such a function is particularly suitable to describe a soft design.

Of course, the base target isoastigmatism line can be described or specified by other suitable parametric representations.

In a second step, the starting design is transformed. Transforming the starting design comprises shifting the first control point along a predetermined or predeterminable curve:

$$\vec{r}_1(u_1, y_1) \to \vec{r}'_1(u'_1, y'_1),$$

wherein $\vec{r}'_1(u'_1, y'_1)$ designates the shifted first control point. The predetermined or predeterminable curve u→y, K:u→k (u), along which the first control point is shifted, can be an arbitrary curve.

It is also possible for the base target isoastigmatism line to pass through further control points. The further control points can be shifted along corresponding predetermined or predeterminable curves, wherein the modified base target isoastigmatism line is calculated such that it passes through the shifted control points. The orientation of the curves along which the respective control point can be shifted can be an arbitrary one.

Subsequently, the course of the base target isoastigmatism line $I_G$ is modified such that it passes through the shifted first control point. Here, only the course of the base target isoastigmatism line $I_G$ is modified, but not the constant amount $A_G$ of the target astigmatism along the base target isoastigmatism line.

For example, the course of the base target isoastigmatism line is modified according to a predetermined transformation $$\Im(u_G(y)) = u'_G(y), \text{ wherein:}$$

$$A(u_G(y), y) = A(u'_G(y), y) = A_G = \text{const},$$

$u_G(y)$ designates a one-dimensional function specifying the course of the base target isoastigmatism line $I_G$; and $u'_G(y)$ designates a one-dimensional function specifying the course of the modified base target isoastigmatism line $I'_G$.

The first control point and optionally the further control points (and thus the course of the base target isoastigmatism line) can be shifted directly, or manually, or automatically on the basis of predetermined design or spectacle wearer-specific specifications or framework conditions to achieve an optimum adaptation of the viewing zones (e.g. distance and/or near zone(s)) to the individual needs of the spectacle wearer or the spectacle lens design. The maximally admissible outward (i.e. toward the principal line) and/or inward (i.e. toward the periphery of the spectacle lens or the spectacle lens rim) shift of the respective control point can be specified. The spectacle wearer, whose data are taken into account when shifting the first and optionally the further control points, can be an average spectacle wearer or a specific spectacle wearer or a specific customer.

The design and/or spectacle lens wearer-specific data or framework conditions, which are taken into account when shifting the at least one control point $\vec{r}_1 = (u_1, y_1)$, can in particular comprise data relating to the weighting of the distance and near zones and/or the focuses of use of the spectacle lens and/or frame and centration data.

In particular, the design and/or spectacle lens wearer-specific data or framework conditions can comprise data relating to customer preferences, weightings of the individual preferences, and other parameters.

The design and/or spectacle lens wearer-specific data or framework conditions, which is taken into account when determining the position of the at least one control point or when calculating the course of the modified base target isoastigmatism line, can further comprise one or more of the following data or sets of data:
- refraction data or power parameters, in particular sphere, cylinder, cylinder axis, addition; and/or
- data relating to the main use of the spectacle lens for which the spectacle lens design is created or designed (e.g. driving, computer workplace, reading, craftwork, etc.); and/or
- average or individual parameters of the spectacle wearer and/or the position of wear of the spectacle lens or the spectacles in front of the eyes of the spectacle wearer. The average or individual parameters of the spectacle wearer and/or the position of wear of the spectacle lens comprise in particular the pupillary distance, the corneal vertex distance (CVD), forward inclination (FI), etc.; and/or
- data relating to the average or individual object distances, in particular working distance when reading (near work), working distance in the distance; and/or
- data relating to the main directions of sight distance and near,
- individual data relating to the spectacle lens worn so far, in particular as to whether the previous spectacle lens is a single-vision, bifocal or progressive spectacle lens, data relating to the design (hard/soft), the progression length, the type (individual, conventional), the material (plastics/silicate), the refractive index, the location of the reference points, the addition of the previous spectacle lenses, and/or the change of the refraction data in comparison to the refraction data of the previous spectacle lens, and/or
- data relating to the individual desired improvements with respect to the so-far worn spectacles, in particular larger distance zone, larger intermediate zone, larger near zone, less infraduction when reading or reduced rocking motion; and/or
- data relating to the average or individual environmental influences (brightness of the surrounding, etc.); and/or
- data relating to potentially present, individual, exceptional head and body postures; and/or
- individual physiological parameters, in particular of the eye or the eyes of the spectacle wearer, in particular visus with correction, threshold of stereopsis; and/or
- data relating to the object distances in the refraction determination: distance and near.

Moreover, the design and/or spectacle lens wearer-specific data or framework conditions can comprise further parameters.

After the course of the modified base target isoastigmatism line $l'_G$ has been defined, a target astigmatism distribution $A(u,y)$, which exhibits the modified base target isoastigmatism line $l'_G$, is calculated or created in a next step. The creation or calculation of a target astigmatism distribution, which exhibits the modified base target isoastigmatism line $l'_G$, can comprise an interpolation of the target astigmatism values between the principal line and the modified base target isoastigmatism line $l'_G$. The modification of the base target isoastigmatism line and the creation or calculation of a target astigmatism distribution, which exhibits the modified base target isoastigmatism line $l'_G$, will be described in detail in the following.

The thus calculated target astigmatism distribution can be transformed further. For example, it is possible to further transform the calculated target astigmatism distribution by a further compression or stretching in the vertical direction by multiplication by a scaling factor, etc.

Thus, with the method according to the disclosure herein, a spectacle lens designer can create or vary arbitrary progressive lens designs or arbitrary distributions of the target astigmatism in a fast and efficient way. In particular, with the exemplary method, it is possible to quickly and efficiently modify the design characteristics for an existing progressive lens design (starting or basic design) and to tailor it to customer needs. Moreover, by a relatively simple and fast calculation, it is possible to create variants or designs with larger or smaller viewing zones (e.g. with large or small distance portion, wide or narrow near portion), with low or high astigmatism gradients. Thus, an essential advantage is that the above-described additional effort for creating suitable target specifications, in particular for individual progressive spectacle lenses, can be avoided. A further advantage is the possibility to arbitrarily and infinitely adjust the viewing zones within the scope of predetermined limits without the design characteristics and the good imaging properties of the starting design getting lost. Thus, an arbitrary number of design variants can be created in order to always meet customer needs in the best possible way.

The exemplary method is preferably suitable for generating individual designs adapted to different fields of application, such as:
- progressive lenses with a large, wide distance portion for drivers;
- sports progressive lenses with a large distance portion, reduced addition, and small gradients (lenses for dynamic activities);
- lenses with a wide near portion and a main focus of work of 40 cm;
- diverse computer workplace lenses as well as near and room lenses, as well as for producing individual spectacle lenses on the basis of the generated design.

According to one embodiment, the curve along which the at least one control point $\vec{r}_1=(u_1,y_1)$ is shifted is a straight line, so that $$\vec{r}\,'_1 = \vec{r}_1 + t\vec{v}_{a,i}$$

holds, wherein
$\vec{v}_a$ designates the outward direction vector of the straight line, along which the control point moves or can move; and
$\vec{v}_i$ designates the inward direction vector of the straight line, along which the control point moves or can move; and
$t$ designates the shift along the straight line with the direction vector $\vec{v}_{a,i}$.

The orientation of the straight line, along which the at least one control point can be shifted, can be an arbitrary one. For example, the straight line, along which the respective control point moves or can move, coincides with the curve normals of the base target isoastigmatism line in the predetermined control point $\vec{r}_1=(u_1,y_1)$.

Here, the shift $t$ and thus the field of view sizes can be limited, wherein $t_a$ designates the maximally admissible outward deviation and $t_i$ designates the maximally admissible inward deviation. A maximum field of view size, e.g. in the near portion, then means that the control point $\vec{r}_1$ is shifted fully outward (i.e. toward the periphery) along the straight line $\vec{v}_a$ ($\vec{r}'_1=\vec{r}_1+t\vec{v}_a$). A minimum field of view size, e.g. in the near portion, accordingly means that the control point $\vec{r}_1$ is shifted fully inward (i.e. toward the principal line) along the straight line $\vec{v}_i$ ($\vec{r}'_1=\vec{r}_1+t\vec{v}_i$).

For example, the parameter t can be calculated by the formula:

$$t = mt_{a,i} = \left(\frac{g_{F,N}}{50} - 1\right) t_{a,i},$$

wherein
$0 \leq g_{F,N} \leq 100$ holds,
for $50 < g_{F,N} \leq 100$ $\vec{r}'_1=\vec{r}_1+mt_a\vec{v}_a$ holds; and
for $0 \leq g_{F,N} < 50$ $\vec{r}'_1=\vec{r}_1+mt_i\vec{v}_i$ holds,
and wherein
$g_F$ designates the weighting of the distance zone in percent;
$g_N$ designates the weighting of the near zone in percent,
$t_a$ designates the maximally admissible outward shift;
$t_i$ designates the maximally admissible inward shift.

For a weighting of the distance or near zone of 50% ($g_{F,N}=50$), m=0, i.e. the basic design is not modified. If the respective weighting is in the interval of (50%, 100%] ($50 < g_{F,N} \leq 100$), $0 < m \leq 1$ and $\vec{r}'_1=\vec{r}_1+mt_a\vec{v}_a$ holds, i.e. the respective viewing zone is widened. If the respective weighting of the distance or near zone is in the interval of [0%, 50%) ($0 \leq g_{F,N} < 50$), $-1 \leq f < 0$ and $\vec{r}'_1=\vec{r}_1+mt_i\vec{v}_i$ holds, i.e. the respective viewing zone is reduced.

The weighting $g_{F,N}=100$ means that the control point $\vec{r}_1$ is shifted maximally outward along the straight line $\vec{r}'_1=\vec{r}_1+t\vec{v}_a$, i.e. that $t=t_a$. In this case, it holds that $\vec{r}'_1=\vec{r}_1+t_a\vec{v}_a$. Weighting $g_{F,N}=0$ accordingly means that the control point $\vec{r}_1$ is shifted fully inward along the straight line $\vec{r}'_1=\vec{r}_1+t\vec{v}_i$, i.e. that $t=t_i$. In this case, it holds that $\vec{r}'_1=\vec{r}_1+t_i\vec{v}_i$.

If the weighting $g_{F,N}$ is specified, than the associated straight line parameter t can be determined with the factor:

$$f = \frac{g_{F,N}}{50} - 1.$$

When $g_{F,N}=50$, then $f=0$ and the starting or basic design is not modified.

Weightings $g_F \neq 50$ and/or $g_N \neq 50$ change the field of view sizes and thus also the starting or basic design.

The method for creating or calculating a progressive spectacle lens design can further comprise an adaptation $A_{max} \rightarrow A'_{max}$ of the maximum target astigmatism value $A_{max}$ depending on the weighting of the distance and/or near zone(s).

A weighting of the distance and/or near zone(s), which deviates from 50% ($g_{F,N} \neq 50$ and/or $g_{F,N} \neq 50$), changes the size of the respective viewing zone and thus also the size of the peripheral area on the spectacle lens, in which the aberrations can or are allowed to have higher values. Preferably, an adaptation of the maximally admissible target astigmatism $A_{max}$ of the target astigmatism distribution A(u,y), which is determined or calculated after the at least one first control point has been shifted, is performed. For example, if the distance zone is widened and/or the near zone is widened, then $A_{max}$ is increased as a rule (sandbox model for the astigmatism). If, however, the distance zone is reduced and/or the near zone is reduced, then $A_{max}$ is reduced.

For example, the maximally admissible target astigmatism value $A_{max}$ can be adapted depending on the weighting of the distance and/or near portion(s) according to the following formula:

$$A'_{max} = n(g_F, g_N) A_{max},$$

wherein $$n(g_F, g_N) = 1 + \frac{p_{Astmax}}{100} \frac{(g_F + g_N - 100)}{100}$$

is a scaling factor;
$g_F$ is the weighting of the distance zone in percent, wherein $0 \leq g_F \leq 100$ holds;
$g_N$ is the weighting of the near zone in percent, wherein $0 \leq g_N \leq 100$ holds;
$p_{Ast\,max}$ is the maximally admissible adaptation in percent, wherein $0 \leq p_{Ast\,max} \leq 50$ holds.

For example, $p_{Ast\,max}=15$.

An adaptation of the maximally admissible astigmatism of a target astigmatism distribution A(u,y) depending on the weighting of the distance and/or near portion(s) can also be performed independent of the method with which the target astigmatism distribution A(u,y) was determined. For example, the maximally admissible astigmatism of a target astigmatism distribution, which was obtained from a starting or basic design by stretching or compression thereof in the vertical direction, can also be adapted with the above-described method.

Therefore, a further aspect of the disclosure herein relates to a computer-implemented method for producing or calculating a progressive spectacle lens, comprising:
specification of a starting target astigmatism distribution A(u,y);
adaptation $A_{max} \rightarrow A'_{max}$ of the maximum target astigmatism value $A_{max}$ of the starting target astigmatism distribution depending on a predetermined or predeterminable weighting of the distance and/or near zone(s).

The weighting of the distance zone $g_F$ and the weighting of the near zone $g_N$ can be defined depending on the customer preferences and/or frame data.

The weightings of the distance and near zones $g_F$ and $g_N$ can be suitably defined by the design designer or be automatically derived from the detected customer data or customer preferences on the importance of the distance zone or importance of the near zone for vision. An example of a method for calculating the weightings of the distance and/or near zone(s) from the obtained customer data or customer preferences is described in WO 2008/08995, which is hereby incorporated by reference.

Likewise, the weightings $g_F$ and $g_N$ can be derived from the frame data. For example, in the case of a long lens, the peripheral distance zone can be assigned a higher weighting in order to reduce disturbing lateral aberrations. Merely shifting the reference points distance and/or near upward and/or downward without a design change, i.e. without changing the course of the boundary astigmatism line, would hardly solve the problem, but on the other hand additionally shorten the progression length and reduce the channel width. Boundary astigmatism lines are in particular understood to be the temporal and nasal base target isoastigmatism lines as well as optionally the temporal and nasal additional target astigmatism line.

Since sports frames usually have a high face form angle and those spectacles are mainly used for dynamic activities (e.g. running, cycling, skiing, jogging, etc.) and not so much for near work, the face form angle can also be taken into account in the design control, similar to the "importance active behavior". In particular, a linear dependence of the weightings $g_F$ (weighting of the distance zone), $g_N$ (weighting of the near zone), $g_D$ (weighting dynamics, which correlates with the dynamic visual impression), and the face form angle can be formulated. For example, the greater the face form angle, the greater $g_F$ and $g_D$ and the smaller $g_N$.

The method for creating or calculating a progressive spectacle lens design can further comprise a scaling step, wherein target astigmatism values A(u,y=const) in the points of each horizontal section for which the conditions $u \geq u_1$ or $u \leq -u_1$ are met, are multiplied by a scaling factor s(u,y).

The target astigmatism distribution A(u,y) obtained by the above-described transformation of a starting design can be transformed further. Thus, the target astigmatism distribution A(u,y) can be transformed further by multiplication by a scaling factor s(u,y):

$$A' = A_{new} = s(u,y) A(u,y).$$

To obtain the characteristics along the principal line, the multiplication by the scaling factor can be performed for the points for which the conditions $u \geq u_1$ or $u \leq -u_1$ are met. In this case, the target astigmatism values are not changed near the principal line (i.e. when $|u| < |u_1|$). Furthermore, when $u = |u_1|$, the scaling factor s can be set to 1: $s(\pm u_1, y) = 1$.

For certain special uses, it can be physiologically advantageous to strongly modify the starting design. An example for this is progressive lenses for fast action sports. Here, the need for a large error-free distance zone and very smooth transitions in the temporal area (little rocking motion) is of particular importance. The size of the near zone is of less importance though. The other extreme, i.e. that a very large, wide near zone is required for precision activities, for example, can be of interest as well. To better meet such demands, an additional factor s(u,y) can be used for the calculation of the target specifications for the astigmatism, to further influence the target astigmatism values in a targeted way in terms of the surface.

An exemplary function s(u,y) can be defined as follows:

In each horizontal section y=const of the spectacle lens, the target astigmatism values are multiplied by a factor that linearly changes for each lens half (nasal, temporal) from a predetermined inner u coordinate $u_1$ with the function value 1 toward the outside. Of course, instead of the linear change within the horizontal sections, other functions can be used as well (e.g. a quadrangular function of u, a cubic function of u, a double-asymptote function, etc.).

Moreover, a second construction line $u_2(y)$ can be specified. For example, $u_2$=const and $|u_2| > |u_1|$. The value of the scaling factor $s(u_2, y)$ on the construction line $u_2(y)$ can be specified differently for the different horizontal sections.

In particular, the straight line point $(u_2, f_2(y))$ (for a linear function of u) can be specified differently for the different horizontal sections y=const. Stated differently, the outer function value $f_2$ at $u_2$ can be specified differently for the distance, near and progression zone, i.e. $f_2 = f(y)$.

For the dynamic sports lens, the peripheral astigmatism in the middle or upper lens area (i.e. in the distance zone) can be reduced additionally, for example. Consequently, in the upper lens area, the function $f_2(y)$ can be clearly smaller than 1 ($f_2(y) < 1$), preferably smaller than 0.5. In the near zone, the function $f_2(y)$ may take the value 1 again. In the near zone, it preferably holds that $f_2(y) \approx 1$.

In the case of a wider near zone, an exactly opposite course is advantageous: preferably no change is performed in the upper area, i.e. $f_2(y) \approx 1$. In the near zone, an additional reduction of the astigmatism is performed, i.e. $f_2(y) < 1$.

Thus, the target astigmatism in the distance zone, near zone and/or in the periphery can be additionally influenced or reduced in a targeted way by a function simple to control.

For example, the function $f_2(y)$ can be a double-asymptote function with the parameters a,b,c,d,m, wherein $$f_2(y) = b + \frac{a}{(1 + e^{c(y+d)})^m}$$

holds, and $$s(u, y) = f_0 \left( 1 + \frac{f_2(y) - 1}{u_2 - u_1} (u - u_1) \right),$$

wherein $|u_2| > |u_1|$.

A simple-to-handle function for the factor $f_2(y)$ at the lens rim $u_2$ is the double-asymptote function:

$$f_2(y) = b + \frac{a}{(1 + e^{c(y+d)})^m}$$

with the parameters a,b,c,d,m. It then holds for the function s(u,y):

$$s(u, y) = f_0 \left( 1 + \frac{f_2(y) - 1}{u_1 - u_1} (u - u_2) \right).$$

The coefficients b,c,d and m of the double-asymptote function $f_2(y)$ can be defined or specified in advance. For example, it is possible to set b=1, c=−0.3, d=5, m=2, $a_{max}$=−0.5. The deviation, or elevation or hub, a can then be controlled on the basis of a weighting dynamics $g_D$. For example, it holds for the coefficient a of the double-asymptote function $f_2(y)$:

$$a = \frac{g_D a_{max}}{100}.$$

For $g_D$=80% and $a_{max}$=−0.5, a is −0.4. The drop in the distance portion is a=−0.4, the value of the scaling factor $s(y_{FT})$=1−0.4=0.6.

The above-described scaling step or the above-described scaling method can be applied to an arbitrary target astigmatism distribution, irrespective of the way this target astigmatism distribution is obtained. In particular, the above-described scaling method is not limited to the scaling of target astigmatism distributions obtained by a transformation of the base target isoastigmatism line.

Therefore, the disclosure herein further relates to a computer-implemented method for creating or calculating a progressive spectacle lens design by a transformation of a starting design, comprising:

specification of the starting design, wherein the starting design comprises a starting target astigmatism distribution A(u,y);

transforming the starting design by multiplication of the target astigmatism values A(u,y=const) in the points of each horizontal section, for which the condition $|u|>|u_1|$ is met, by a scaling factor s(u,y), wherein preferably $s(u_1,y)=1$ holds.

As has been explained above, the base target isoastigmatism line can be illustrated parametrically in a simple way, wherein in the different zones (distance, near and/or progression zone(s), which can be defined by specifying two vertical coordinates $y_F$ and $y_N$, for example), the base target isoastigmatism line can be described by different functions. In the following, an exemplary transformation of the base target isoastigmatism line $I_G$ will be described, so that it passes through the shifted first control point.

The base target isoastigmatism line can have at least one area in which no transformation is performed. The base target isoastigmatism line can in particular pass through at least one pivotal or fixed point $\vec{r}'_0=(u_0,y_0)$, wherein the conditions $$u_G(y_0) = u'_G(y_0)$$
$$\frac{du_G(y_0)}{dy} = \frac{du'_G(y_0)}{dy}$$

are met in the pivotal or fixed point.

In particular, the point on the base target isoastigmatism line with coordinates $(u,y=y_F)$ and/or $(u,y=y_N)$ can constitute a pivotal or fixed point each.

According to one example, the base target isoastigmatism line is not transformed in the progression zone (i.e. when $y_N \leq y \leq y_F$). Thus, the derived individual design keeps the characteristic features of the refractive power course and the minimum width of the progression channel of the starting design associated therewith. The course of the base target isoastigmatism line in the progression zone can be determined on the basis of the refractive power course along the principal line or from the current object distance course and the accommodation model, as described above. Thus, the points with coordinates $(u,y_F)$ and $(u,y_N)$ constitute a pivotal or fixed point each.

In the near and/or distance zone(s), however, a transformation of the base target isoastigmatism line can be performed. In the following, the modification of the base target isoastigmatism line in the near zone will be explained in detail.

As has been explained above, the base target isoastigmatism line in the near zone can e.g. be described by a function of the form:

$$u_G(y) = a_n + \frac{b_n}{y} + \frac{c_n}{y^2} + \frac{d_n}{y^3}$$

with the parameters or coefficients $a_n, b_n, c_n, d_n$.

The first derivative of this function is $$\frac{du_G(y)}{dy} = -\frac{b_n}{y^2} - \frac{2c_n}{y^3} + \frac{3d_n}{y^4}.$$

The base target isoastigmatism line passes through a first predetermined or predeterminable control point $\vec{r}_n(u_n,y_n)$ in the near portion.

Transforming the starting design comprises shifting the first control point along a predetermined or predeterminable curve, in particular along a straight line: $\vec{r}_n(u_n, y_n) \rightarrow \vec{r}'_n(u'_n,y'_n)$. The shift of the control point is performed depending on individual data of a spectacle wearer, as described above.

The modified base target isoastigmatism line $I'_G$ is described by a function of the form:

$$u'_G(y) = a'_n + \frac{b'_n}{y} + \frac{c'_n}{y^2} + \frac{d'_n}{y^3}$$

with the parameters $a'_n, b'_n, c'_n, d'_n$.

The parameter or coefficient $a_n = a'_n$ can be specified or defined in a suitable way. The remaining parameters of the above function can be calculated or determined from the data of the shifted control point $\vec{r}'_n(u'_n,y'_n)$ and optionally by taking additional conditions into account. Such a condition can be the conditions that the course of the base target isoastigmatism line in the progression zone, which extends between a vertical coordinate $y_N$ (on the border of the near zone) and a vertical coordinate $y_F$ (on the border of the distance zone), is not modified, so that in this zone (i.e. between $y_N$ and $y_F$) the base target isoastigmatism line of the starting design and the base target isoastigmatism line of the derived, individual design coincide. The point $(u,y=y_N)$ thus constitutes a pivotal or fixed point. The point $(u,y=y_F)$ constitutes a pivotal or fixed point as well.

Since the course of the base target isoastigmatism line of the starting design is predetermined, there can be calculated, on the basis of the data of the course of the base target isoastigmatism line of the starting design in the progression zone determined by the distance u of the base target isoastigmatism line from the principal line, the first derivative at $y=y_N$.

On the basis of this data and the data of the coordinates of the shifted control point, the remaining parameters of the modified base target isoastigmatism line and thus the course of the modified base target isoastigmatism line in the near zone can be uniquely calculated by solving the following system of linear equations:

$$u'_G(y=y_N) = u_G(y=y_N)$$
$$\frac{du'_G(y=y_N)}{dy} = \frac{du_G(y=y_N)}{dy}$$
$$u'_G(y=y'_n) = u'_n = a'_n + \frac{b'_n}{y'_n} + \frac{c'_n}{y'^2_n} + \frac{d'_n}{y'^3_n}.$$

The course of the base target isoastigmatism line in the distance portion of a hard design can usually also be modified by specifying and manipulating a control point. In particular, the base target isoastigmatism line in the distance portion can be described by a function:

$$u_G(y) = a_f + b_f y + c_f y^n.$$

with the parameters or coefficients $a_f, b_f, c_f$. The power n of the polynomial is usually specified or suitably defined.

The first derivative of this function is:

$$\frac{du_G(y)}{dy} = b_f + nc_f y^{n-1}.$$

The base target isoastigmatism line in the distance portion passes through a first predetermined or predeterminable control point $\vec{r}_f(u_f, y_f)$. This point is shifted as described above $\vec{r}_f(u_f, y_f) \to \vec{r}'_f(u'_f, y'_f)$. The parameters of the above function can be calculated or determined from the data of the shifted control point $\vec{r}'_n(u'_n, y'_n)$ and optionally taking additional conditions into account. Such an additional condition may be a condition that the point $(u, y=y_F)$ constitute a pivotal or fixed point.

The modified base target isoastigmatism line is described by a function of the form:

$$u'_G(y) = a'_f + b'_f y + c'_f y^n$$

with the parameters $a'_f, b'_f, c'_f$.

The parameters or coefficients of the modified base target isoastigmatism line can be uniquely determined by solving the following system of equations, for example, wherein in the progression zone the course of the base target isoastigmatism line remains unchanged:

$$u'_G(y = y_F) = u_G(y = y_F)$$
$$\frac{du'_G(y = y_F)}{dy} = \frac{du_G(y = y_F)}{dy}$$
$$u'_G(y = y'_f) = u'_f = a'_f + b'_f y'_f + c'_f y'^n_f$$

For a base target isoastigmatism line of a soft design described by a function of the form $$u_G(y) = a + b\left(\operatorname{atan}\left(\frac{y - c}{d}\right) + \frac{\pi}{2}\right)$$

with the parameters or coefficients a,b,c,d, usually two predetermined control points $\vec{r}_{f1}(u_{f1}, y_{f1})$ and $\vec{r}_{f2}(u_{f2}, y_{f2})$ in the distance portion or zone are sufficient to uniquely determine the course of the modified base target isoastigmatism line. The two control points are shifted as described above:

$$\vec{r}_{f1}(u_{f1}, y_{f1}) \to \vec{r}'_{f1}(u'_{f1}, y'_{f1})$$

$$\vec{r}_{f2}(u_{f2}, y_{f2}) \to \vec{r}'_{f2}(u'_{f2}, y'_{f2}).$$

The parameters or coefficients a',b',c',d' of the modified base target isoastigmatism line and thus their course in the distance portion can be uniquely determined by solving the following system of equations:

$$u'_G(y = y_F) = u_G(y = y_F)$$
$$\frac{du'_G(y = y_F)}{dy} = \frac{du_G(y = y_F)}{dy}$$
$$u'_G(y = y'_{f1}) = u'_{f1} = a' + b'\left(\operatorname{atan}\left(\frac{y'_{f1} - c'}{d'}\right) + \frac{\pi}{2}\right)$$
$$u'_G(y = y'_{f2}) = u'_{f2} = a' + b'\left(\operatorname{atan}\left(\frac{y'_{f2} - c'}{d'}\right) + \frac{\pi}{2}\right),$$

wherein the point on the base target isoastigmatism line with the coordinate $y=y_F$ is a pivotal or fixed point.

As has been explained above, the creation or calculation of a target astigmatism distribution, which exhibits the modified base target isoastigmatism line $I'_G$, can comprise an interpolation of the target astigmatism values between the principal line and the modified base target isoastigmatism line $I'_G$.

In particular, the starting design can comprise specifications for the target astigmatism values $A_0(u=0, y)$ along the principal line, wherein the creation or calculation of a target astigmatism distribution $A(u,y)$, which exhibits the modified target isoastigmatism line, comprises an interpolation between the target astigmatism values $A(u=0, y)$ on the principal line and the target astigmatism values on the modified base target isoastigmatism line, wherein $A(u=0, y)=A_0(u=0, y)$ holds.

The condition $A(u=0, y)=A_0(u=0, y)$ means that the target astigmatism values $A(u=0, y)$ along the principal line of the starting design are not transformed. The target astigmatism values on the modified base target isoastigmatism line $I'_G$ are equal to the base target astigmatism $A_G$.

The interpolation can be a linear, quadrangular, or cubic interpolation. A higher-order interpolation is conceivable as well.

An exemplary calculation or creation of a target astigmatism distribution or target astigmatism values on the basis of the predetermined course of a principal line and the predetermined course of a base target isoastigmatism line will be described in detail in the following.

As described above, the course of the predetermined base target isoastigmatism line $I_G$ can be specified by a one-dimensional function $u_G(y)$. Of course, the target astigmatism distribution between the predetermined principal line HL and the modified base target isoastigmatism line $I'_G$ can be calculated as well by the below-described method. In this case, in the following formulae, the one-dimensional function $u'_G(y)$, which describes the course of the modified base target isoastigmatism line $I'_G$, will take the place of the one-dimensional function $u_G(y)$, which describes the course of the base target isoastigmatism line $I_G$.

In particular, the target astigmatism values can be interpolated in horizontal sections, wherein the interpolation is performed in each horizontal section between the predetermined target astigmatism value on the principal line $A(u=0, y)=A_0(y)$ and the value $A_G=$const on the modified base target isoastigmatism line.

With respect to u, the interpolation can be performed linearly, quadrangularly, or by an arbitrary power function $$A(u,y) = A_0(y) + b(y)u^p$$

In case of the specified power p, the coefficient $b(y)$ can be directly determined by:

$$b(y) = \frac{A_G - A_0(y)}{u_G(y)^p}$$

wherein, as described above, $u_G(y)$ is the horizontal distance of the base target isoastigmatism line from the principal line.

The interpolation can then be written as $$A(u, y) = A_0(y) + \frac{A_G - A_0(y)}{u_G(y)^p} u^p = A_0(y) + (A_G - A_0(y))\left(\frac{u}{u_G(y)}\right)^p$$

The power p is generally specified in a variable manner. The greater p is selected to be, the smoother the lateral increase of the astigmatism on the principal line is. In the progression zone, the astigmatism generally increases linearly according to the Minkwitz theorem, so that in this zone p is preferably selected to be 1. As the target astigmatism in the near portion decreases, p preferably increases as well, so that the horizontal increase of the target astigmatism is slower. This leads to an extension of the near portion.

In the periphery of the spectacle lens (i.e. between the base target isoastigmatism line and the spectacle lens rim), the distribution of the target astigmatism can be determined by additionally specifying the outer, maximum target isoastigmatism line with the value $A_{max}$ and by specifying the distances of the maximum target isoastigmatism lines from the base target isoastigmatism line in the distance and near portions.

In particular, the target astigmatism values in the periphery of the spectacle lens can be determined or calculated by so-called parallel curve model methods.

According to this method, parallel curves for the base target isoastigmatism line or further target isoastigmatism lines, are can be substantially parallel to the base target isoastigmatism line, are constructed in the periphery of the spectacle lens. The normal distance of these target isoastigmatism lines is controlled by specifying a largest value $A_{max}$ and the associated distance from the base target isoastigmatism line along the curve normal. The distance of the maximum or outer target isoastigmatism line does not have to be constant and can be specified by a distance function a(y). The greater the value of a(y), the farther away the target isoastigmatism lines are from each other and the smoother the astigmatism transitions. The distance function a(y) may be a simple linear function such that a distance in the distance portion $a_F$ and a distance in the near portion $a_N$ are specified and subsequently interpolated linearly in y.

The target astigmatism value at an arbitrary point P(u,y) in the periphery of the spectacle lens can e.g. be calculated as follows:

1. determining the point $P_G(u_G,y_G)$ on the base target isoastigmatism line, the curve normal of which passes through the point P(u,y), by a suitable numerical method;
2. calculating the distance d of the two points P(u,y) and $P_G(u_G,y_G)$:

$$d=\sqrt{(u-u_G)^2+(y-y_G)^2};$$

3. calculating the associated target astigmatism value $A(u,y)=A(d,a(y_G))$ by an interpolation between $A_G(d=0)$ and $A_{max}(a(y_G))$. Depending on the design, this interpolation can e.g. be a linear, quadrangular, or cubic, or another suitable interpolation. Preferably, the interpolation is linear.

Alternatively, the target astigmatism values in the periphery of the spectacle lens can be calculated according to the so-called truncated cone model method.

This method is particularly advantageous if the base target isoastigmatism line is curved too much when transitioning into the distance zone, so that the curve normals to the base target isoastigmatism line possibly intersect already within the distance a(y). In this case, according to the above-described method, the outer target isoastigmatism lines cannot be constructed clearly any more, since the above method provides more than one solution. The target isoastigmatism lines are modeled as contour lines of a truncated cone, the base area of which is delimited by the target isoastigmatism line. By specifying the position of the tip $S(u_{SP},y_{SP})$ of the truncated cone and the associated target astigmatism value $A_{SP}$ at the tip, each point P(u,y) is uniquely associated a target astigmatism value according to the below-described method 1. determining the intersection $F(u_F,y_F)$ of the straight line passing through the points P and S and the limiting curve of the truncated cone;

2. calculating the distances:

$$a_{SP}=\sqrt{(u_{SP}-u_F)^2+(y_{SP}-u_F)^2}$$ and $$a_P=\sqrt{(u_P-u_F)^2+(y_P-u_F)^2};$$

3. calculating the target astigmatism value A(u,y):

$$A_{KS} = A_G + (A_{SP} - A_G)\frac{a_P}{a_{SP}}$$

$$A_{target}(u,y) = A_{target}(p) = \min(A_{KS}, A_{max}).$$

Particularly in the distance portion, the calculation of the target astigmatism values can be controlled more finely (e.g. by the above-described interpolation) by an additional, second target isoastigmatism line (e.g. $I_{Z=0.25}$ or $A_Z=0.25$ D).

Accordingly, the starting design can comprise a specification for the course of an additional target isoastigmatism line in the distance and/or near portion(s) and or zone(s). The additional, second target isoastigmatism line can be specified and calculated or modified by analogy with the base target isoastigmatism line.

In particular, an interpolation is performed at first between the principal line and the second, additional target isoastigmatism line, and subsequently between the second, additional target isoastigmatism line and the base target isoastigmatism line. In this case, the calculation of the target astigmatism values can comprise a first interpolation between the target astigmatism values on the principal line and the target astigmatism values on the modified additional target isoastigmatism line and a second interpolation between the target astigmatism values on the modified additional target isoastigmatism line and the target astigmatism values on the modified base target isoastigmatism line, wherein the first and second interpolations are each performed by analogy with the above-described interpolation between the target astigmatism values on the principal line and the target astigmatism values on the modified base target isoastigmatism line.

Preferably, the method for calculating or calculating a progressive spectacle lens design can comprise a step of obtaining individual parameters of the spectacle wearer.

As has been explained above, the design or spectacle wearer-specific data or framework conditions, on the basis of which the at least one control point is shifted, can relate to previously determined data or parameters, e.g. average needs and/or preferences concerning the size and/or position of the distance, near and/or progression zone(s), average physiological parameters of the eye of the spectacle wearer, average parameters of the position of wear of the spectacle lens, average frame and/or centration data, etc. For example, these parameters can be stored in a memory, on a storage medium, in a database, etc., and be read out therefrom.

The design or spectacle wearer-specific specifications or framework conditions, on the basis of which that at least one control point is shifted, can also comprise individual parameters and/or individual design specifications (e.g. preferences, focuses of use, weightings distance and/or near zone(s), etc.) of a specific spectacle wearer or a specific customer.

The individual data and/or individual design specifications of a spectacle wearer can be obtained in great detail e.g. with a consulting tool, such as "Consulting FreeSign" by the company Rodenstock GmbH. Preferably, the customer is directly demonstrated the possible individual design suggestions or design realizations. So far, the realization of the individual customer needs with respect to the viewing zones in corresponding flexible lens design has not been solved sufficiently.

Usually, special designs, such as "Impression Sport extra-curved" by the company Rodenstock GmbH, had to be used. However, these special designs did not cover all near distances and base curves. With the present disclosure, it is possible to emphasize individual viewing zones by modifying the target specifications in a targeted way. For example, a lateral extension of the near zone can be performed, which may be combined with a reduction of the distance zone or an increase of the gradients of the target isoastigmatism lines in the distance and/or near zone(s)—depending on the requirements profile of the customer (high weighting dynamic or distance portion).

The above-described method for producing or calculating a progressive spectacle lens can be combined with other methods for producing or calculating a progressive spectacle lens by a transformation of a predetermined starting design.

For example, the transformation of the starting design can further comprise a transformation (e.g. stretching or compression in a vertical direction) of the target astigmatism values $A(u,y)$, e.g. calculated by interpolation, depending on a variably adjustable, (individual) vertical position of the distance and/or near reference point(s). The transformation is performed such that the spectacle lens design to be calculated exhibits the required, vertical position of the distance and/or near reference point(s). Such a transformation is described in the patent application WO 2008/089996, which is hereby incorporated by reference. Here, a spectacle lens design exhibits a predetermined spatial position of the distance and/or near reference point(s) when the prescribed values or the values required for the spectacle wearer for the distance and/or near portion power(s) (which are e.g. determined by refraction determination) are achieved in the respective reference point. Put differently, the aberrations (in particular astigmatic deviation and refractive error) associated with the design are to be as small as possible (preferably substantially zero) in the distance and/or near reference point(s).

Alternatively, the target astigmatism values $A(u,y)$ multiplied by the scaling factor $s(u,y)$ can be transformed depending on the individually determined vertical position of the distance and/or near reference point(s).

Further preferably, the transformation of the starting design can further comprise multiplication of the target astigmatism values by a scaling factor $l/l_D$, with a function $h=h(S''(y'),l_D/l)$ or with a function $h=h(l_D/l)$, wherein l designates the progression length of the individual spectacle lens design and $l_D$ designates the progression length of the starting design. Preferably, $h(l_D/l)=a\cdot(l_D/l)+b$, wherein a,b are constants.

Thus, in addition, a progressive lens design with an arbitrary position of the reference points for distance and near (distance and near reference points) and main viewing zones can be derived and optimized maintaining the design characteristics of the starting design. To this end, it is sufficient to merely specify the desired individual position of the reference points for distance $B_F$ and near $B_N$. The vertical position and length of the progression zone of the progression surface are automatically adapted to the individual user situation. Here, an arbitrary position of the reference points for distance $B_F$ and near $B_N$ can be taken into consideration in the optimization.

Likewise, the starting design can further comprise a specification for an object distance function along the principal line of the spectacle lens. Preferably, the method for calculating an individual design further comprises a suitable transformation of the object distance function of the starting design. Preferably, the transformation coefficients of the transformation of the object distance function are determined by a Newton iteration such that the refractive power of the spectacle lens in the distance and/or near reference point(s) of the individual spectacle lens design corresponds to the refractive power of the spectacle lens in the distance and/or near reference point(s) of the starting design. A suitable transformation of the object distance function is described in the above-mentioned patent application WO 2008/089996.

In addition, the transformation of the starting design can further comprise multiplication of the target astigmatism values (start target astigmatism values or the target astigmatism values determined by interpolation) by a scaling factor $s_{Add}$, wherein $$s_{Add} = t_{Add} \frac{Add}{Add_B}.$$

wherein:

$t_{Add}$ designates a factor that generally is a function $t_{Add}=t_{Add}(Add,F,Add_B)$ of the addition Add of the spectacle lens or spectacle lens design to be calculated and/or of the distance power F and/or a predetermined base addition $Add_B$, wherein $t_{Add}=1$ holds for $Add=Add_B$. In the simplest case, $t_{Add}=1$.

For example, the starting design can comprise a start target astigmatism distribution for the base addition $Add_B$. First of all, this start target astigmatism distribution can be rescaled to obtain a target astigmatism distribution for an addition Add, wherein Add is the addition of the spectacle lens or spectacle lens design to be calculated. Subsequently, the course of the base target isoastigmatism line can be changed as described above, and a modified target astigmatism distribution adapted to the new course of the base target isoastigmatism line can be determined by interpolation. A transformation of a predetermined target astigmatism distribution with a base addition $Add_B$ by multiplication by a scaling factor s is described in the patent application DE 10 2008 105 189.0.

Likewise, the target astigmatism values can be suitably transformed in a different order. In the same way, other target specifications of the starting design (e.g. target specifications for the refractive error, magnification, etc.) can be suitably transformed or changed.

The exemplary method disclosed herein is suitable both for creating designs or design variants for conventional or power-optimized progressive spectacle lenses and for creating or designs or design variants for individually optimized progressive spectacle lenses.

With the exemplary method for creating or calculating a design for a progressive spectacle lens, an arbitrary number of designs can be derived from a balanced starting design (e.g. a universal design, a near design, etc.) already with few parameters, wherein the transitions are smooth. In a preferred embodiment, all designs derived from the starting design preferably keep the same characteristic features of the refractive power course along the principal line and thus additionally also the minimum width in the progression channel. Consequently, it is possible to afterward create almost all conceivable combinations of field of view sizes and gradient courses without having to create a new design for the complete power range. Since with the procedure according to the disclosure herein the basic or starting designs do not have to be modified directly, but the coefficients for creating the target specifications have to be adapted only shortly before the optimization on the basis of the additional parameters, suitable application designs can be quickly derived therewith. In particular, the exemplary method is preferably suitable for a calculation process controlled by a database. Since different design variants can be created quickly and efficiently and tested against each other with the exemplary method, the effort for developing and producing conventional, power-optimized or individual progressive spectacle lenses can be reduced significantly.

In addition, an adaptation to the freely definable positions of the near and/or distance reference point(s) of the spectacle wearer and thus to different progression lengths can be performed. In particular, the existing optimization specifications or the existing starting design can be stretched and compressed arbitrarily and thus adapted to the individual situation of wear and in particular to an individually determined progression length. Here, no interpolation of the target specifications of different designs (e.g. different starting design having different progression lengths) is required. Thus, variants with different (longer or shorter) progression zones or progression lengths can additionally be created quickly and efficiently from an existing starting design.

It is also possible to perform an additional, automatic adaptation of the object distance function and thus an automatic adaptation of the target refractive power course.

The calculated spectacle lens design can be a spectacle lens design for a progressive spectacle lens with an object-side or preferably eye-side progressive surface. The opposite surface can preferably be a simple spherical or rotationally symmetric aspherical surface. It is also possible to calculate or create a spectacle lens design for a double-progressive spectacle lens using the above-described method.

Furthermore, according to a further aspect of the disclosure herein, an apparatus for creating or calculating a progressive spectacle lens design or a design for a progressive spectacle lens is provided, comprising design calculating or design transformation means adapted to perform a preferred method for creating or calculating a progressive spectacle lens design by a transformation of a predetermined starting design.

The starting design comprises:
specifications for the course of a principal line HL; and
the specification of at least one base target isoastigmatism line $I_G$ with a constant base target astigmatism $A_G$=const, wherein the base target isoastigmatism line $I_G$ passes through at least a first predetermined control point $\vec{r}_1=(u_1,y_1)$ In particular, the design calculating or design transformation means comprise:
control point changing means adapted to perform a shift $\vec{r}_1(u_1,y_1) \rightarrow \vec{r}'_1(u'_1,y'_1)$ of the position of the first control point $\vec{r}_1=(u_1,y_1)$ along a predetermined or predeterminable curve, wherein shifting of the first control point $\vec{r}_1=(u_1,y_1)$ is performed taking design and/or spectacle lens wearer-specific data into account;
base target isoastigmatism line calculating means adapted to calculate a modified base target isoastigmatism line $I'_G$ such that it passes through the shifted first control point $\vec{r}'_1(u'_1,y'_1)$, and
calculating means adapted to perform a creation or calculation of a target astigmatism distribution A(u,y), which exhibits the modified base target isoastigmatism line $I'_G$,
wherein:
x designates the horizontal coordinate;
y designates the vertical coordinate;
u designates the horizontal distance of a point (x,y) from the principal line; and A(u,y) designates the target astigmatism values of the transformed starting design.

Furthermore, the apparatus for creating or calculating a progressive spectacle lens design can comprise obtaining means adapted to obtain individual data of the spectacle wearer.

The starting design can be stored in a memory permanently or temporarily. The design calculating and/or design transformation means, which in particular can comprise base target isoastigmatism line calculating means and the calculating means for creating or calculating a target astigmatism distribution, can be implemented by correspondingly configured or programmed conventional computers, specialized hardware and/or computer networks or computer systems.

The design calculating or design transformation means and in particular the base target isoastigmatism line calculating means and/or the calculating means for creating or calculating a target astigmatism distribution can be in signal communication with the memory by suitable interfaces and in particular read out and/or modify the data stored in the memory. The control point changing means can further comprise an interactive graphical user interface (GUI), which allows a user to change the positions of the control points.

The base target isoastigmatism line calculating means can be in signal communication with the graphical user interface by suitable interfaces. The base target isoastigmatism line calculating means can perform a calculation of a base target isoastigmatism line $I'_G$, which passes through the shifted first control point $\vec{r}'_1(u'_1,y'_1)$, in real time.

Furthermore, a computer program product, i.e. a computer program claimed in the claim category of an apparatus, and a storage medium with a computer program stored thereon are provided, the computer program being adapted, when loaded and executed on a computer, to perform a preferred method according to the disclosure herein for creating or calculating a progressive spectacle lens design.

According to a further aspect, a method for producing a progressive spectacle lens is proposed, comprising:
calculating a design for the progressive spectacle lens according to a preferred method for creating or calculating a progressive spectacle lens design; and
calculating or optimizing the spectacle lens on the basis of the calculated spectacle lens design.

Furthermore, the production method can comprise:
providing surface data of the calculated or optimized spectacle lens; and
manufacturing the spectacle lens according to the provided surface data of the spectacle lens.

The manufacture or production can be performed by numerically controlled CNC machines, by a casting method, a combination of the two methods, or according to another suitable method.

Calculating or optimizing the spectacle lens can comprise minimizing the target function:

$$F(\vec{x}) = \sum_{i=1}^{m} [g_{i,Ast}(Ast_i - Ast_{i,target})^2 + \ldots]$$

wherein
$Ast_{i,target}$ is the target value of the local astigmatic deviation or the local astigmatic error at the $i^{th}$ evaluation point;
$Ast_i$ is the actual value of the local astigmatic deviation or the actual local astigmatic error at the $i^{th}$ evaluation point;
$g_{i,Ast}$ is the local weighting of the astigmatic deviation or the local astigmatic error at the $i^{th}$ evaluation point.

In the above formula, $Ast_{i,target}$ is the previously determined target astigmatism distribution, assigned to the progressive spectacle lens design, in the respective $i^{th}$ evaluation point.

Further preferably, the refractive error ΔR is also taken into account in the target function, so that calculating or optimizing the spectacle lens comprises minimizing the target function:

$$F(\vec{x}) = \sum_{i=1}^{m} [g_{i,\Delta R}(\Delta R_i - \Delta R_{i,target})^2 + g_{i,Ast}(Ast_i - Ast_{i,target})^2 + \ldots]$$

wherein $\Delta R_{i,t\ arg\ et}$ is the target value of the local refractive error at the $i^{th}$ evaluation point;

$\Delta R_i$ is the actual value of the local refractive error at the $i^{th}$ evaluation point;

$g_{i,\Delta R}$ is the local weighting of the refractive error at the $i^{th}$ evaluation point;

The local weighting $g_{i,Ast}$ can be calculated according to the following formula:

$$g_{i,Ast} = \frac{1}{Ast_{i,target}^p}.$$

However, it is also possible to scale the specified local weighting $g_{i,Ast}$ with a weighting factor $G_{i,Ast}$ in addition.

The weighting factors $g_{i,Ast}$ in the target function are generally specified for the basic or starting design, so that a good optimization result can be obtained. If the astigmatism distribution is changed afterward, for example, than it might be expedient to accordingly adapt the local weighting $g_{i,Ast}$ as well. For example, viewing in zones in which small astigmatic errors (small $Ast_{t\ arg\ et}$) are specified can receive a higher weighting than the peripheral viewing zones.

For values of the target astigmatism $Ast_{t\ arg\ et}<1.0$, the function $$\frac{1}{Ast_{i,target}^p}$$

becomes greater than 1 and for values $Ast_{t\ arg\ et}>1.0$, the function becomes smaller than 1. The greater the power p, the steeper the function and the more the zones are weighted with $Ast_{t\ arg\ et}<1.0$. Preferably, p≤1, for example p=0.15.

According to a further embodiment, it holds for the local weighting $g_{i,Ast}$:

$$g_{i,Ast} = \frac{1}{Ast_{i,target}^p}$$

for $Ast_{t\ arg\ et} \leq 1.0$ and $g_{i,Ast}=1$ for $Ast_{t\ arg\ et}>1.0$.

The local weighting $g_{i,\Delta R}$ of the refractive error in the $i^{th}$ evaluation point can be scaled in a similar way depending on the amount of the refractive error.

The above-described adaptation of the local weightings, which is taken into account in the target function for optimizing the spectacle lens, can of course be applied irrespective of the way the desired or target values (target astigmatism values and/or target refraction values) are determined. One aspect of the disclosure herein therefore relates to a method for calculating or optimizing a spectacle lens, comprising:

specifying a target astigmatism distribution $Ast_{i,t\ arg\ et}$;
calculating or optimizing the spectacle lens by minimizing a target function of the form:

$$F(\vec{x}) = \sum_{i=1}^{m} [g_{i,Ast}(Ast_i - Ast_{i,target})^2 + \ldots],$$

wherein $Ast_{i,t\ arg\ et}$ is the target value of the local astigmatic deviation or the local astigmatic error at the $i^{th}$ evaluation point;

$Ast_i$ is the actual value of the local astigmatic deviation or the actual local astigmatic error at the $i^{th}$ evaluation point;

$G_{i,Ast}$ is the local weighting of the astigmatic deviation or the local astigmatic error at the $i^{th}$ evaluation point.

wherein it holds for the local weighting $g_{i,Ast}$:

$$g_{i,Ast} = \frac{1}{Ast_{i,target}^p},$$

wherein p designates a predetermined or predeterminable constant, which is preferably smaller than or equal to 1.

Moreover, one aspect of the disclosure herein relates to a corresponding computer program product and a corresponding apparatus for performing the method for calculating and optimizing the spectacle lens.

Furthermore, an apparatus for producing a progressive spectacle lens is proposed, comprising:

design calculating or design transformation means adapted to calculate or create a design for the progressive spectacle lens according to a preferred method for creating or calculating a progressive spectacle lens design by a transformation of a starting design; and optimizing or calculating means adapted to perform a calculation or optimization of the spectacle lens on the basis of the calculated design.

The starting design comprises:

specifications for the course of a principal line HL; and the specification of at least one base target isoastigmatism line $I_G$ with a constant base target astigmatism $A_G$=const, wherein the base target isoastigmatism line $I_G$ passes through at least a first predetermined control point $\vec{r}_1=(u_1,y_1)$.

In particular, the design calculating or design transformation means comprise:

control point changing means adapted to perform a shift $\vec{r}_1(u_1,y_1) \rightarrow \vec{r}'_1(u'_1,y'_1)$ of the position of the first control point $\vec{r}_1=(u_1,y_1)$ along a predetermined or predeterminable curve, wherein shifting of the first control point $\vec{r}_1=(u_1,y_1)$ is performed taking design and/or spectacle lens wearer-specific data into account;

base target isoastigmatism line calculating means adapted to calculate a modified base target isoastigmatism line $I'_G$ such that it passes through the shifted first control point $\vec{r}'_1(u'_1,y'_1)$, calculating means adapted to perform a creation or calculation of a target astigmatism distribution A(u,y), which exhibits the modified base target isoastigmatism line $I'_G$, wherein:

x designates the horizontal coordinate;

y designates the vertical coordinate;

u designates the horizontal distance of a point (x,y) from the principal line; and A(u,y) designates the target astigmatism distribution of the transformed starting design.

The optimizing or calculating means—as well as the design calculating or design transformation means—can be implemented by suitably configured or programmed computers, specialized hardware and/or computer networks or computer systems, etc. It is possible for the same computer or the same computer system to be configured or programmed such as to perform both the calculation of the design for the spectacle lens and the calculation or optimization of the spectacle lens on the basis of the calculated design. However, it is also possible for the calculation of the design and the calculation of the spectacle lens to be performed on the basis of the calculated design in separate calculating units, for example in separate computers or computer systems.

Furthermore, the apparatus for producing a progressive spectacle lens preferably comprises machining means for finishing the spectacle lens. The machining means can comprise e.g. CNC machines for direct machining of a blank according to the determined optimization specifications. Preferably, the finished spectacle lens has a simple spherical or rotationally symmetric aspherical surface and a progressive surface optimized on the basis of the individual design specifications calculated according to the exemplary method and individual parameters of the spectacle wearer. Preferably, the spherical or rotationally symmetric aspherical surface is the front surface (i.e. the object-side surface) of the spectacle lens. Of course, it is also possible to arrange the surface optimized on the basis of the calculated design as the front surface of the spectacle lens. It is also possible for both surfaces of the spectacle lens to be progressive surfaces.

Also, the apparatus for producing a progressive spectacle lens can further comprise obtaining means for obtaining individual data of the spectacle wearer. In particular, the obtaining means can comprise graphical user interfaces.

Furthermore, a computer program product, i.e. a computer program claimed in the claim category of an apparatus, and a storage medium with a computer program stored thereon are further provided, the computer program being adapted, when loaded and executed on a computer, to perform a method for calculating and optimizing a progressive spectacle lens, the method comprising the following steps:

calculating a design for the progressive spectacle design according to a preferred method for creating or calculating a progressive spectacle lens design;

calculating or optimizing the progressive spectacle lens on the basis of the calculated individual design.

A further aspect of the disclosure herein relates to a use of a progressive spectacle lens, produced according to a preferred production method, in a spectacle wearer's predetermined average or individual position of wear of the spectacle lens in front of the eyes of the specific spectacle wearer, for correcting a visual defect of the spectacle wearer.

Exemplary embodiments of the disclosure herein will be described by way of example in the following description with reference to the figures.

The coordinate system $\{x,y\}$ relates to a Cartesian coordinate system of the front surface, as defined above. The coordinate center coincides with the geometric center of the spectacle lens. The coordinate system $\{u,y\}$ relates to a coordinate system $\{u,y\}$, as defined above. The coordinate center coincides with the geometric center of the spectacle lens.

In the following figures, the reference numeral 10 designates the principal line, the reference numeral 12 the nasal base target isoastigmatism line, the reference numeral 14 the nasal additional target isoastigmatism line; the reference numerals 16 and 18 correspond to a first (reference numeral 16) and a second (reference numeral 18) control point of the nasal base target isoastigmatism line in the distance zone; the reference numerals 20 and 22 a first and a second control point of the additional nasal target isoastigmatism line in the distance zone, the reference numeral 24 a first control point of the base target isoastigmatism line in the near zone. The control points can be moved or shifted along the straight lines 26 (control point 16), 28 (control point 18), 30 (control point 20), 32 (control point 22), and 34 (control point 24), which are illustrated as arrows. The reference numeral provided with a prime relate to the same elements on the temporal side, wherein the construction of the temporal base target isoastigmatism line 12' is substantially the same as the construction of the nasal base target isoastigmatism line 12, and the construction of the temporal additional target isoastigmatism line 14' is substantially the same as the construction of the nasal additional target isoastigmatism line 14.

In all figures shown, the constant amount of the astigmatism along the base target isoastigmatism line 12 or 12' is equal to 0.5 D. The constant amount of the astigmatism along the additional target isoastigmatism line 14 or 14' is 0.25 D. The numerals $B_F$, $B_N$, and $B_Z$ represent the distance, near and centration points, respectively, of the spectacle lens design.

Unless stated otherwise, all distributions of the target astigmatism shown in the figures relate to distributions of the target astigmatism in the position of wear of the spectacle lens, i.e. taking the system spectacle lens/eye into account.

FIG. 1 shows the construction lines—principal line, base target isoastigmatism line, and additional target astigmatism line—and the control points of a "soft" starting design.

Figures 2A, 2B:
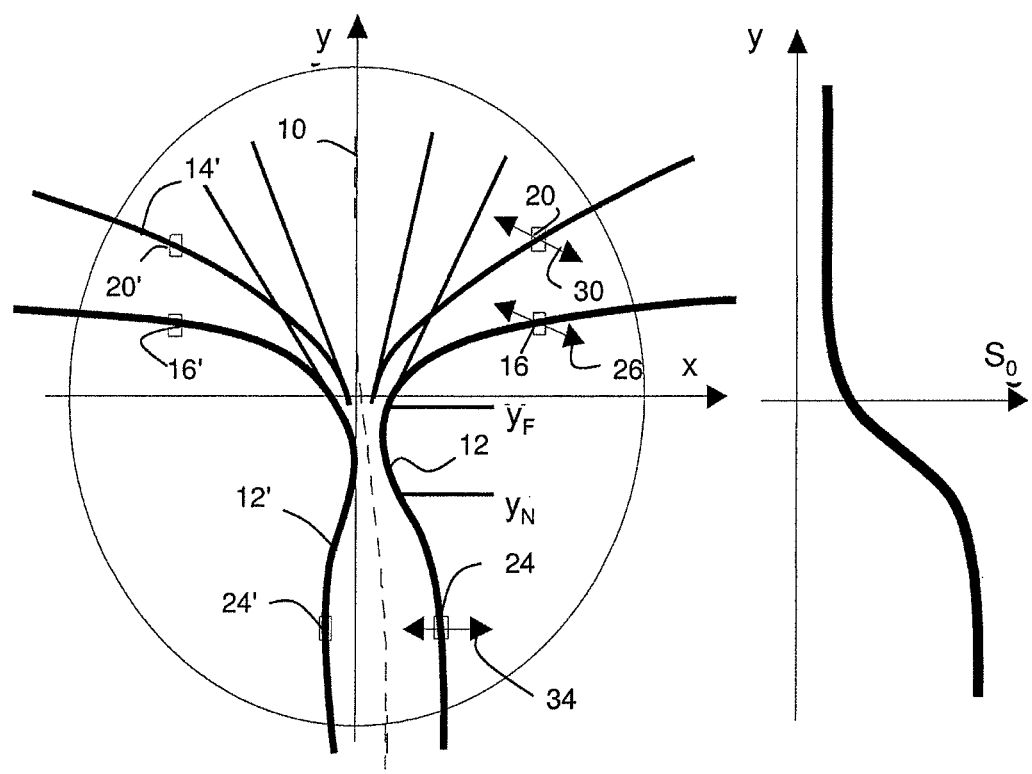
FIGS. 2a and 2b illustrate an example of a design with polynomial representation of the base target isoastigmatism line in the distance portion or zone.

FIG. 2a shows the construction lines—principal line 10, base target isoastigmatism line 12, and additional target isoastigmatism line in the distance zone 14—and the control points of a "hard" starting design. FIG. 2b illustrates the refractive power course along the principal line. In FIG. 2, the refractive power in D is plotted on the abscissa and the y coordinate in mm is plotted on the ordinate.

In the distance portion of the "soft" starting design shown in FIG. 1, the course of the base target isoastigmatism line 12 (both temporal and nasal) is specified by the function $$u_G(y) = a + b\left(\mathrm{atan}\left(\frac{y-c}{d}\right) + \frac{\pi}{2}\right)$$

with the parameters a,b,c,d (arctangent representation of the distance portion).

In the distance portion of the "hard" starting design shown in FIG. 2, the course of the base target isoastigmatism line 12 (both temporal and nasal) is specified by the function $u_G(y)=a_f+b_f y+c_f y''$ with the parameters $a_f,b_f,c_f$ (polynomial representation of the distance portion).

In the near portion both of the starting design illustrated in FIG. 1 and the one illustrated in FIG. 2, the course of the base target isoastigmatism line 12 (both temporal and nasal) is specified by the function $$u_G(y) = a_n + \frac{b_n}{y} + \frac{c_n}{y^2} + \frac{d_n}{y^3}$$

with the parameters $a_n,b_n,c_n,d_n$.

The control points of the "soft" and "hard" starting designs can be moved or shifted inward (i.e. toward the principal line) or outward (i.e. toward the periphery) along the corresponding straight lines 26, 28, 30, 32 and 34, which are illustrated as arrows. As described above, the course of the base target isoastigmatism line 12 and optionally of the additional target isoastigmatism line 14 are varied such that they pass through the shifted control points. According to one embodiment, there is no change of the nasal and temporal base target isoastigmatism lines 12 and 12' between a vertical coordinate $y_F$ and a vertical coordinate $y_N$ (i.e. in the progression zone). In the progression zone, the refractive power increase on the principal line determines the course of the base target isoastigmatism line.

The position of the control points 16 to 24 can be performed automatically on the basis of the design and/or spectacle lens wearer-specific data.

Figure 3:
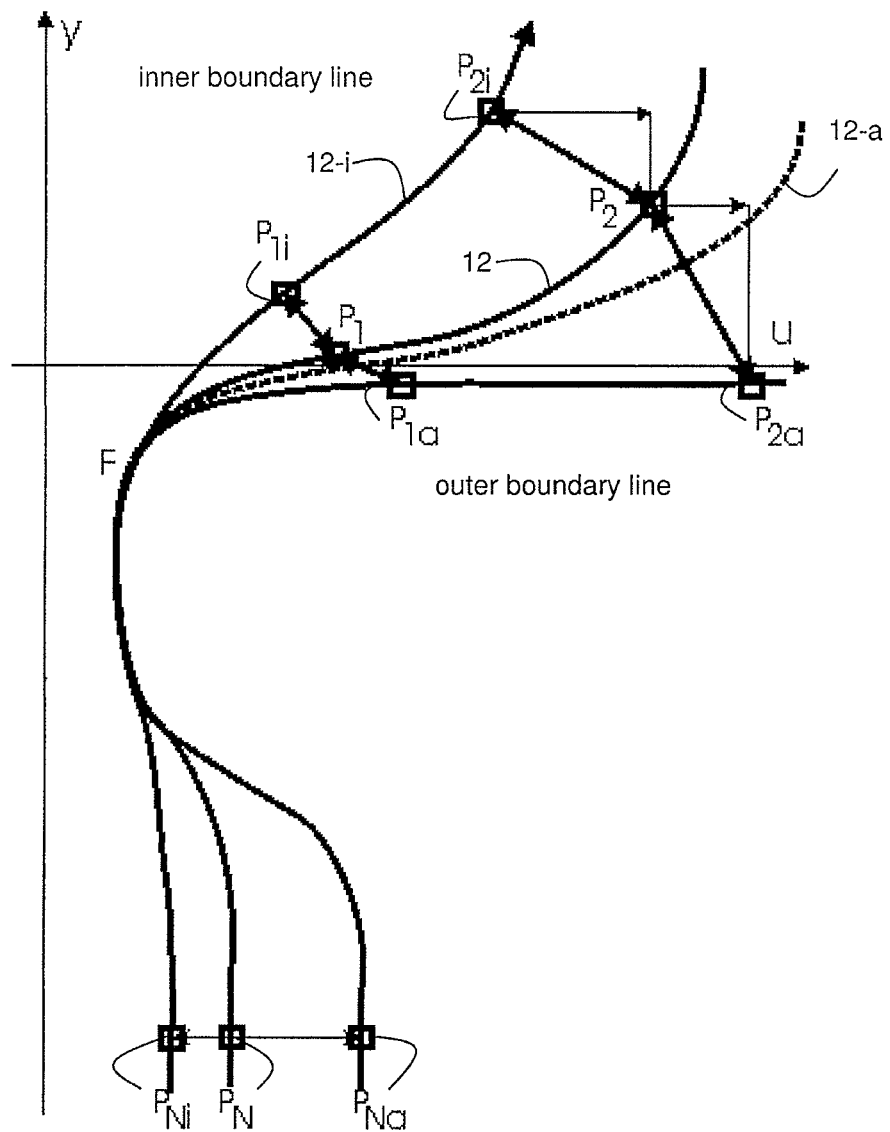
FIG. 3 illustrates an example of the transformation of the base target isoastigmatism line.

FIG. 3 shows the variation of the position of the control points of the base target isoastigmatism line 12 in detail. The base target isoastigmatism line 12 passes through two control points $P_1$ and $P_2$ in the distance portion and through one control point $P_N$ in the near portion. The control points $P_1$, $P_2$ and $P_N$ can be shifted inward ($P_1$, $P_2$, $P_N \rightarrow P_{1i}$, $P_{2i}$, $P_{Ni}$) or outward ($P_1$, $P_2$, $P_N \rightarrow P_{1a}$, $P_{2a}$, $P_{Na}$) along straight lines, which are illustrated as arrows. The transformation of the respective control point can be described as follows:

$$\vec{r} = \vec{r}_0 + mt\vec{v},$$

wherein:

$\vec{r}_0$ designates the original control point;

$\vec{r}$ designates the shifted control point.

The control points can be shifted within predetermined limits, wherein it holds for the innermost position of a control point that $\vec{r} = \vec{r}_0 + mt_i\vec{v}$ and for the outermost position of a control point that $\vec{r} = \vec{r}_0 + mt_a\vec{v}$. Here, $t_a$ designates the maximally admissible outward shift of the control point and $t_i$ the maximally inward shift of the control point. The modified base target isoastigmatism line passing through the innermost control point is referred to as an inner boundary line 12-$i$. The modified base target isoastigmatism line passing through the outermost control point is referred to as an outer boundary line 12-$a$.

The factor "m" (t=$mt_{i,a}$), which is associated with the straight line parameter "t", can e.g. be determined on the basis of the weighting of the respective viewing zone $g_{F,N}$ ($g_F$—weighting of the distance zone, $g_N$—weighting of the near zone). For example, the factor m can be calculated according to the formula $$m = \frac{g_{F,N}}{50} - 1,$$

wherein $-1 \leq m \leq 1$ holds for $0 \leq g_{F,N} \leq 100$. For $0 < g_{F,N} < 50$, it holds that $-1 < m < 0$ and the respective viewing zone is reduced. For $50 < g_{F,N} < 100$, it holds that $0 < m < 1$ and the respective viewing zone is widened. For $g_{F,N} = 0$, the respective viewing zone is not changed or the respective starting design is not changed.

The inner boundaries ($P_{1i}$, $P_{2i}$, $P_{Ni}$) and the outer boundaries ($P_{1a}$, $P_{2a}$, $P_{Na}$) of the position of the respective control point $P_1$, $P_2$, $P_N$ of the base target isoastigmatism line can be predetermined or specified in advance. Then, the straight line parameter $t_G$ and the direction vector v can be determined as follows:

$$t_G = |\overrightarrow{PP_G}| = \sqrt{(\vec{r}_G - \vec{r}_0)^2} \text{ and}$$

$$v = \frac{\vec{r}_G - \vec{r}_0}{|\vec{r}_G - \vec{r}_0|},$$

wherein it holds for the position of the control point that $\vec{r} = \vec{r}_0 + mt_G\vec{v}$.

The inner and outer boundary points or their positions can be stored in the starting design in advance.

Weightings $g_{F,N} \neq 50\%$ change the viewing zone sizes and thus also the size of the peripheral zone of the progressive spectacle lens design, in which the aberrations can be and are allowed to be of higher order. Other transformations, such as stretching or compression of the starting design, can also change the size of the peripheral zone of the design. In such cases, an additional adaptation of the maximally admissible astigmatism $A_{max}$ can be performed. For example, if the distance portion is pressed, or compressed, and/or the near portion is widened, the maximally admissible astigmatism $A_{max}$ in increased and vice versa (sandbox model for the astigmatism). For example, this can be performed by a multiplication of the maximally admissible astigmatism $A_{max}$ by a simple but practical function:

$$A'_{max} = n(g_F, g_N) A_{max},$$

wherein $$n(g_F, g_N) = 1 + \frac{p_{Astmax}}{100} \frac{(g_F + g_N - 100)}{100}$$

is a scaling factor;

$g_F$ ($0 \leq g_F \leq 100$) is the weighting of the distance zone in percent;

$g_N$ ($0 \leq g_N \leq 100$) is the weighting of the near zone in percent;

$p_{Ast\ max}$ ($0 \leq p_{Ast\ max} \leq 50$) is the maximally admissible adaptation in percent.

For example, if $p_{Ast\ max} = 30\%$, and $g_{F,N} = 100\%$, then the factor n can be calculated as follows for a viewing zone reduction (e.g. for a soft design):

$$n = 1 + \frac{p_{Astmax}}{100} \frac{(g_F + g_N - 100)}{100}$$

$$= 1 + \frac{15}{100} \frac{(0 + 0 - 100)}{100}$$

$$= 1 - 0{,}15$$

$$= 0{,}85.$$

However, for a viewing zone increase (such as for a hard design), it holds:

$$n = 1 + \frac{p_{Astmax}}{100} \frac{(g_F + g_N - 100)}{100}$$

$$= 1 + \frac{15}{100} \frac{(100 + 100 - 100)}{100}$$

$$= 1 + 0{,}15$$

$$= 1{,}15.$$

FIGS. 4$a$ and 4$b$ show an example of a scaling of the target astigmatism values by multiplication by a scaling factor s(u, y), to take the dynamics factor into account in an improved way. FIGS. 5a and 5b show a further example of a scaling of the target astigmatism values by multiplication by a scaling factor s(u,y).

Figure 4A:
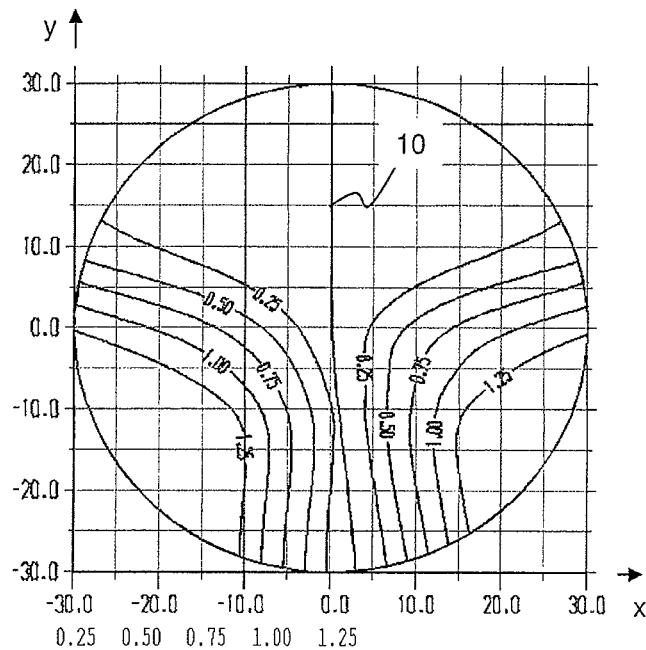
Figure 4B:
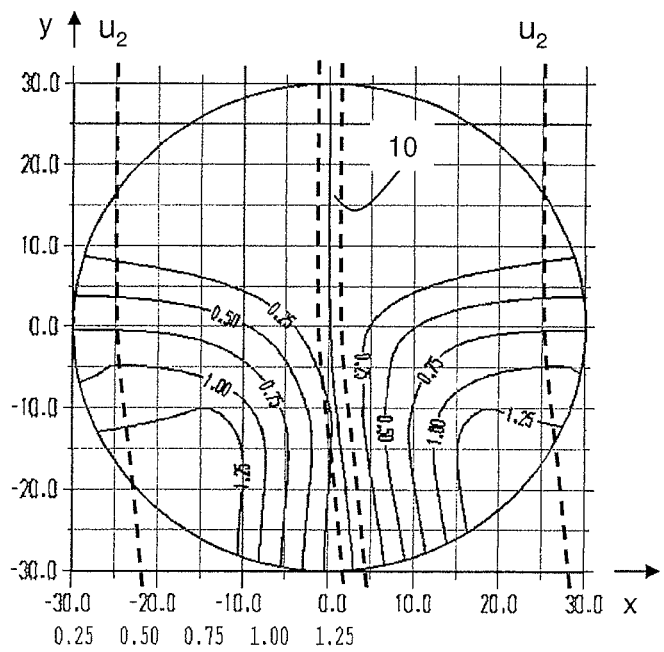
Figure 5A:
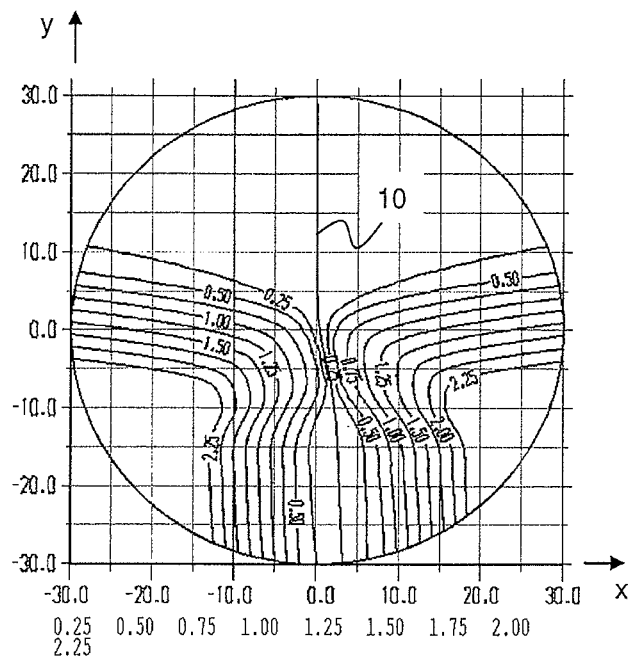
FIG. 5a illustrates the original target astigmatism distribution and FIG. 5b illustrates the scaled target astigmatism distribution.
Figure 5B:
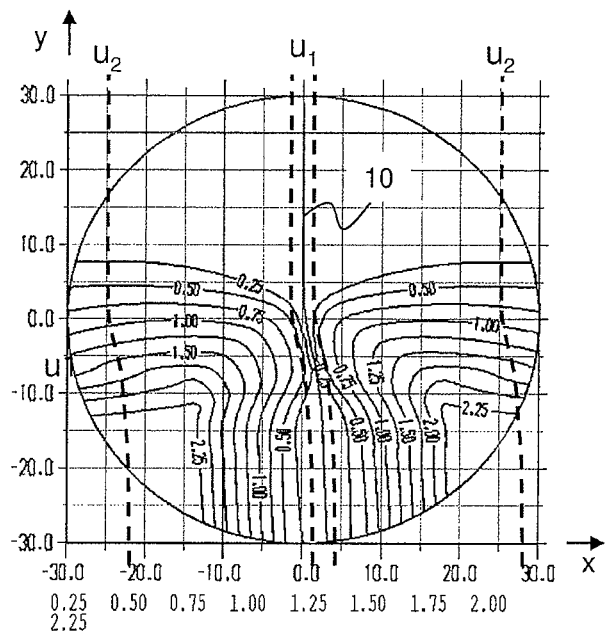

FIGS. 4a and 5a each show the original target astigmatism distribution $\text{Ast}_{t\ arg\ et}(u,y)$ (i.e. without taking the dynamics factor into account or when $g_D=0$), and FIGS. 4b and 5b each show the scaled target astigmatism distribution as isolines of the same target astigmatism. The distance between the isolines is 0.25 D. The weighting of the distance portion $g_F$ in the target astigmatism distributions shown in FIGS. 4a,b and 5a,b is 100%.

For the scaling of the target astigmatism values, it holds:

$$\text{Ast}_{Snew}(u,y) = s(u,y) \text{Ast}_{t\ arg\ et}(u,y).$$

An exemplary function s(u,y) can be defined as follows:

$$s(u, y) = f_0\left(1 + \frac{f_2(y) - 1}{u_2 - u_1}(u - u_1)\right).$$

For example, the function $f_2(y)$ can be a double-asymptote function with the coefficients a,b,c,d,m:

$$f_2(y) = b + \frac{a}{(1 + e^{c(y+d)})^m}.$$

For example, the coefficient a can be determined as follows:

$$a = \frac{g_D a_{max}}{100}.$$

In each horizontal section y=const of the spectacle lens, the target astigmatism values are multiplied by a factor that changes linearly for each lens half (nasal, temporal) from a predetermined inner u coordinate (coordinate $u_1$) with the function value 1 toward the outside.

The outer straight line point $(u_2, f_2(y))$ can be specified differently for the horizontal sections, i.e. is a function of the coordinate y.

The target astigmatism distribution shown in FIG. 4b was created with the following parameter: $u_1=1$ mm; $u_2=25$ mm; a=−0.5; b=1.0; c=−0.33; d=5; m=1; $a_{max}=−0.5$; $g_D=100\%$. The target astigmatism distribution shown in FIG. 5b was created with the following parameter: $u_1=1$ mm; $u_2=30$ mm; a=−0.5; b=1.0; c=−0.5; d=10; m=1; $a_{max}=−0.5$; $g_D=100\%$.

Figure 6A:
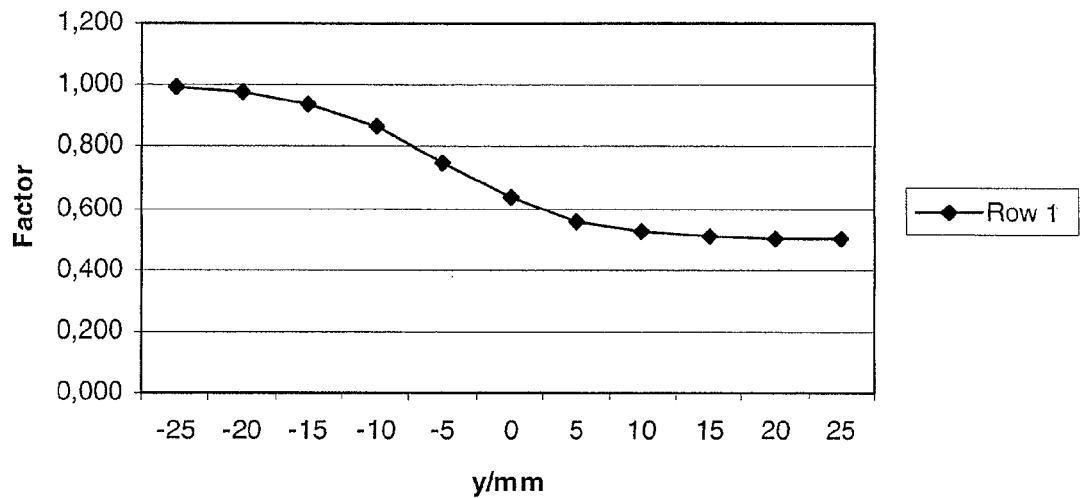
FIG. 6a illustrates a double asymptote $f_2(y)$ in a vertical section with $u_2=25$ mm in the case of a design for a spectacle lens with a wide distance portion.

The function $f_2(y)$ can depend on the weighting of the dynamics $g_D$. For example, it is advantageous for the dynamic sports lens to additionally reduce the peripheral astigmatism in the middle or upper lens area. Consequently, the function $f_2(y)$ can be clearly less than 1 in the upper lens area ($f_2(y) <1$), e.g. equal to 0.5. In the near zone, the function $f_2(y)$ can achieve the value 1 again. Preferably, it holds in the near zone that $f_2(y) \approx 1$. An exemplary function $s(u=u_2,y)=f_2(y)$ for this case is illustrated in FIG. 6a. In particular, FIG. 6a shows the double-asymptote function $f_2(y)$ in the vertical section when $u_2=25$ mm (i.e. the function $f_2(y)$ for $u_2=25$ mm).

Figure 6B:
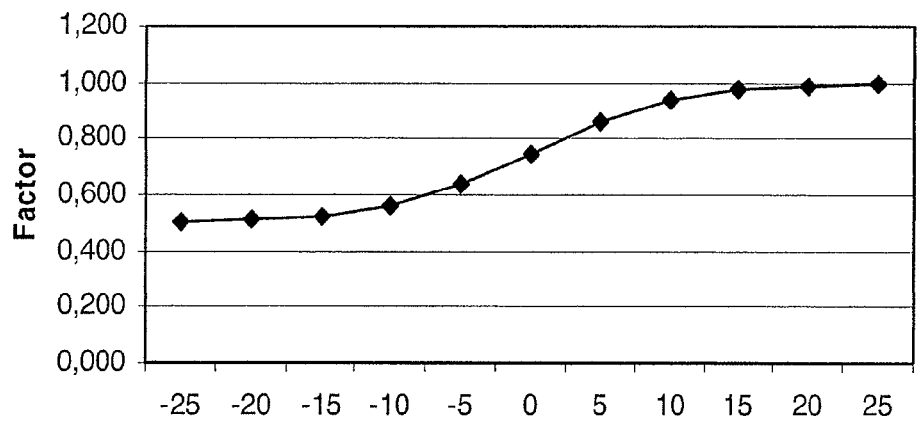
FIG. 6b illustrates a double asymptote $f_2(y)$ in a vertical section with $u_2=25$ mm in the case of a design for a spectacle lens with a wide near portion.

In the case of a desired wider near zone, the very opposite course is advantageous: In the upper area, there is preferably no change, i.e. $f_2(y) \approx 1$. In the near zone, there is an additional reduction of the astigmatism, i.e. $f_2(y) \leq 1$. An exemplary function $s(u=u_2, y)=f_2(y)$ for this case is illustrated in FIG. 6b. In particular, FIG. 6b shows the double-asymptote function $f_2(y)$ in the vertical section when u=25 mm (i.e. the function $f_2(y)$ for $u_2=25$ mm).

Thus, the target astigmatism in the distance zone, near zone and/or in the periphery can be additionally influenced or reduced in a targeted way by a function simple to control.

Figure 7A:
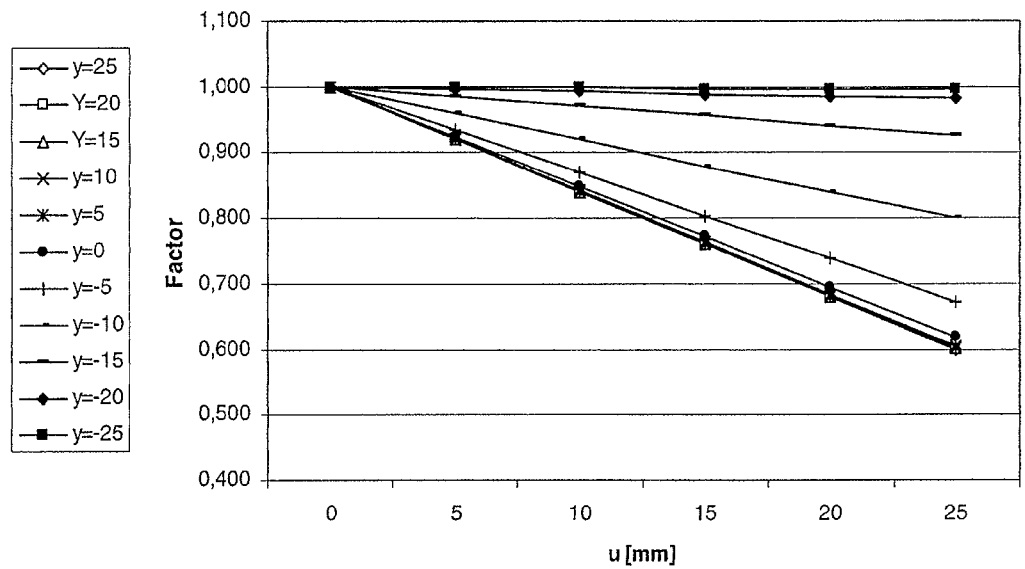
FIG. 7a illustrates an example of a scaling factor $s(u,y)$ in the different horizontal sections (i.e. with y=const) for a widened distance zone.
Figure 7B:
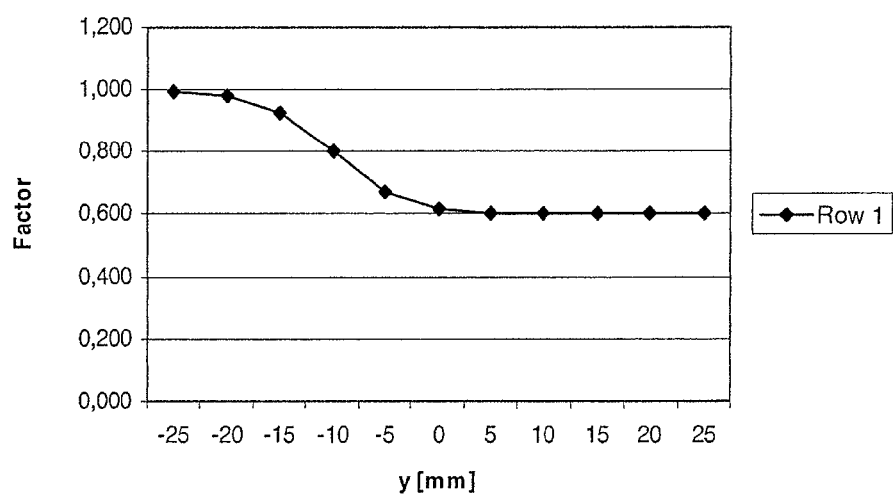
FIG. 7b illustrates the course of the double asymptote $f_2(y)$ of the scaling factor shown in FIG. 7a in the vertical section with $u_2=25$ mm.
Figure 7C:
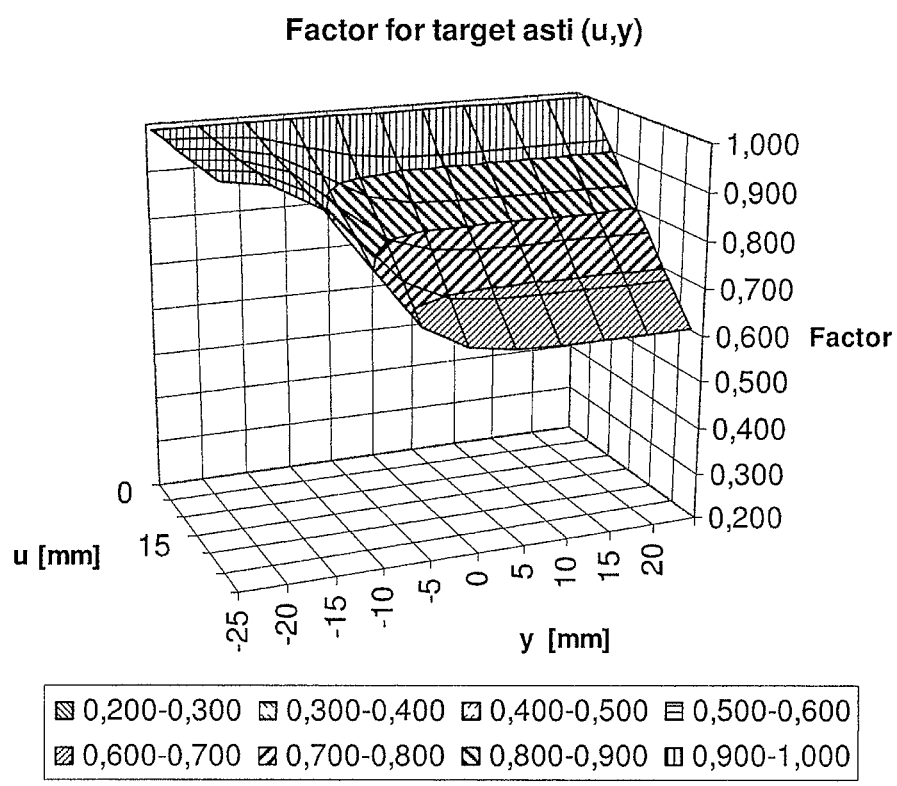

FIGS. 7a to 7c and Table 1 relate to an example of a scaling factor for a widened distance zone. FIG. 7a shows the scaling factor s(u,y) in the different horizontal sections (i.e. when y=const) from y=−25 mm to y=25 mm at distances of 5 mm. FIG. 7b shows the course of the double-asymptote function $f_2(y)$ of the scaling factor shown in FIG. 7a in a vertical section for $u_2=25$ mm. The coefficients of the double-asymptote function are a=−0.4, b=1.0, c=−0.30, d=10.00, m=1.00, $u_1=0$, $u_2=25$, $f_2(u_1=0)=1$. FIG. 7c shows a three-dimensional representation of the scaling factor $$s(u, y) = f_0\left(1 + \frac{f_2(y) - 1}{u_2 - u_1}(u - u_1)\right)$$

shown in FIG. 7. Table 1 shows the values of the function s(u,y):

TABLE 1

| y/u | u [mm]-> | | | | | |
|---|---|---|---|---|---|---|
| y [mm] | 0 | 5 | 10 | 15 | 20 | 25 |
| −25 | 1.000 | 0.999 | 0.998 | 0.997 | 0.996 | 0.996 |
| −20 | 1.000 | 0.996 | 0.992 | 0.989 | 0.985 | 0.981 |
| −15 | 1.000 | 0.985 | 0.971 | 0.956 | 0.942 | 0.927 |
| −10 | 1.000 | 0.960 | 0.920 | 0.880 | 0.840 | 0.800 |
| −5 | 1.000 | 0.935 | 0.869 | 0.804 | 0.738 | 0.673 |
| 0 | 1.000 | 0.924 | 0.848 | 0.771 | 0.695 | 0.619 |
| 5 | 1.000 | 0.921 | 0.842 | 0.763 | 0.684 | 0.604 |
| 10 | 1.000 | 0.920 | 0.840 | 0.761 | 0.681 | 0.601 |
| 15 | 1.000 | 0.920 | 0.840 | 0.760 | 0.680 | 0.600 |
| 20 | 1.000 | 0.920 | 0.840 | 0.760 | 0.680 | 0.600 |
| 25 | 1.000 | 0.920 | 0.840 | 0.760 | 0.680 | 0.600 |

Figure 8A:
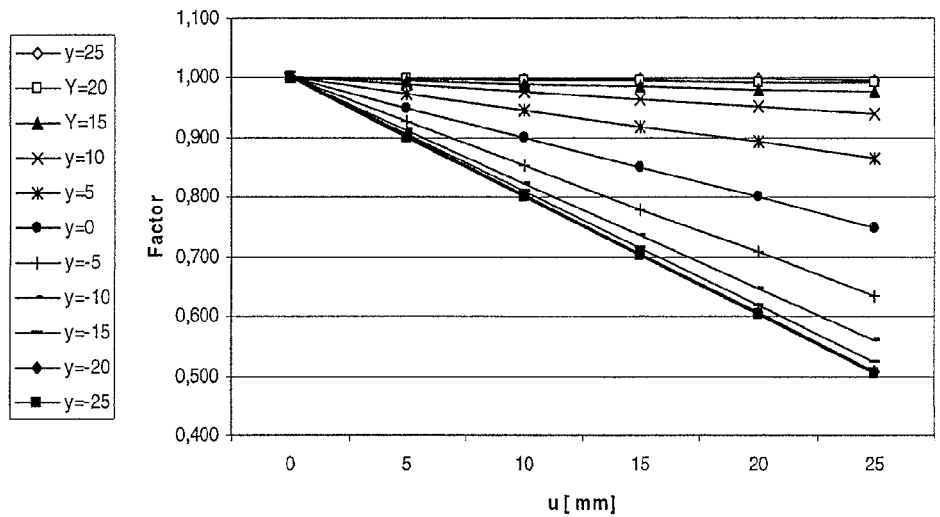
FIG. 8a illustrates an example of a scaling factor $s(u,y)$ in the different horizontal sections (i.e. with y=const)) for a widened near zone.
Figure 8B:
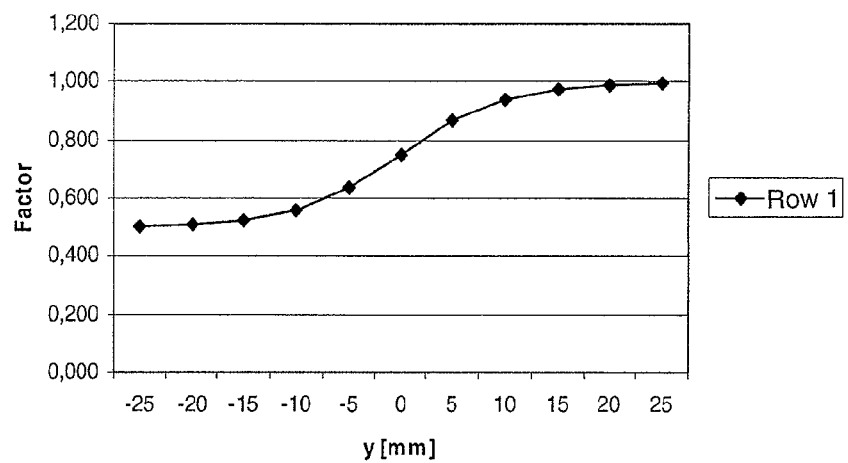
FIG. 8b illustrates the course of the double asymptote $f_2(y)$ of the scaling factor shown in FIG. 8a in the vertical section with $u_2=25$ mm.
Figure 8C:
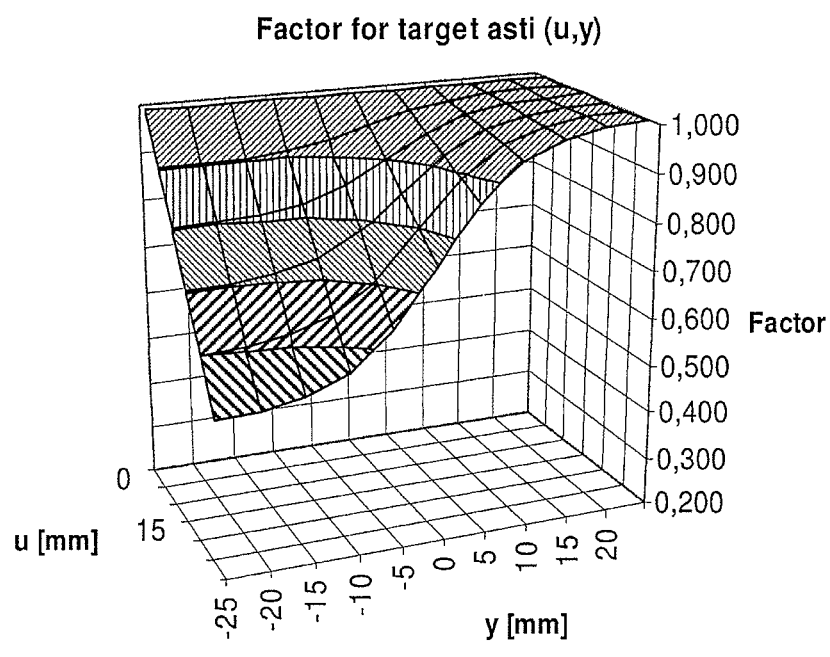

FIGS. 8a to 8c and Table 2 relate to an example of a scaling factor for a widened near zone. FIG. 8a shows the scaling factor s(u,y) in the different horizontal sections (i.e. when y=const) from y=−25 mm to y=25 mm at distances of 5 mm. FIG. 8b shows the course of the double-asymptote function $f_2(y)$ of the scaling factor shown in FIG. 8a in a vertical section for $u_2=25$ mm. The coefficients of the double-asymptote function are a=0.50, b=0.50, c=0.20, d=0.00, m=1.00, $u_1=0$, $u_2=25$, $f_2(u_1=0)=1$. FIG. 7c shows a three-dimensional representation of the scaling factor s(u,y) shown in FIG. 7a. Table 2 shows the values of the function s(u,y):

TABLE 2

| y/u | u [mm]-> | | | | | |
|---|---|---|---|---|---|---|
| y [mm] | 0 | 5 | 10 | 15 | 20 | 25 |
| −25 | 1.000 | 0.901 | 0.801 | 0.702 | 0.603 | 0.503 |
| −20 | 1.000 | 0.902 | 0.804 | 0.705 | 0.607 | 0.509 |
| −15 | 1.000 | 0.905 | 0.809 | 0.714 | 0.619 | 0.524 |
| −10 | 1.000 | 0.912 | 0.824 | 0.736 | 0.648 | 0.560 |
| −5 | 1.000 | 0.927 | 0.854 | 0.781 | 0.708 | 0.634 |
| 0 | 1.000 | 0.950 | 0.900 | 0.850 | 0.800 | 0.750 |
| 5 | 1.000 | 0.973 | 0.946 | 0.919 | 0.892 | 0.866 |
| 10 | 1.000 | 0.988 | 0.976 | 0.964 | 0.952 | 0.940 |
| 15 | 1.000 | 0.995 | 0.991 | 0.986 | 0.981 | 0.976 |
| 20 | 1.000 | 0.998 | 0.996 | 0.995 | 0.993 | 0.991 |
| 25 | 1.000 | 0.999 | 0.999 | 0.998 | 0.997 | 0.997 |

Figure 9:
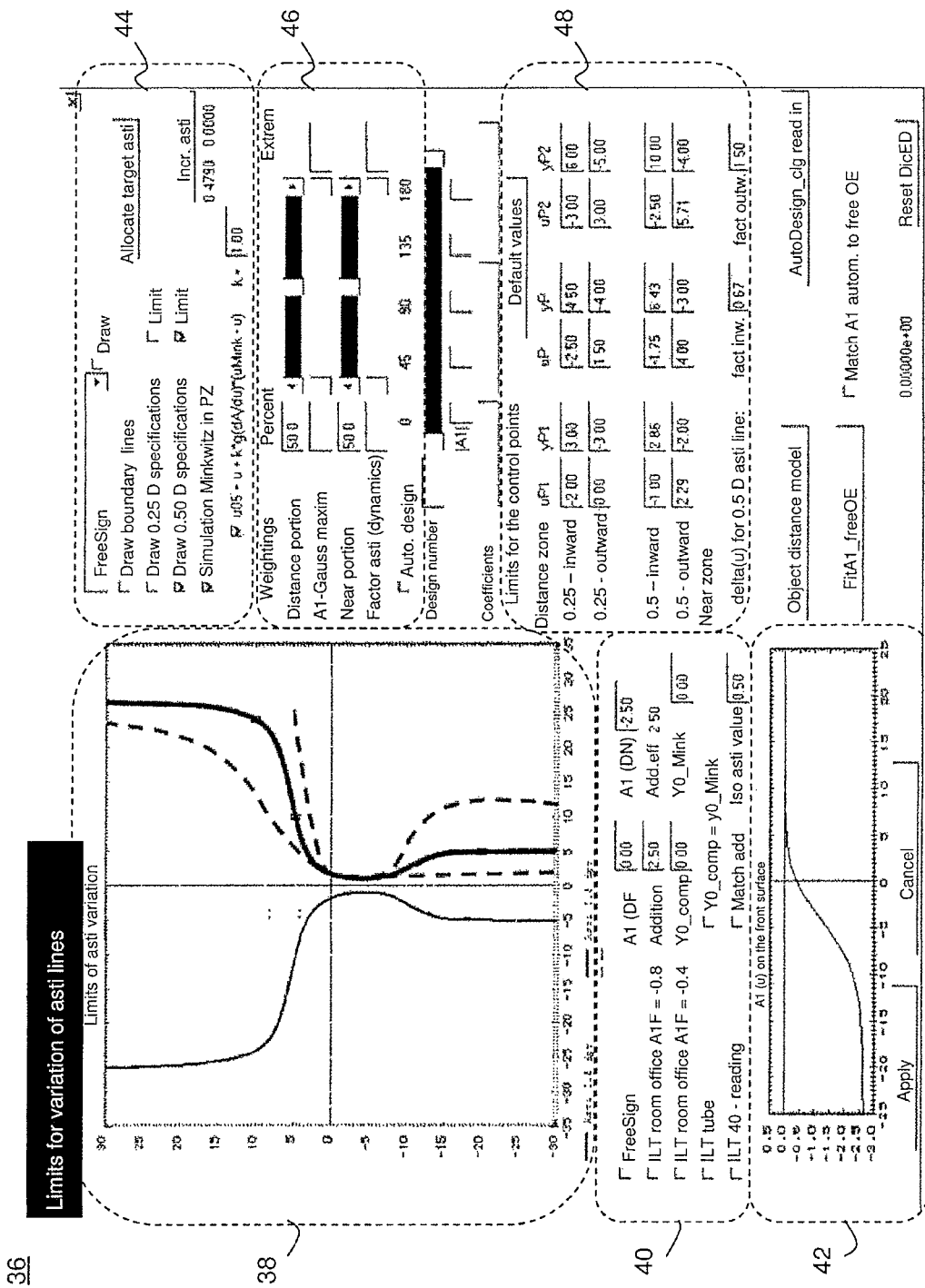
FIG. 9 illustrates an example of a graphical user interface for changing a starting design.

FIG. 9 shows an exemplary graphical user interface 36, which allows inputting and optionally changing parameters of the starting design. Moreover, the graphical user interface shown in FIG. 9 allows changing the starting design.

In section or area 38 of FIG. 9, the construction lines of the starting design or of the transformed starting design as well as the corresponding control points are shown. Likewise, the limits (in the form of boundary lines) within which the base target isoastigmatism line 12 or its course can be changed, i.e. the innermost base target isoastigmatism line 12-$i$ and the outermost base target isoastigmatism line 12-$a$ can be changed.

The section 40 or area of the graphical user interface 36 allows the selection from among different design types for a progressive spectacle lens and the indication of the addition.

In section or area 42 of the graphical user interface 36, the object distance function can be visualized. The section 44 of the graphical user interface 30 allows selecting the to-be-transformed construction lines to display and optionally change them. In section 46 of the graphical user interface 36, the individual weightings $g_F$, $g_N$ and $g_D$ can be input. In section 48 of the graphical user interface 36, the coordinates of the control points for the boundary lines (i.e. for the innermost and the outermost 0.5 D base target isoastigmatism line as well as for the innermost and the outermost additional 0.25 D target isoastigmatism line) can be indicated or displayed.

A design proposal with changed target astigmatism values can be automatically calculated and visualized on the basis of the input data.

As has been explained above, the calculation of optimization of the spectacle lens is performed by minimizing a target function of the form:

$$F(\vec{x}) = \sum_{i=1}^{m} [g_{i,Ast}(Ast_i - Ast_{i,target})^2 + \ldots],$$

$Ast_{i,t\ arg\ et}$ is the target value of the local astigmatic deviation or the local astigmatic error at the $i^{th}$ evaluation point;
$Ast_i$ is the actual value of the local astigmatic deviation or the local astigmatic error at the $i^{th}$ evaluation point;
$g_{i,Ast}$ is the local weighting of the astigmatic deviation or the local astigmatic error at the $i^{th}$ evaluation point.

In the above formula, $Ast_{i,t\ arg\ et}$ is the previously determined target astigmatism distribution, assigned to the progressive spectacle lens design, in the respective $i^{th}$ evaluation point.

Further preferably, the refractive error $\Delta R$ is also taken into account in the target function, so that the calculation or optimization of the spectacle lens comprises minimizing the target function:

$$F(\vec{x}) = \sum_{i=1}^{m} [g_{i,\Delta R}(\Delta R_i - \Delta R_{i,target})^2 + g_{i,Ast}(Ast_i - Ast_{i,target})^2 + \ldots]$$

wherein
$\Delta R_{i,t\ arg\ et}$ is the target value of the local refractive error at the $i^{th}$ evaluation point;
$\Delta R_i$ is the actual value of the local refractive error at the $i^{th}$ evaluation point;
$g_{i,\Delta R}$ is the local weighting of the refractive error at the $i^{th}$ evaluation point;
The weighting factors $g_{i,Ast}$ in the target function are generally specified for the basic or starting design, so that a good optimization result can be obtained. If the astigmatism distribution is changed afterward, for example by stretching or compression in the vertical direction and/or by a transformation of the respective viewing zone by a modification of the base target isoastigmatism line and/or by further transformations, than it might be advantageous to accordingly adapt the local weighting $g_{i,Ast}$ as well. For example, viewing in zones in which small astigmatic errors (small $Ast_{t\ arg\ et}$) are specified can receive a higher weighting than the peripheral viewing zones. A change of the design-specific local weighting associated with the starting design is then only required for extreme design modifications.

For example, the local weighting $g_{i,Ast}$ can be adapted to the actual course of the astigmatism as follows:

$$g_{i,Ast} = g_{i,Ast}(Ast) = \frac{1}{Ast_{i,target}^p}.$$

For values of the target astigmatism $Ast_{t\ arg\ et} < 1.0$, the function $$\frac{1}{Ast_{i,target}^p}$$

becomes greater than 1 and for values $Ast_{t\ arg\ et} > 1.0$, the function becomes smaller than 1. The greater the power, p the steeper the function and the more the zones are weighted with $Ast_{t\ arg\ et} < 1.0$.

According to a further embodiment, it holds for the local weighting $g_{i,Ast}$:

$$g_{i,Ast} = \frac{1}{Ast_{i,target}^p}$$

for $Ast_{t\ arg\ et} \leq 1.0$ and
$g_{i,Ast} = 1$ for $Ast_{t\ arg\ et} > 1.0$.

The local weighting $g_{i,\Delta R}$ of the refractive error in the $i^{th}$ evaluation point can be scaled in a similar way depending on the amount of the refractive error.

Figure 10:
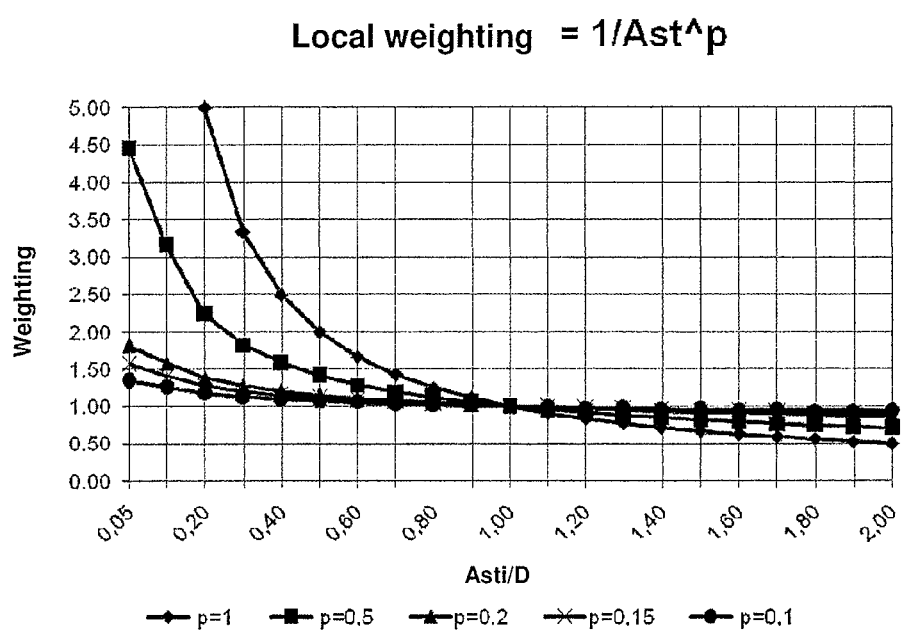
FIG. 10 illustrates an example of an adaptation of the local weightings of the support points.

FIG. 10 shows the local weighting $g_{i,Ast}$ as a function of the astigmatism in D for different values of the power p (p=1, p=0.5, p=0.2, p=0.15, p=0.1).

The calculation or optimization of the spectacle lens can further be performed taking at least part of the individual data of the spectacle wearer into account.

FIG. 11 shows an example of a graphical user interface 48 for inputting and changing the local weightings. In section or area 50 of the graphical user interface 48, the local weightings $$g_{i,Ast} = \frac{1}{Ast_{i,target}^p},$$

in particular the power p, as well as the local weightings for $Ast_{max}$ and $Ast_{min}$ can be input and/or optionally changed. In section 52 of the graphical user interface 50, additional weightings for the distance portion or zone can be specified. Likewise, the section 52 can include an input mask for inputting and/or modifying the full width at half maximum or distribution width of the distance zone. In section 54 of the graphical user interface 50, additional weightings for the near portion or zone can be specified. With the additional weightings, the general weighting functions can be influenced in the optimization. Likewise, the section 54 can include an input mask for inputting and/or modifying the full width at half maximum or distribution width of the near zone.

The additional weightings for the distance and/or near portion as well as the threshold values for the additional weightings can be specified in advance. In particular, the threshold values can be defined by optimization tests in the design determination.

FIGS. 12a and 12b show two exemplary target astigmatism distributions and the corresponding distributions of the actual astigmatism (in the position of wear) of progressive spectacle lenses calculated or optimized according to the respective target astigmatism distribution.

The target astigmatism distributions shown in FIGS. 12a-1 and 12b-1 each exhibit a principal line 10 and base target isoastigmatism lines 12 and 12'. The course of the base target isoastigmatism line 12 or 12' in the progression zone is calculated according to the current object distance course and the accommodation model. The target astigmatism distributions shown in FIGS. 12a-1 and 12b-1 are obtained by a transformation of the same starting design, wherein the transformation comprises a modification of the position of the specified control points and a modification of the object distance. Thus, the course of the base target isoastigmatism line can be adapted to the object distance course in an optimum way.

FIGS. 12a-2 and 12b-2 each show the refractive power course along the principal line 10 of the respective target astigmatism distribution. FIGS. 12a-3 and 12b-3 each show the actual astigmatism of a progressive spectacle lens calculated or optimized according to the target astigmatism distribution shown in FIGS. 12a-1 and 12b-1, respectively.

Likewise, it is possible to calculate the course of the base target isoastigmatism line by combining the course determined using the Minkwitz theorem (Minkwitz model in short) and the course determined from the current object distance course and the accommodation model (asti model in short). For example, the distance of the base target isoastigmatism line from the principal line $u_{05}$ can be determined according to the formula:

$$u_{05} = u_{Asti-Modell} + g(u_{Minkwitz} - u_{Asti-Modell}),$$

wherein:

$u_{Asti-Modell}$ designates the distance of the base target isoastigmatism line from the principal line determined from the current object distance course and the accommodation model;

$u_{Minkwitz-Modell}$ designates the distance of the base target isoastigmatism line from the principal line determined according to the Minkwitz theorem; and g designates a weighting of the two models.

For g=1, $u_{05}=u_{Minkwitz-Modell}$ holds (course according to Minkwitz). For g=0, $u_{05}=u_{Asti-Modell}$ holds (course according to astigmatism model). As explained above, the factor g can be calculated or determined according to the formula:

$$g(A') = \frac{A' - A'_{min}}{A'_{max} - A'_{min}}.$$

Thus, the factor g is a function of the slope $$A' = \frac{dA}{du} \text{(i.e. } g = g\left(\frac{dA}{du}\right)\text{)}.$$

Figure 13A:
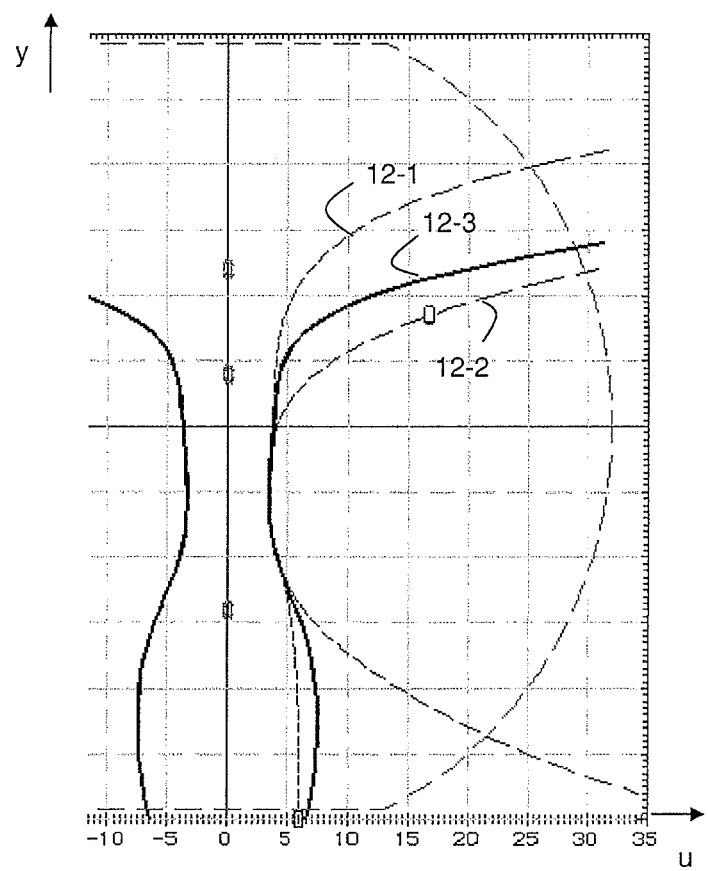
FIG. 13a provides examples of base target isoastigmatism lines calculated according to the Minkwitz theorem, on the basis of the actual object distance course and the accommodation model, as well as on the basis of a combination of the two models.
Figure 13B:
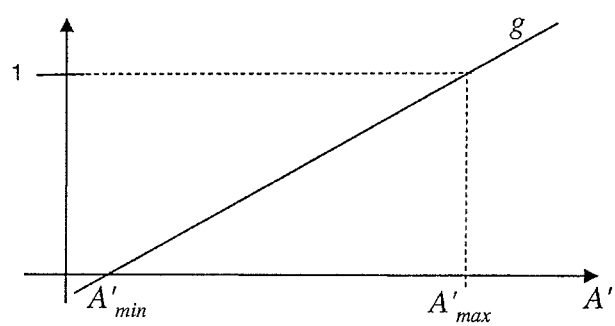
FIG. 13b illustrates an example of a weighting of the two models.

FIG. 13a shows examples of base target isoastigmatism lines calculated according to the Minkwitz theorem (line 12-1), on the basis of the current object distance course and the accommodation model (line 12-2), and on the basis of a combination of the two models (line 12-3). FIG. 13b illustrates the calculation g depending on the increase of the astigmatism A'.

FIGS. 14a and 14b show examples of graphical user interfaces 56 (FIG. 14a) and 58 (FIG. 14b) for inputting the parameters of the base target isoastigmatism line. In section 60 of the graphical user interface 58, the user can specify whether the base target isoastigmatism line is calculated according to the Minkwitz theorem or according to a model;

$$u_{05} = u_{Asti-Modell} + k * g\left(\frac{dA}{du}\right) * (u_{Minkwitz} - u_{Asti-Modell}),$$

wherein k designates a predetermined or predeterminable additional prefactor.

After the course of the base target isoastigmatism line has been specified, a target astigmatism distribution exhibiting this base target isoastigmatism line is calculated or determined. In particular, as described above, the target astigmatism values between the principal line and the base target isoastigmatism line can be calculated by an interpolation (e.g. a linear, quadrangular, or cubic interpolation) between the target astigmatism values on the principal line and the target astigmatism values on the base target isoastigmatism line. In the periphery of the spectacle lens, the target astigmatism values can be calculated according to the above-described parallel curve model method, according to the above-described truncated cone model method, or according to a combination of the two methods.

Figure 15:
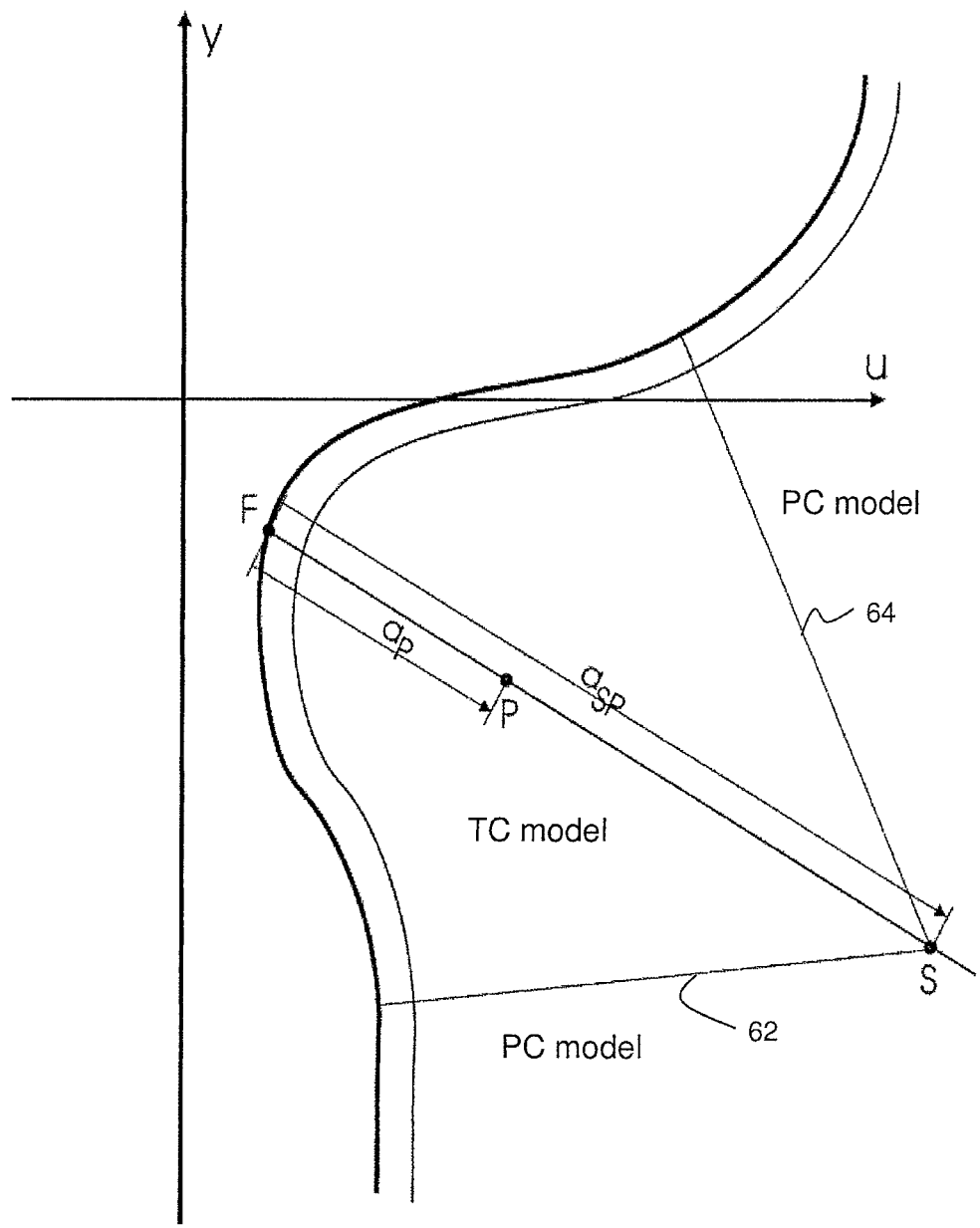
FIG. 15 provides an example of the calculation of the target astigmatism values in the periphery of the spectacle lens.

FIG. 15 illustrates the calculation of the target astigmatism values in the periphery of the spectacle lens according to the parallel curve model method (referred to as PC model in FIG. 15) and according to the truncated cone model method (referred to as TC model in FIG. 15). In FIG. 15, in the central zone of the spectacle lens (i.e. the zone between the straight lines 62 and 64), the truncated cone model method is used to calculate the target astigmatism values in the periphery, and the parallel curve model method is used in the distance and near portions.

Moreover, in FIG. 15:

point P(u,y) designates an arbitrary point in the periphery of the spectacle lens or of the spectacle lens design;

point $S(u_{SP}, y_{SP})$ designates the tip of the truncated cone;

point $F(u_F, y_F)$ designates the intersection of the straight line passing through the points P and S and the limiting curve of the truncated cone.

Furthermore, it holds:

$$a_{SP} = \sqrt{(u_{SP} - u_F)^2 + (y_{SP} - u_F)^2}$$

$$a_P = \sqrt{(u_P - u_F)^2 + (y_P - u_F)^2}.$$

Figure 17A:
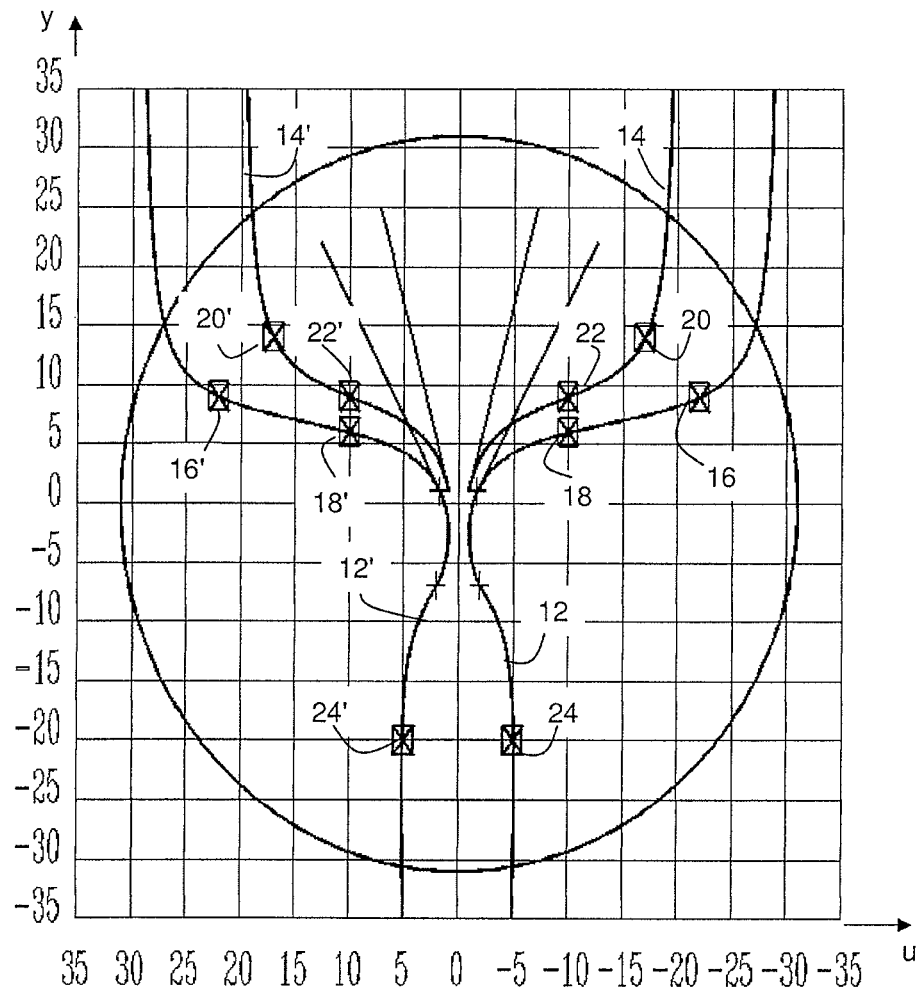
FIG. 17a illustrates construction lines and control points of a starting design.
Figure 17B:
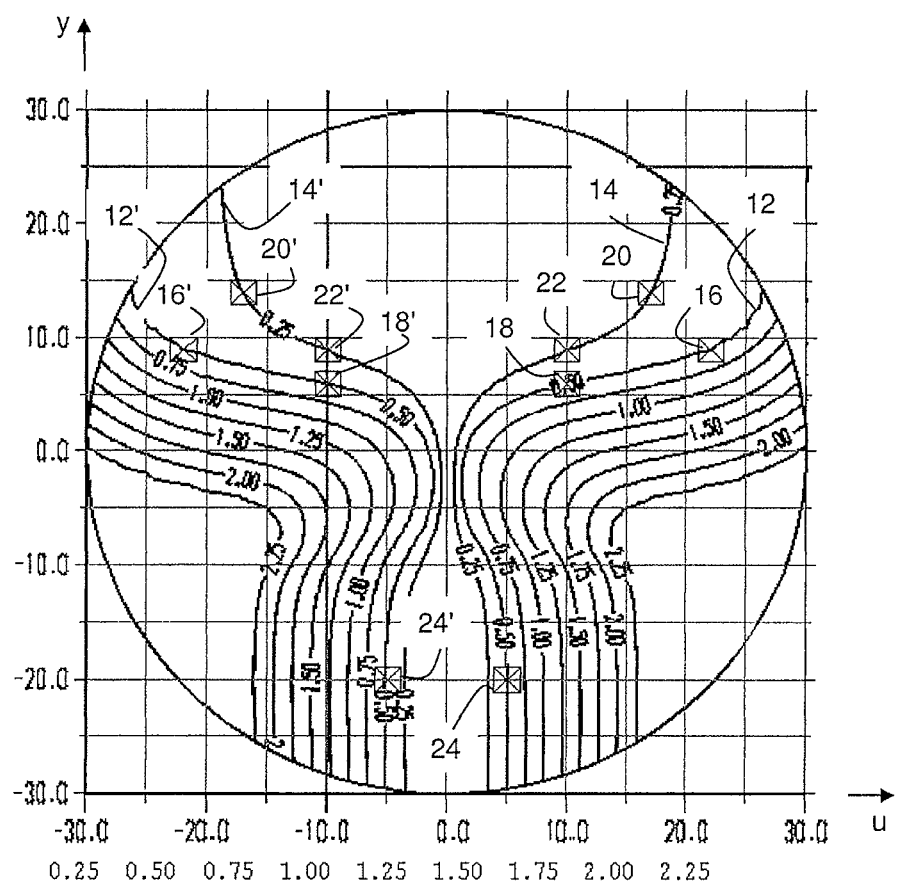
Figure 17C:
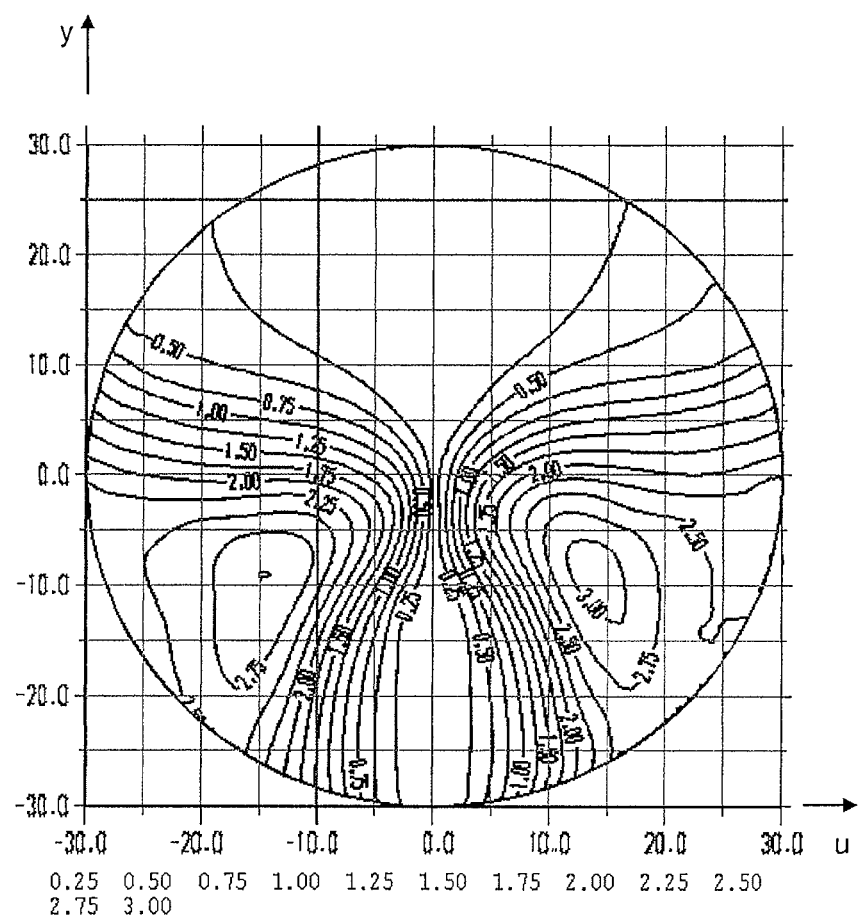
FIG. 17c illustrates an actual astigmatism distribution (in the position of wear) of a spectacle lens optimized according to the target astigmatism distribution illustrated in FIG. 17b.

FIGS. 16a and 16b show examples of graphical user interfaces 66 and 68 for inputting and changing the control points with input parameters of a starting design (graphical user interface 66 in FIG. 16a) and for inputting and changing the maximum variation of the control points of the starting design (graphical user interface 68 in FIG. 16b). The starting design is shown in FIGS. 17a to c. FIGS. 19 to 25 show transformed designs, which are derived from the starting design.

For all designs shown in FIGS. 17 to 25, the distance reference point $B_F$ is at a vertical height of 8 mm ($y_{B_F}$=8 mm), the centration point $B_Z$ at a vertical height of 4 mm ($y_{B_Z}$=4 mm), and the near reference point $B_N$ at a vertical height of −14 mm ($y_{B_N}$=−14 mm).

The progressive spectacle lens design shown in FIGS. 17 to 25 relate to spectacle lens designs for a progressive spectacle lens with the parameters: sph=0.50 D, cyl=0.00 D, addition=2.5 D. The spectacle lens is in a position of wear with the parameters:
- pupillary distance right ($PD_R$)=32 mm;
- pupillary distance left ($PD_L$)=32 mm;
- corneal vertex distance (CVD)=13 mm;
- forward inclination=7°;
- face form angle=0° (i.e. no tilt of the spectacle lens to the vertical position).

The base curve $D_1$ of the front surface is 5.5 D. The radius of the spherical front surface is 95.4545 mm. The refractive index of the spectacle lens n is equal to 1.597.

The reciprocal object distance in D on the principal line is described by the double-asymptote function:

$$S_1(u_0, y) = b_s + \frac{a_s}{(1+e^{c_s(y+d_s)})^{m_s}} = -2.59 + \frac{2.61}{(1+e^{-0.46(y+2.2)})^{0.75}}.$$

In all of FIGS. 17 to 25, the spectacle lens design has a principal line 10, a base target isoastigmatism line 12, and an additional target isoastigmatism line 14. The course of the base target isoastigmatism line 12 and of the additional target isoastigmatism line 14 is automatically changed on the basis of the weightings of the viewing zones (i.e. weightings of the distance and/or near zone(s)) and optionally the weighting of the dynamics. Subsequently, a target astigmatism distribution, which exhibits the respective base target isoastigmatism line 12 and the additional target isoastigmatism line 14, is calculated automatically.

The calculation of the target astigmatism distribution between the target astigmatism values on the principal line 10 and the target astigmatism values on the additional target isoastigmatism line 14 is performed by a linear interpolation in the progression zone and by a quadrangular parable in the distance and near zones. The transition of the exponent is linear:

$$A(u) = A_0 + k \cdot u^{p(y)},$$

wherein 1≤p(y)≤2 holds.

Thus, it is possible to achieve a smoother horizontal increase of the target astigmatism in the distance and near zones.

Between the target astigmatism values on the additional target isoastigmatism line 14 and the base target isoastigmatism line 12, the calculation of the target astigmatism values is performed by a linear interpolation. In the periphery, the calculation of the target astigmatism distribution is performed according to the above-described truncated cone model.

FIGS. 17a to 17c each show the construction lines and control points of the starting design (FIG. 17a), the target astigmatism distribution of the starting design illustrated in FIG. 17a (FIG. 17b), and the actual astigmatism distribution (in the position of wear) of a spectacle lens optimized according to the target astigmatism distribution illustrated in FIG. 17b (FIG. 17c).

In the distance portion, the 0.5 D base target isoastigmatism line 12 of the starting design is described by an arctan function (arctangent representation). In the periphery, the target astigmatism distribution is calculated according to the above-described truncated cone model. The weightings of the distance and near portions are each ($g_F=g_N$=50%). The weighting of the dynamics $g_D$ is 0%. Also, the starting design comprises an additional 0.25 D target isoastigmatism line 14 in the distance portion.

FIGS. 16a and 16b show the positions of the control points (main points) and the maximally admissible variation of the positions of the control points of the 0.5 D base target isoastigmatism line and the additional 0.25 D target isoastigmatism line.

Table 3 below indicates the positions of the control points of the base target isoastigmatism line and of the additional target isoastigmatism line of the starting design. The control points are arranged symmetrically with respect to the principal line. Therefore, only the temporal control points (u>0) are indicated.

TABLE 3

| 0.25 D target isoastigmatism line | 0.5 D base target isoastigmatism line |
|---|---|
| First control point in distance portion: u = 10.00 mm; y = 9.00 mm | First control point in distance portion: u = 10.00 mm; y = 6.00 mm |
| Second control point in distance portion: u = 17.00 mm; y = 14.00 mm | Second control point in distance portion: u = 22.00 mm; y = 9 mm |
| | Control point in near portion u = 5 mm; y = −20 mm |

The control points in the distance portion can be shifted both horizontally and vertically. It holds:

$$\vec{r} = \vec{r}_0 + t\vec{v} =,$$

$$t = mt_{a,i} = \left(\frac{g_F}{50} - 1\right)t_{a,i},$$

wherein $\vec{r}_0$ designates the position of the respective control point of the starting design, $\vec{r}$ designates the position of the shifted control point, and $t_{a,i}$ designates the maximally admissible outward and inward shift, respectively. For $g_F$<50%, the corresponding control point in the distance portion is shifted inward/upward. For $g_F$>50%, the corresponding control point in the distance portion is shifted outward/downward.

In this example, the control point of the 0.5 D base target isoastigmatism line in the near portion can be shifted merely horizontally. It holds:

$$u_N = u_0\left(1 + \left(\frac{g_N}{50} - 1\right)v_N\right),$$

wherein $u_0$ designates the horizontal distance from the principal line of the third control point in the near portion of the starting design, and $u_N$ designates the horizontal distance from the principal line of the shifted control point in the near portion.

Table 4 below shows the maximally admissible variations of the positions of the control points:

TABLE 4

| 0.25 D target isoastigmatism line | 0.5 D base target isoastigmatism line |
|---|---|
| First control point in distance portion: Maximum inward variation: u = −2.00 mm; y = 3.00 mm Maximum outward variation: u = 0.00 mm; y = −3.00 mm Second control point in distance portion: Maximum inward variation: u = −3.00 mm; y = 7.00 mm Maximum outward variation: u = 3.00 mm; y = −5.00 mm | First control point in distance portion: Maximum inward variation: u = −1.00 mm; y = 2.00 mm Maximum outward variation: u = 1.00 mm; y = −2.00 mm Second control point in distance portion: Maximum inward variation: u = −2.50 mm; y = 7 mm Maximum outward variation: u = 2.5 mm; y = −4.00 mm Third control point in near portion: Only horizontal shift Factor inward $v_N$ = 0.67 Factor outward $v_N$ = 1.50 |

Table 5 below shows the connection between the distance and near portion weightings $g_F$ and $g_N$ and the control points in the design modification.

TABLE 5

| | | $g_F < 50\%$ inward/upward shift | $g_F > 50\%$ outward/downward shift |
|---|---|---|---|
| 0.25 D line | First control point in distance portion | $\vec{r}_1 = \begin{pmatrix} u_1 \\ y_1 \end{pmatrix} = \begin{pmatrix} 10 \\ 9 \end{pmatrix} + \left(\frac{g_F}{50} - 1\right)\begin{pmatrix} -2 \\ 3 \end{pmatrix}$ | $\vec{r}_1 = \begin{pmatrix} u_1 \\ y_1 \end{pmatrix} = \begin{pmatrix} 10 \\ 9 \end{pmatrix} + \left(\frac{g_F}{50} - 1\right)\begin{pmatrix} 0 \\ -3 \end{pmatrix}$ |
| 0.25 D line | Second control point in distance portion | $\vec{r}_2 = \begin{pmatrix} u_2 \\ y_2 \end{pmatrix} = \begin{pmatrix} 17 \\ 14 \end{pmatrix} + \left(\frac{g_F}{50} - 1\right)\begin{pmatrix} -3 \\ 7 \end{pmatrix}$ | $\vec{r}_2 = \begin{pmatrix} u_2 \\ y_2 \end{pmatrix} = \begin{pmatrix} 17 \\ 14 \end{pmatrix} + \left(\frac{g_F}{50} - 1\right)\begin{pmatrix} 3 \\ -5 \end{pmatrix}$ |
| 0.50 D line | First control point in distance portion | $\vec{r}_1 = \begin{pmatrix} u_1 \\ y_1 \end{pmatrix} = \begin{pmatrix} 10 \\ 6 \end{pmatrix} + \left(\frac{g_F}{50} - 1\right)\begin{pmatrix} -1 \\ 2 \end{pmatrix}$ | $\vec{r}_1 = \begin{pmatrix} u_1 \\ y_1 \end{pmatrix} = \begin{pmatrix} 10 \\ 6 \end{pmatrix} + \left(\frac{g_F}{50} - 1\right)\begin{pmatrix} 1 \\ -2 \end{pmatrix}$ |
| 0.50 D line | Second control point in distance portion | $\vec{r}_2 = \begin{pmatrix} u_2 \\ y_2 \end{pmatrix} = \begin{pmatrix} 22 \\ 9 \end{pmatrix} + \left(\frac{g_F}{50} - 1\right)\begin{pmatrix} -2.5 \\ 7 \end{pmatrix}$ | $\vec{r}_2 = \begin{pmatrix} u_2 \\ y_2 \end{pmatrix} = \begin{pmatrix} 22 \\ 9 \end{pmatrix} + \left(\frac{g_F}{50} - 1\right)\begin{pmatrix} 2.5 \\ -4 \end{pmatrix}$ |
| 0.50 D line | Third control point in near portion | $u_N = 5\left(1 + \left(\frac{g_N}{50} - 1\right)0.67\right)$ $y_N = -20$ | $u_N = 5\left(1 + \left(\frac{g_N}{50} - 1\right)1.5\right)$ $y_N = -20$ |

First Modification of the Starting Design

FIG. 18 shows an example of a graphical user interface 70 for inputting and changing the positions of the control points with input parameters of a first transformed design according to a first modification of the starting design.

Figure 19A:
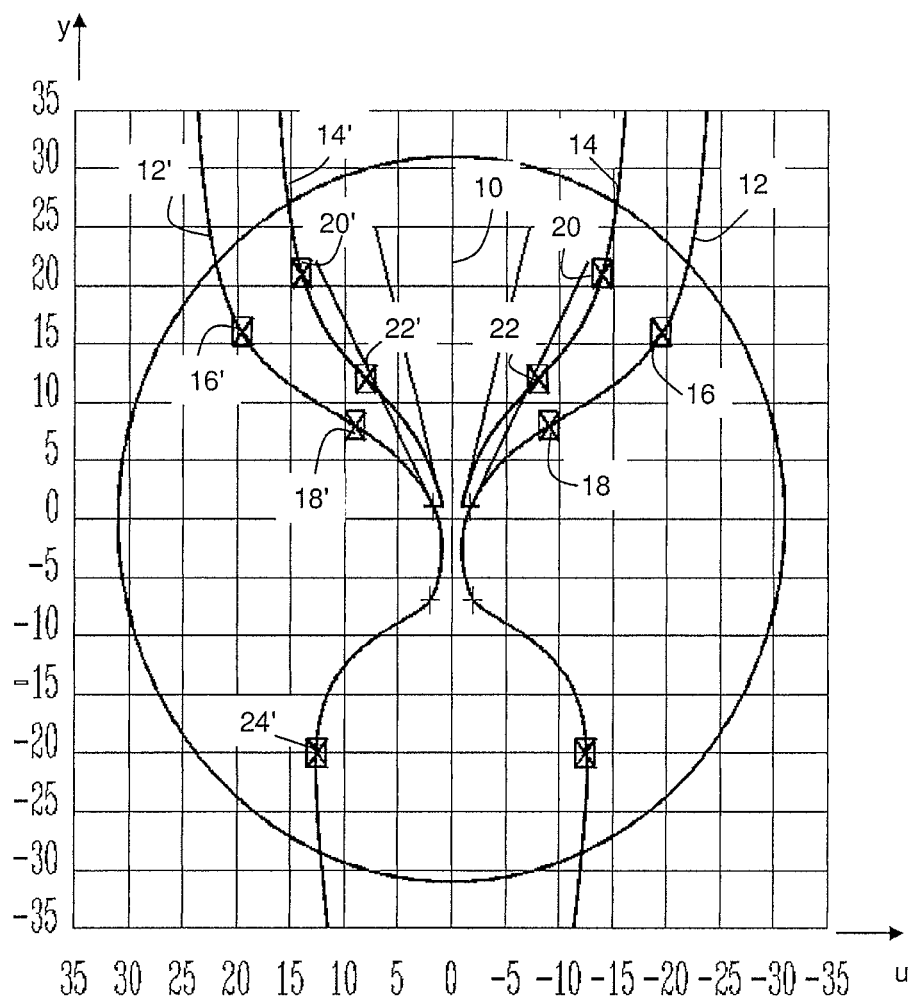
FIG. 19a illustrates construction lines and control points of the first transformed design.
Figure 19B:
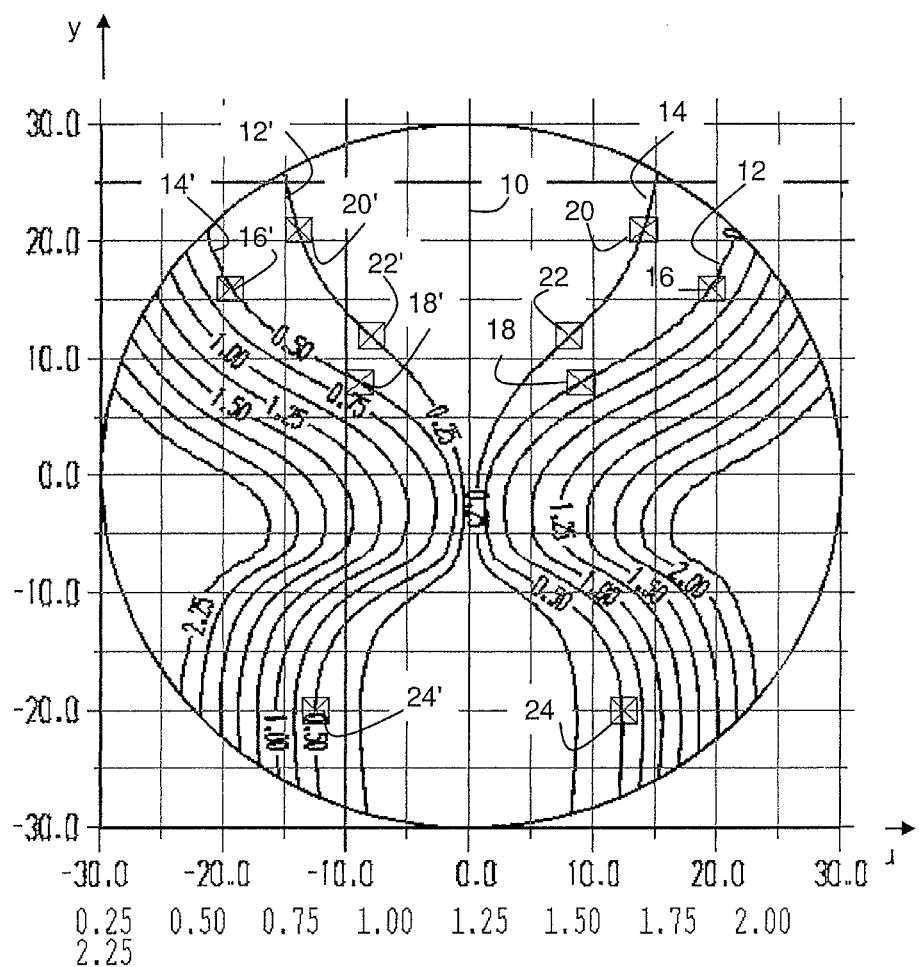

FIGS. 19a and 19b show the first transformed design, wherein FIG. 19a shows the construction lines—principal line 10, base target isoastigmatism line 12, and additional target isoastigmatism line 14—and the corresponding control points 16 to 24; FIG. 19b shows the corresponding target astigmatism distribution of the transformed design illustrated in FIG. 19a. The base target isoastigmatism line in the distance portion is described by an arctan function (arctangent representation), like with the starting design.

In this design modification, the distance and near portions are weighted differently. For example, the weighting of $g_F$=0% and the weighting of the near portion $g_N$=100%. The weighting of the dynamics $g_D$ is 0%. The shift of the control points is calculated automatically on the basis of the weightings. The course of the base target isoastigmatism line 12 and of the additional target isoastigmatism line 14 is changed such that they pass through the correspondingly shifted control points. Subsequently, a target astigmatism distribution, which exhibits the changed base and additional target isoastigmatism lines, is determined by interpolation. The thus calculated target astigmatism distribution is shown in FIG. 19b. Optionally, the thus calculated target astigmatism distribution can be modified further e.g. by multiplication by a scaling factor, an adaptation of the maximally admissible astigmatism value, or a further modification.

Figure 19C:
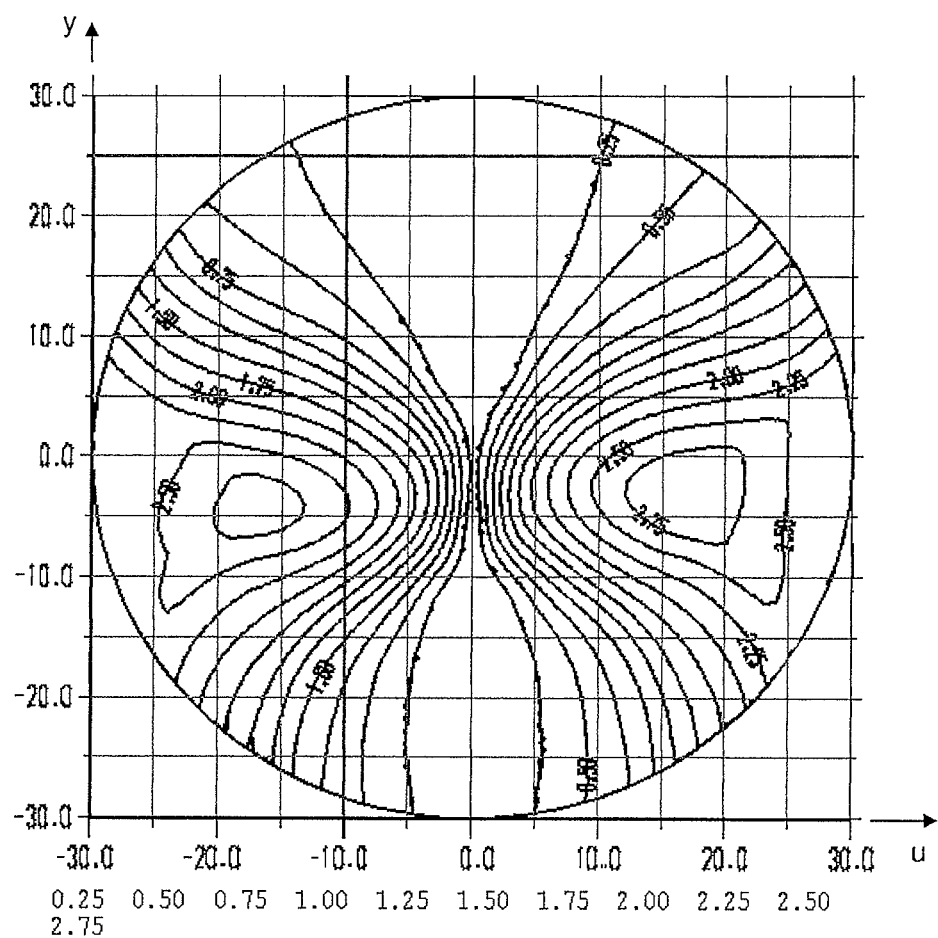
FIG. 19c actual astigmatism distribution (in the position of wear) of a spectacle lens optimized according to the target astigmatism distribution illustrated in FIG. 19b.

FIG. 19c shows the actual astigmatism distribution (in the position of wear) of a spectacle lens optimized according to the target astigmatism distribution illustrated in FIG. 19b.

With the first transformation or modification of the starting design illustrated in FIGS. 17a,b, a progressive spectacle lens design or a progressive spectacle lens with an extremely near portion-oriented design can be obtained automatically.

Second Modification of the Starting Design

FIG. 20 shows an example of a graphical user interface 72 for inputting and changing the control points with input parameters of a second transformed design, which is calculated automatically by a modification of the starting design shown in FIGS. 17a,b.

Figure 21A:
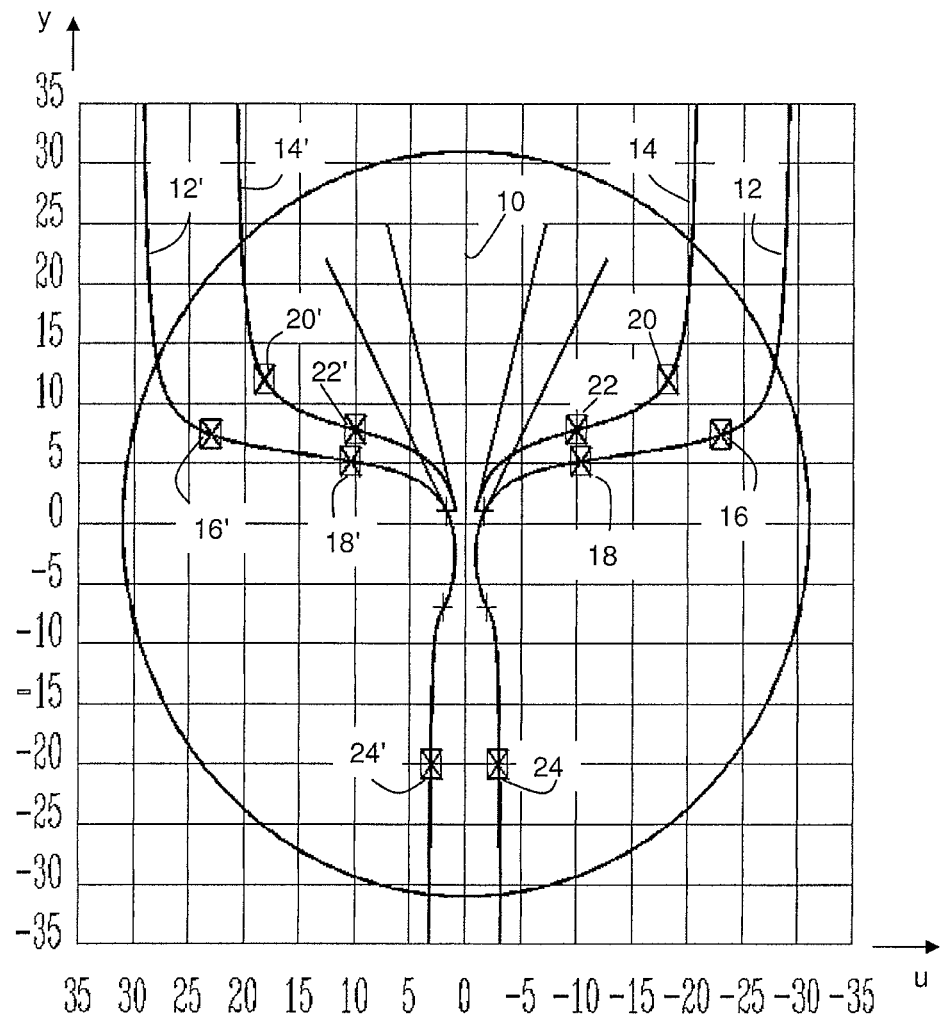
FIG. 21a illustrates construction lines and control points of the second transformed design.
Figure 21B:
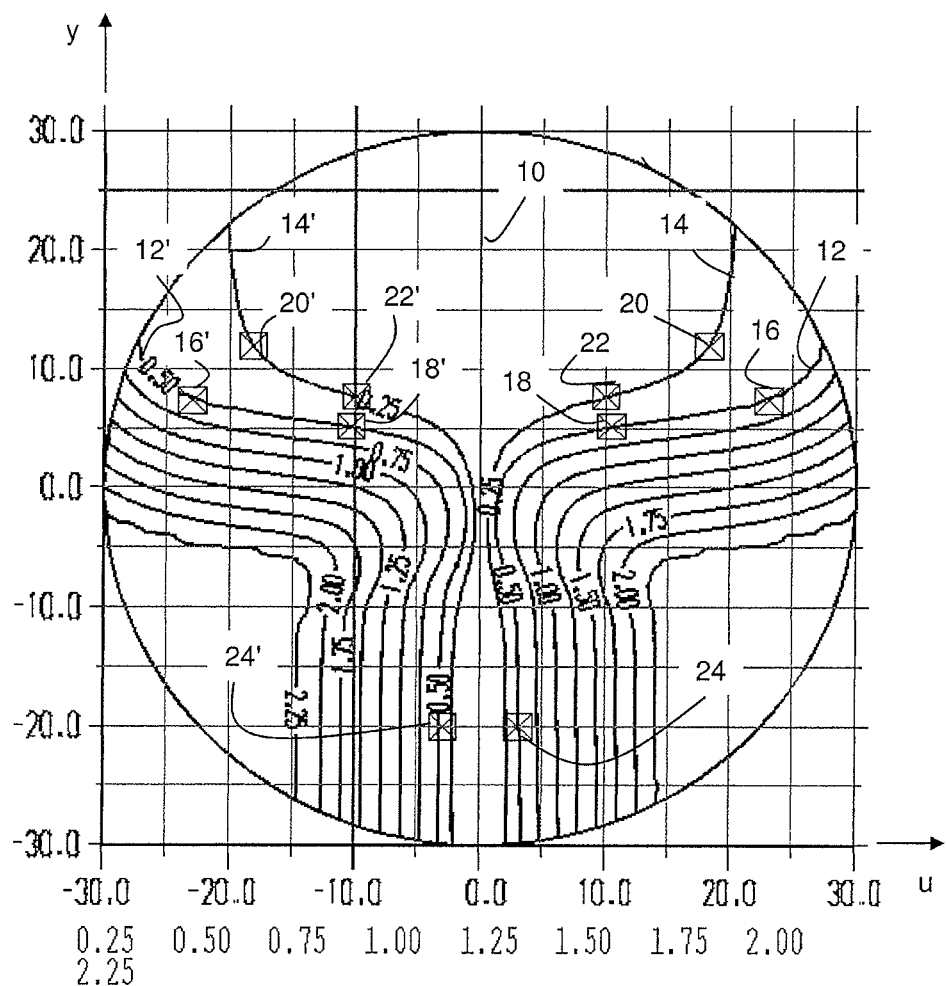

FIGS. 21a and 21b show the second transformed design, wherein FIG. 21a illustrates the construction lines—principal line 10, base target isoastigmatism line 12, and additional target isoastigmatism line 14—and the corresponding control points 16 to 24, and FIG. 21b illustrates the corresponding target astigmatism distribution of the transformed design illustrated in FIG. 21a. The base target isoastigmatism line in the distance portion is also described by an arctan function (arctangent representation), like with the starting design.

In this second design modification, the weighting of the distance portion is $g_F$=70% and the weighting of the near portion $g_N$=20%. The weighting of the dynamics $g_D$ is 0%. The shift of the control points is calculated automatically on the basis of the new weightings $g_F$ and $g_N$. The course of the base target isoastigmatism line 12 and of the additional target isoastigmatism line 14 is changed such that they pass through the correspondingly shifted control points. Subsequently, a target astigmatism distribution, which exhibits the changed base and additional target isoastigmatism lines, is determined by interpolation, which is shown in FIG. 20b. Optionally, the thus calculated target astigmatism distribution can be modified further e.g. by multiplication by a scaling factor, an adaptation of the maximally admissible astigmatism value, or a further modification.

Figure 21C:
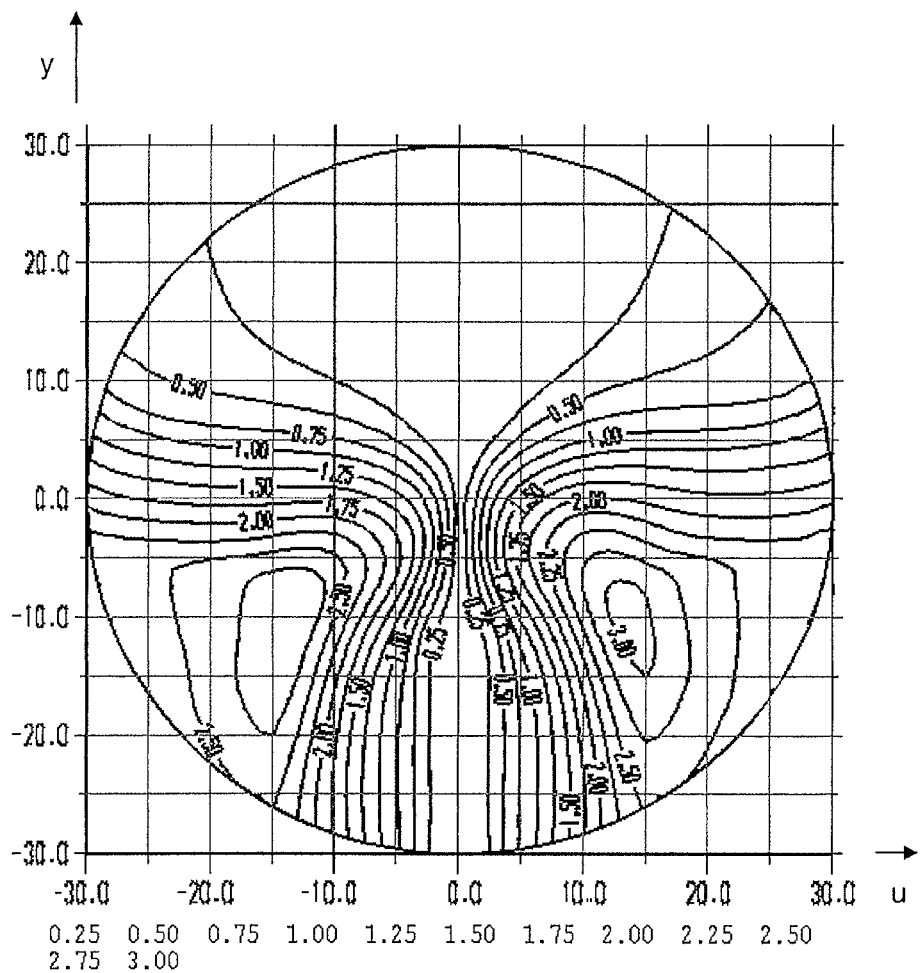
FIG. 21c actual astigmatism distribution (in the position of wear) of a spectacle lens optimized according to the target astigmatism distribution illustrated in FIG. 21b.

FIG. 21c shows the actual astigmatism distribution (in the position of wear) of a spectacle lens optimized according to the target astigmatism distribution illustrated in FIG. 21b.

With the second transformation or modification of the starting design illustrated in FIGS. 17a,b, a progressive spectacle lens design or a progressive spectacle lens with a slight emphasis on the distance portion (50%→70%) at the expense of the near portion (50%→20%) can be obtained automatically.

Third Modification of the Starting Design

FIG. 22 shows an example of a graphical user interface 74 for inputting and changing the positions of the control points with input parameters of a third transformed design, which is calculated automatically by a modification of the starting design shown in FIGS. 17a,b.

Figure 23A:
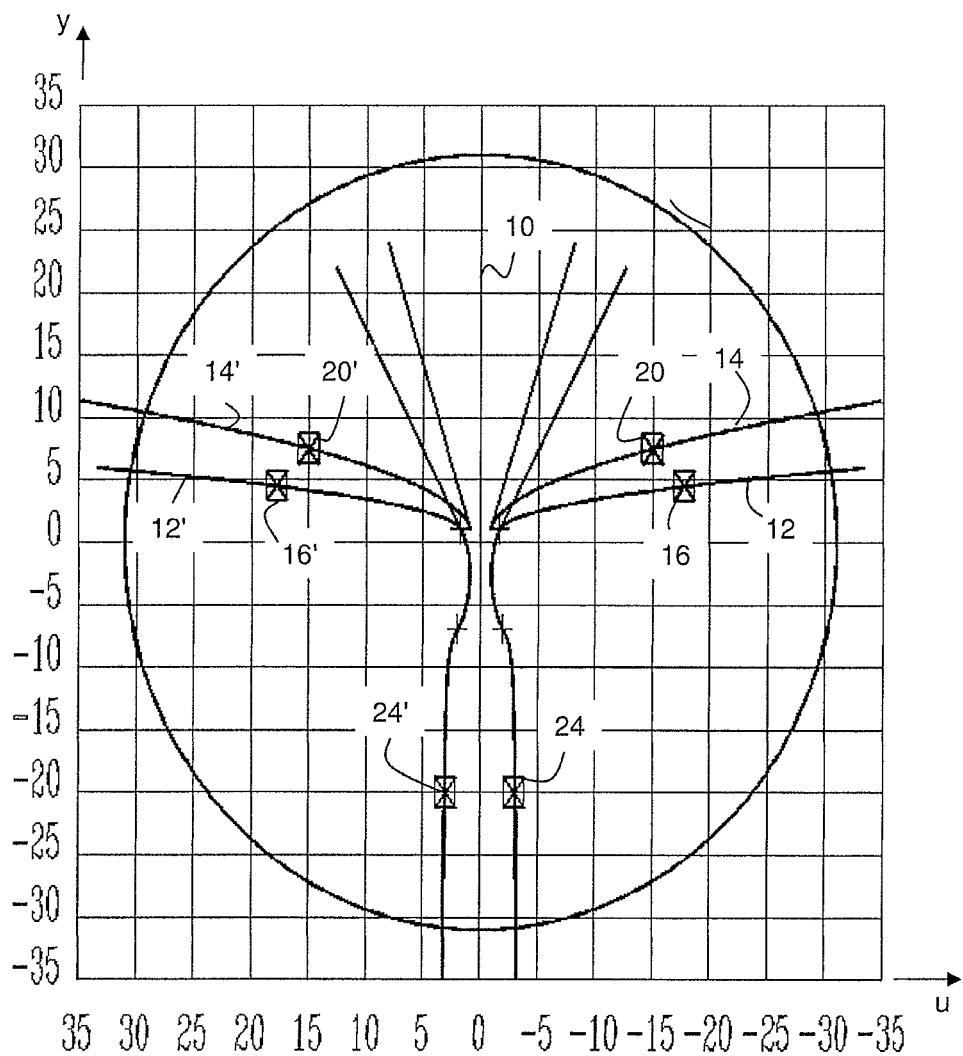
FIG. 23a illustrates construction lines and control points of the third transformed design.
Figure 23B:
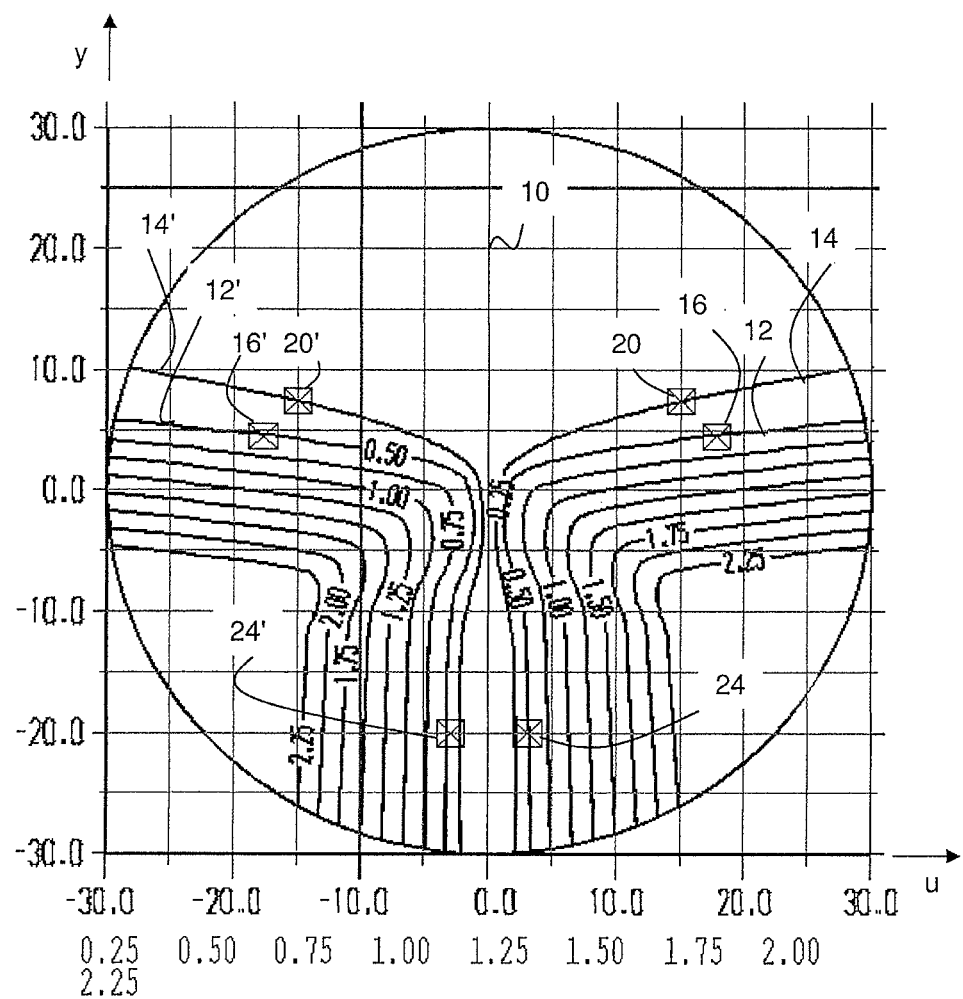

FIGS. 23a and 23b show the third transformed design, wherein FIG. 23a shows the construction lines—principal line 10, base target isoastigmatism line 12, and additional target isoastigmatism line 14—and the corresponding control points 16 to 24; FIG. 23b shows the corresponding target astigmatism distribution of the transformed design illustrated in FIG. 23a.

Unlike in the first or the second modification, one switches from the arctangent representation to the polynomial representation for the representation of the base target isoastigmatism line 12 and the additional target isoastigmatism line 14 in this modification. The respective control point $(u_P, y_P)$ for the polynomial representation (i.e. the respective control point in the distance portion of the base target isoastigmatism line 12 and the additional target isoastigmatism line 14) can be calculated by averaging from the two control points $(u_1, y_1)$ and $(u_2, y_2)$ of the arctangent representation of the base target isoastigmatism line or the additional target isoastigmatism line of the starting design:

$$u_P = \frac{u_1 + u_2}{2} \text{ and } y_P = \frac{y_1 + y_2}{2}.$$

Switching from the arctangent representation to the polynomial representation can be automatically depending on the weighting of the distance portion $g_F$. For example, the 0.5 D base target isoastigmatism line and the additional target isoastigmatism line can be switched to polynomial representation from $g_F$=81% and $g_F$=91%, respectively.

In the third design modification, the weighting of the distance portion is $g_F$=100% and the weighting of the near portion $g_N$=20%. The weighting of the dynamics $g_D$ is 0%. The shift of the control points is calculated automatically on the basis of the new weightings $g_F$ and $g_N$. The course of the base target isoastigmatism line 12 and of the additional target isoastigmatism line 14 is changed such that they pass through the correspondingly shifted control points. Subsequently, a target astigmatism distribution, which exhibits the changed base and additional target isoastigmatism lines, is determined by interpolation, which is shown in FIG. 23b. Optionally, the thus calculated target astigmatism distribution can be modified further e.g. by multiplication by a scaling factor, an adaptation of the maximally admissible astigmatism value, or a further modification.

Figure 23C:
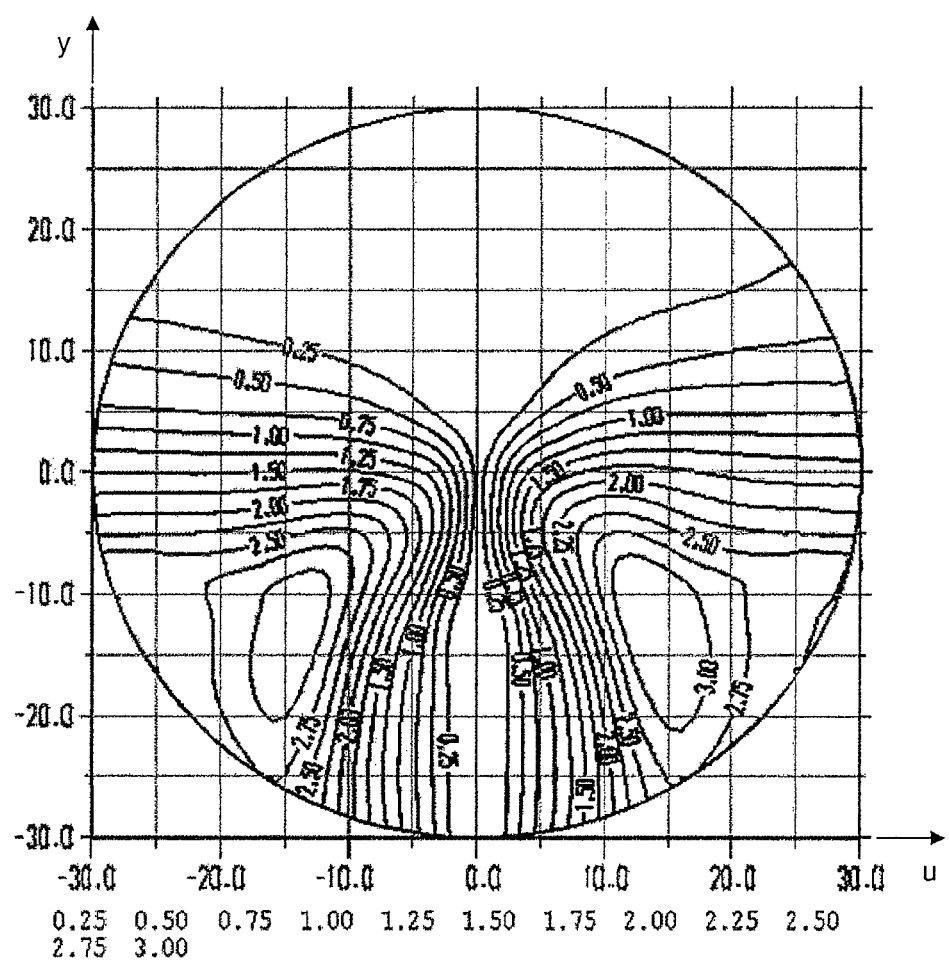
FIG. 23c illustrates an actual astigmatism distribution (in the position of wear) of a spectacle lens optimized according to the target astigmatism distribution illustrated in FIG. 23b.

FIG. 23c shows the actual astigmatism distribution (in the position of wear) of a spectacle lens optimized according to the target astigmatism distribution illustrated in FIG. 23b.

With the third modification of the starting design, maximum emphasis can be put on the distance portion automatically.

Fourth Modification of the Starting Design

FIG. 24 shows an example of a graphical user interface 76 for inputting and changing the positions of the control points with input parameters of a third transformed design, which is calculated automatically by a modification of the starting design shown in FIG. 16.

Figure 25A:
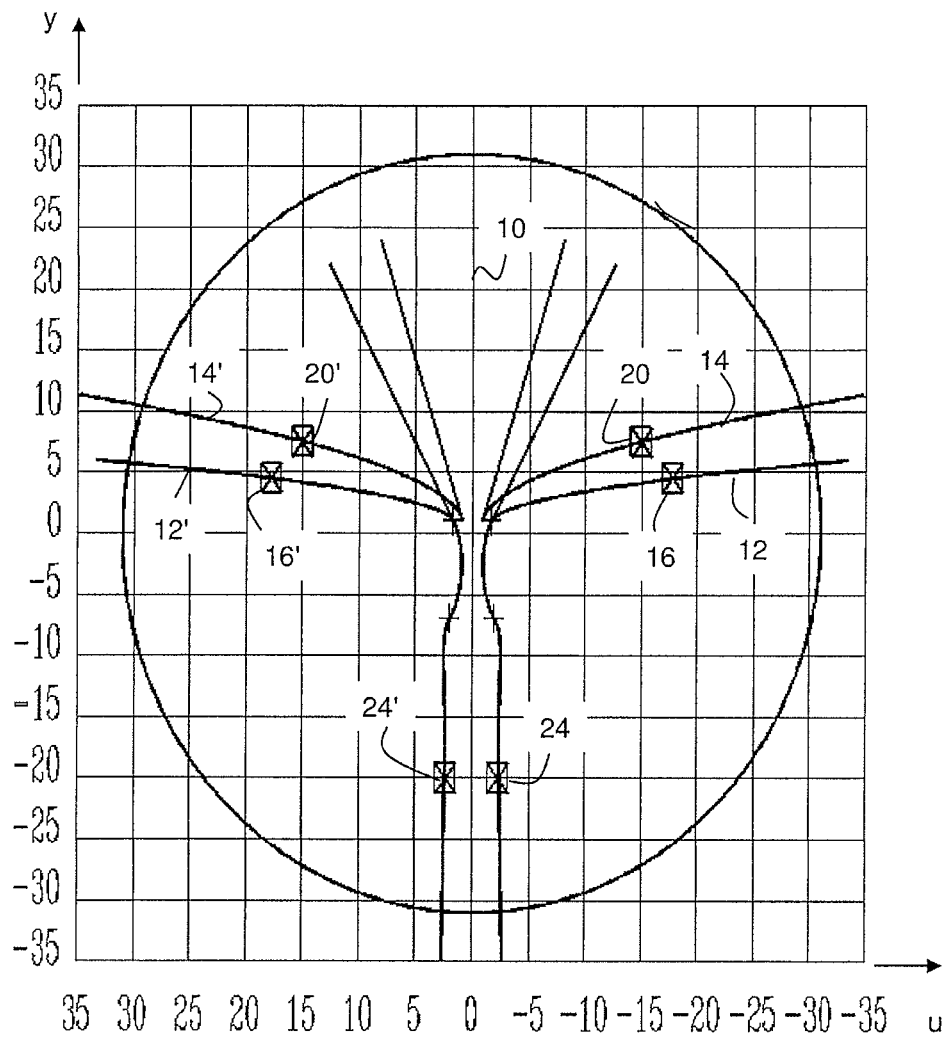
FIG. 25a illustrates construction lines and control points of the fourth transformed design.
Figure 25B:
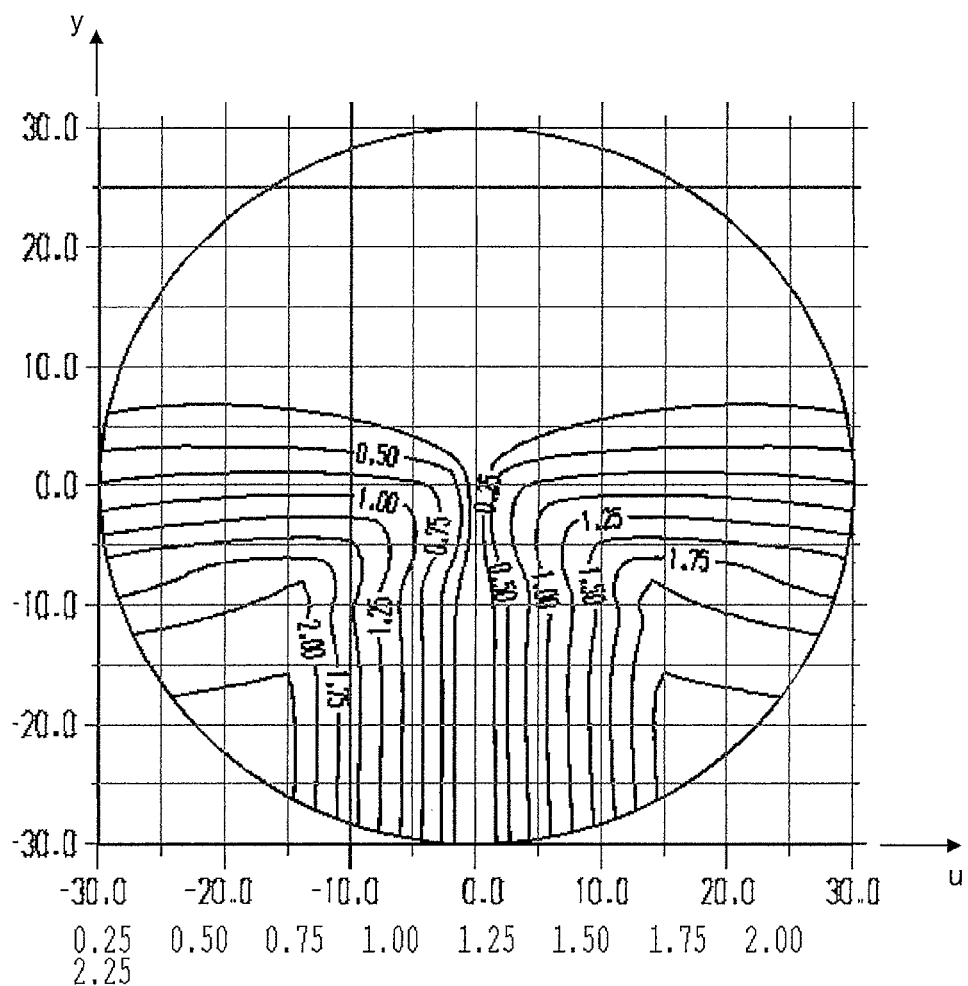

FIGS. 25a and 25b show the transformed starting design according to the fourth modification, wherein FIG. 25a shows the construction lines—principal line 10, base target isoastigmatism line 12, and additional target isoastigmatism line 14—and the corresponding control points; FIG. 25b shows the corresponding target astigmatism distribution of the transformed design illustrated in FIG. 25a. Like with the third modification, one also switches from the arctangent representation to the polynomial representation for the representation of the base target isoastigmatism line 12 and the additional target isoastigmatism line 14 in this fourth modification.

In the fourth design modification, the weighting of the distance portion is $g_F$=100% and the weighting of the near portion $g_N$=20%. The weighting of the dynamics $g_D$ is 80%. The shift of the control points is calculated automatically on the basis of the new weightings $g_F$ and $g_N$.

The course of the base target isoastigmatism line 12 and of the additional target isoastigmatism line 14 is changed such that they pass through the correspondingly shifted control points. Subsequently, a target astigmatism distribution, which exhibits the changed base and additional target isoastigmatism lines, is determined by interpolation.

The thus determined target astigmatism distribution is multiplied by a global scaling factor s(u,y) to take the weighting dynamics into account:

$$A'(u,y) = A_{Snew}(u,y) = s(u,y) A_{target}(u,y),$$

wherein $A_{target}(u,y)$ is the previously determined target astigmatism distribution.

The multiplication by the global scaling factor s(u,y) has been described in detail above. In particular, the scaling factor can be calculated as follows:

$$s(u,y) = f_0\left(1 + \frac{f_2(y) - 1}{u_2 - u_1}(u - u_1)\right)$$

$$f_2(y) = b + \frac{a}{(1 + e^{c(y+d)})^m},$$

wherein for example $u_1$=0, $u_2$=25, $f_0$=1, b=1, a=−0.4, c=−0.3, d=10 and m=1.

A simple connection between smooth peripheral transitions and the parameter weighting dynamics $g_D$ can e.g. be established by varying the coefficient a (the difference of the two asymptotes) depending on $g_D$. For example, the coefficient a can be calculated as follows:

$$a = \frac{g_D a_{max}}{100} = \frac{80 * (-0,5)}{100} = -0,4.$$

The remaining coefficients can be suitably defined or specified.

The maximally admissible value $a_{max}$ for the weighting dynamics $g_D$=100% can be specified in a design-specific way, just like the other coefficients. For $g_D$=0, a=0 and when b=1, then s(u,y)=constant=1 holds.

Figure 25C:
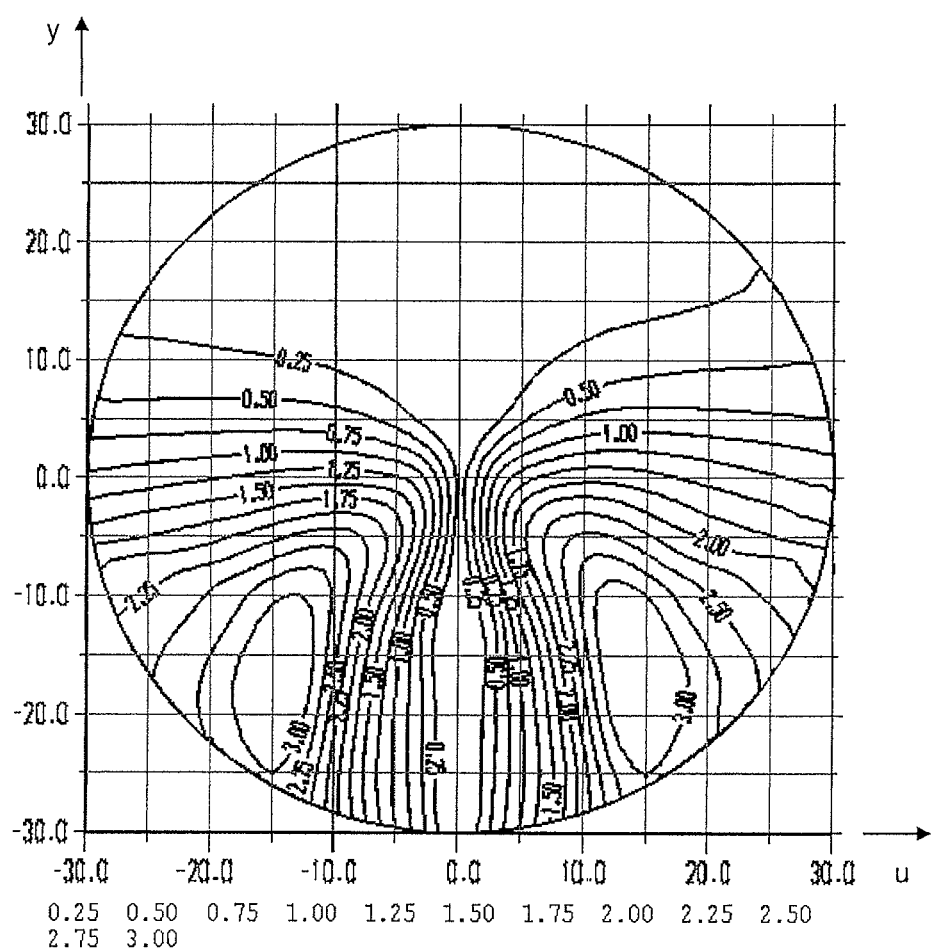
FIG. 25c illustrates an actual astigmatism distribution (in the position of wear) of a spectacle lens optimized according to the target astigmatism distribution illustrated in FIG. 25b.

The resulting target astigmatism distribution is shown in FIG. 25b. FIG. 25c shows the actual astigmatism distribution (in the position of wear) of a spectacle lens optimized according to the target astigmatism distribution illustrated in FIG. 25b.

With the fourth modification of the starting design, maximum emphasis can be put on the distance portion automatically. The additional consideration of the weighting dynamics $g_D$ ($g_D$=90%) allows an additional reduction of the peripheral astigmatism and the peripheral astigmatism gradients. Thus, a design for a progressive spectacle lens, which is better suited for dynamic activities (e.g. sports), can be calculated automatically.

Figure 26:
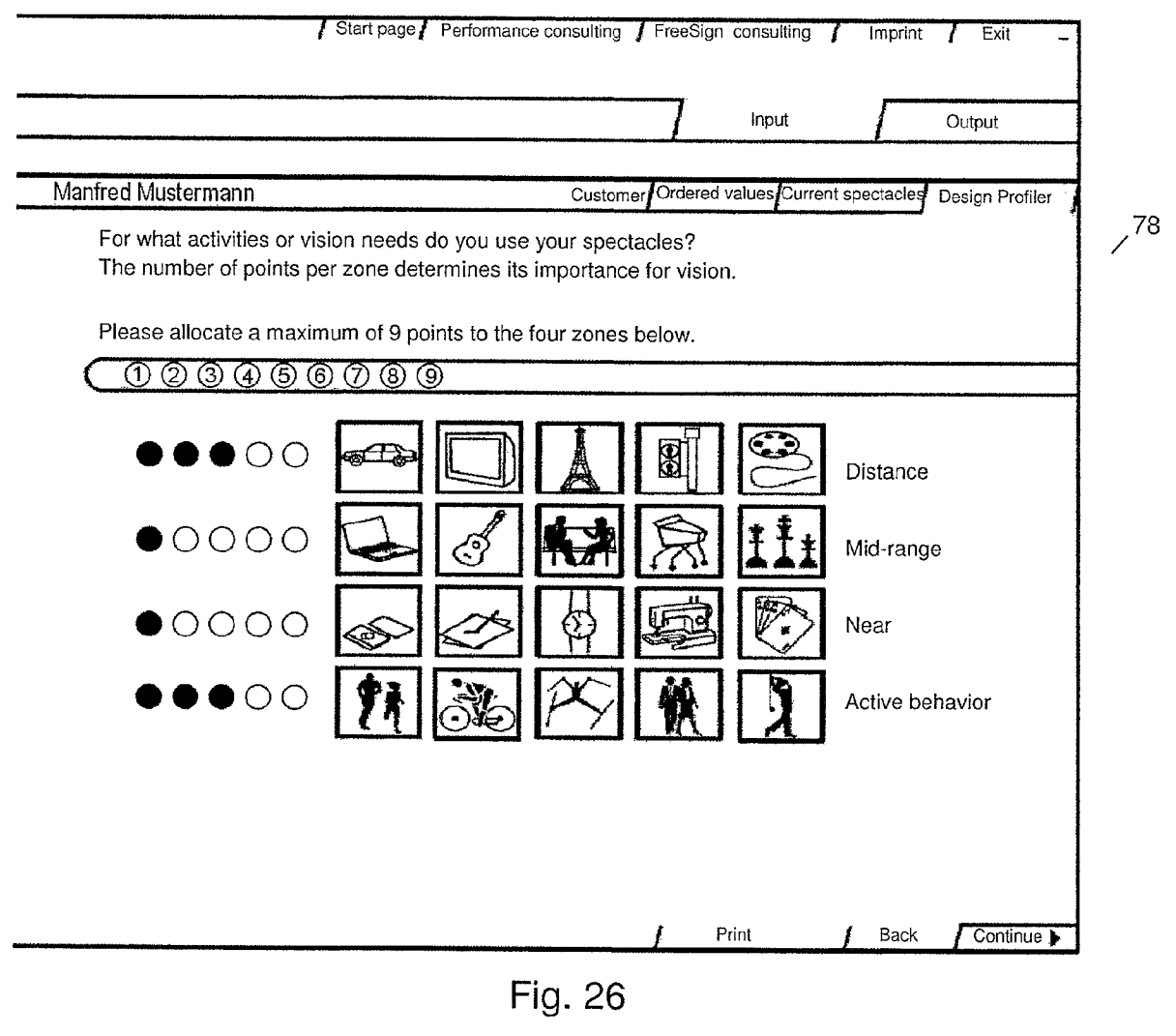

FIG. 26 shows an example of a graphical user interface 78 for obtaining customer preferences. The weightings of the distance and near zones as well as the weighting dynamics can be determined on the basis of the obtained customer preferences and information on the active behavior as well as optionally further individual data of the spectacle wearer.

Five different pictograms for distance, medium range, and near, as well as for the active behavior of the spectacle wearer symbolize the ranges the spectacle wearer is to weigh against each other when selecting his design profile. The pictograms serve as an example of the respective distance ranges and represent only a minor selection of all possible activities for these distances. The ranges can be weighed with the points to be allocated. In a concrete example, 9 points in total can be allocated to four different ranges (distance, mid-range, near, and active behavior). The more important the respective distance range is to the customer or the more his activity falls into a range, the more points are allocated to this range. The number of points per range and the total number of points can be restricted. For example, a maximum of 5 points can be allocated per range, in total not more than 9 though.

The allocated points determine the individual design profile of the spectacle wearer. In simple terms: The more points are allocated for the distance in relation to the predetermined total number of points, the greater is the weighting of the respective viewing zone. The points for the active behavior and mid-range vision mainly affect the length of the progression zone and thus also determine how distortion-free the spectacle lens is. The points for the active behavior can in particular correlate with the weighting dynamics. In the allocation of the points, the same number of points in each range corresponds to a balanced, universal design.

Figure 27:
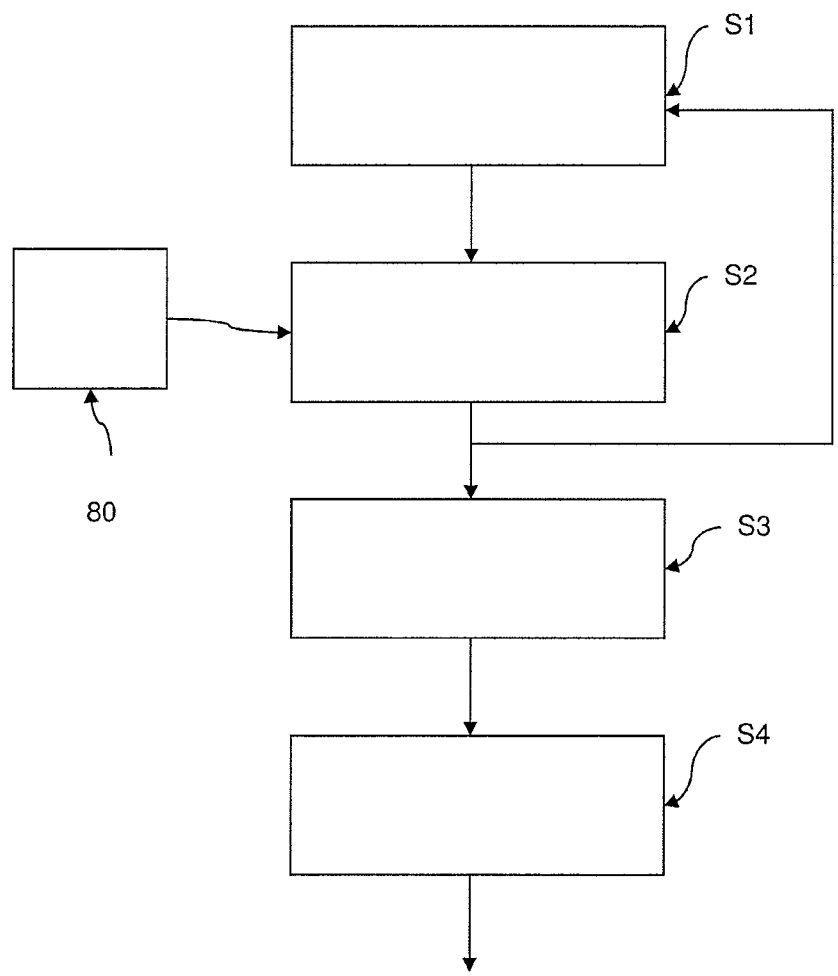
FIG. 27 illustrates an exemplary process flow according to an exemplary embodiment.

FIG. 27 schematically shows an exemplary process flow for the production of (an individually optimized) progressive spectacle lens on the basis of a determined progressive lens design calculated according to a preferred method.

In a first step (S1), (individual) design-specific and/or spectacle lens-specific data is detected. The design-specific and/or spectacle lens-specific data can be obtained by suitable graphical user interfaces (GUI), which allow the input and optionally the change of the input data.

The spectacle lens-specific data in particular comprises refraction data (sphere, cylinder, cylinder axis, addition, prism, and base), frame and centration data (vertical lens size and centering height, frame shape), and/or parameters of the situation of wear or position of wear of the spectacles (in particular pupillary distance, corneal vertex distance, forward inclination, face form angle, etc.). The design-specific data can in particular comprise data relating to the main use or data relating to the main focuses of use (driving, computer workplace, reading, craftwork, etc.) of the progressive lens; and/or data relating to the preferences with respect to the viewing zones (distance, near, and intermediate or progression zone(s)). On the basis of the obtained individual preferences and/or focuses of use, corresponding weightings (weighting distance, weighting near, weighting intermediate zone, weighting dynamics) can be allocated to the individual viewing zones.

Moreover, the design-specific data can comprise data relating to the object distances, such as working distance when reading (near work), working distance in the distance and/or data relating to the accommodation model.

The design and spectacle lens-specific data are obtained and assessed, and they control the determination of the optimum course of the base target isoastigmatism line or the optimum size of the viewing zones and preferably the optimum spatial position of the reference points distance and near.

In a second step (S2), a course of the base target isoastigmatism line, which is best for a specific spectacle wearer in a specific situation of wear, and thus the optimum size and/or position of the viewing zones (distance, near and progression zones) as well as optionally an optimum spatial position of the distance and/or near reference point(s) is/are calculated or defined on the basis of the obtained individual data. This can be done manually or preferably automatically on the basis of the obtained individual data.

In a further step (S3), a progressive lens design or a proposal for a progressive lens design is calculated with the optimum course of the base target isoastigmatism line determined in step S2 and preferably with the determined optimum positions of the distance and near reference points according to a preferred method by a transformation of a specified starting design 80. This design proposal is visualized by suitable graphical user interfaces, wherein the user is given the chance to actively modify the design by changing the course of the base target isoastigmatism line (e.g. by shifting the control points) and optionally the individual position of the distance and/or near reference point(s) and/or by changing the design and spectacle lens-specific data, in particular the preferences, the frame date, the weightings, etc.

The course of the base target isoastigmatism line and optionally the position of the distance and/or near reference point(s) and/or the preferences with respect to the viewing zones can be changed or adapted by a suitable interactive graphical user interface, for example.

The new spectacle lens design is preferably calculated and visualized in real time. Likewise, the difference or the modification of the optical properties of the new one with respect to the starting design can be visualized.

In addition, the corresponding geometric data of a spectacle lens (center thickness, edge thickness, base curve, weight), calculated on the basis of the calculated (individual) design or design proposal, can be calculated and be visualized as well by a suitable graphical user interface (preferably in the form of a three-dimensional module). In particular, cosmetic properties or data relating to the aesthetics of the spectacle lens (e.g. weight, geometric data, such as fabrication height, maximum edge thickness, center thickness, etc.) can be visualized. The visualization of the cosmetic properties of the spectacle lens can for example be achieved by a three-dimensional graphical representation of a model of the spectacle lens with the determined geometric data. The representation of the cosmetic properties of the spectacle lens can be influenced by a selection of the base curve and the refractive index, for example. The selection may depend on the power.

In addition to the visualization of the geometric and/or cosmetic properties of the spectacle lens, a visualization of the optical properties of the spectacle lens (viewing zones, in particular spatial position and size of the individual viewing zones, course of the base target isoastigmatism line, etc.) can be performed. The representation of the sizes of the viewing zones can merely take place relative to the prescription data without taking a possible material dependence into account. Of course, consideration of a material dependence can be provided for.

In addition, a visualization of the viewing comfort (e.g. infraduction, rocking, peripheral vision, distortions, etc.) can be provided for.

In addition, a suitable representation of performance values relating to the viewing zones, the viewing comfort and/or the cosmetic properties or the aesthetics of the calculated spectacle lens can be provided for. Moreover, alternative design proposals and/or performance values of alternative design proposals can be presented as well.

Subsequently (step S4), an individual progressive spectacle lens is calculated or optimized on the basis of a final individual design, wherein (individual) data relating to the spectacle wearer (such as individual situation of wear, frame data, data relating to the eyes of the spectacle wearer, etc.) can be taken into account as well in the calculation or optimization of the spectacle lens. The final calculated or optimized spectacle lens can be produced by direct machining with numerically controlled machines, by a casting method, or by other suitable methods e.g. from glass or plastics (step S5).

Figure 28:
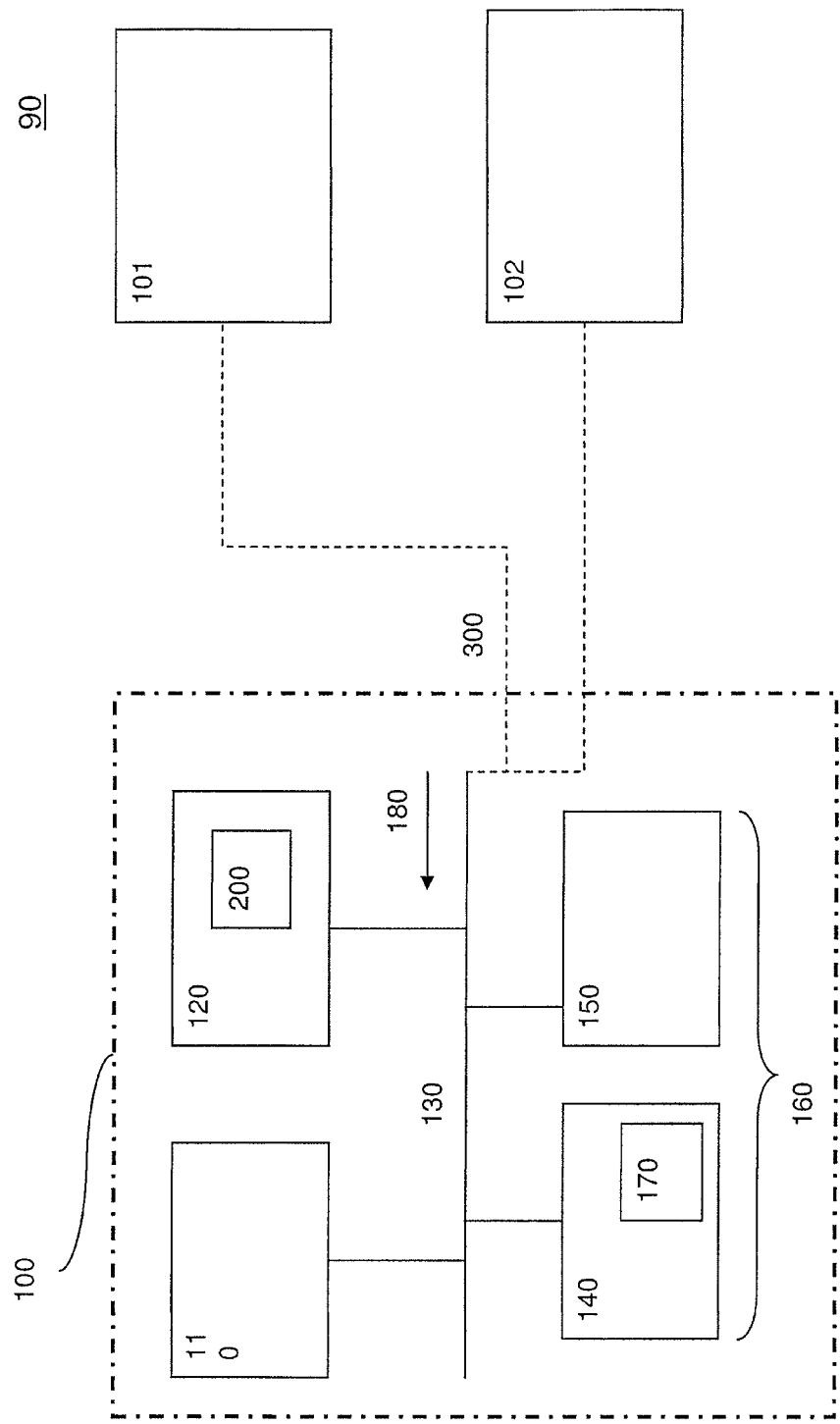
FIG. 28 illustrates a schematic representation of an exemplary apparatus for creating or calculating a progressive spectacle lens design or a design for a progressive spectacle lens, as well as optionally for calculating or optimizing the spectacle lens on the basis of the calculated design.

FIG. 28 shows a schematic representation of an example of an apparatus for creating or calculating a progressive spectacle lens design or a design for a progressive spectacle lens, as well as optionally for calculating or optimizing the spectacle lens on the basis of the calculated design.

The preferred apparatus comprises a computer system 90 with at least a first computer 100. Optionally, however, the computer system 70 can comprise a plurality of computers 10q, q=1, 2, . . . , which are connected to each other 300 by a (mono, bi and/or multi-directional) network.

The computer 100 has a processor 110, a memory 120, and a bus 130. Moreover, the computer 100 can comprise an input device 140 and/or an output device 150. The elements 110 to 170 of the computer 100 generalize the corresponding elements of the computers 101, 102, etc. For example, the computer 100 is a conventional personal computer (PC), a multi-processor computer, a mainframe computer, a portable PC (laptop), or a stationary PC, or the like.

The processor 110 of the computer 100 is a central processor (CPU), a microcontroller (MCU), or a digital signal processor (DSP), for example.

The memory 120 symbolizes elements storing data and commands either in a temporally limited or permanent fashion. Even though the memory 120 is shown as part of the computer 100 for the sake of better understanding, the storage function can be implemented elsewhere, e.g. in the processor itself (e.g. cache, register) and/or also in the network 300, for example in the computers 101/102. The memory 120 may be a Read-Only Memory (ROM), a Random-Access Memory (RAM), a programmable or non-programmable PROM, or a memory with other access options. The memory 120 can physically be implemented or stored on a computer-readable program carrier, for example on:

(a) a magnetic carrier (hard disk, floppy disk, magnetic tape);
(b) an optical carrier (CD-ROM, DVD);
(c) a semiconductor carrier (DRAM, SRAM, EPROM, EEPROM).

Optionally, the memory 120 can be distributed across different media. Parts of the memory 120 can be attached in a fixed or exchangeable manner. The computer 100 uses known means, such as floppy-disk drives, for reading and writing.

The memory 120 can store support components, such as a Bios (Basic Input Output System), an operating system (OS), a program library, a compiler, an interpreter and/or a spreadsheet or word processing program. These components are not illustrated for the sake of better understanding. Support components are commercially available and can be installed or implemented on the computer 100 by experts.

Furthermore, the memory 120 can store a starting or basic design and design or spectacle lens-specific parameters and/or framework conditions.

The processor 110, the memory 120, the input and output devices are connected via at least one bus 130 and/or are optionally coupled via the (mono, bi, or multi-directional) network 300 (e.g. the Internet) or are in communication with each other. The bus 130 and the network 300 represent logical and/or physical connections, which transmit both commands and data signals. The signals within the computer 100 are mainly electrical signals, whereas the signals in the network are electrical, magnetic and/or optical signals or also wireless radio signals.

Network environments (such as the network 300) are common in offices, company-wide computer networks, Intranets, and on the Internet (i.e. World Wide Web). The physical distance between the computers in the network does not have any significance. The network 300 may be a wireless or wired network. Possible examples for implementations of the network 300 are: a Local Area Network (LAN), a Wireless Local Area Network (WLAN), a Wide Area Network (WAN), an ISDN network, an infrared link (IR), a radio link, such as the Universal Mobile Telecommunication System (UMTS), or a satellite link. Transmission protocols and data formats are known. Examples are: TCP/IP (Transmission Control Protocol/Internet Protocol), HTTP (Hypertext Transfer Protocol), URL (Unique Resource Locator), HTML (Hypertext Markup Language), XML (Extensible Markup Language), WML (Wireless Application Markup Language), Wireless Application Protocol (WAP), etc.

The input and output devices may be part of a user interface 160.

The input device 140 is a device that provides data and instructions to be processed by the computer 100. For example, the input device 140 is a keyboard, a pointing device (mouse, trackball, cursor arrows), microphone, joystick, scanner. Even though the examples are all devices with human interaction, preferably via a graphical user interface, the device 140 can also do without human interaction, such as a wireless receiver (e.g. by a satellite or terrestrial antenna), or a sensor (e.g. a thermometer). The input device 140 can be used for reading the storage medium or carrier 170.

The output device 150 designates a device displaying instructions and data that have already been processed. Examples are a monitor or a different display (cathode ray tube, flat screen, liquid crystal display, loudspeakers, printer, etc.). Similar to the input device 140, the output device 150 preferably communicates with the user, preferably via a graphical user interface. The output device may also communicate with other computers 101, 102, etc.

Moreover, a computer program product 200 is provided, which is adapted—when loaded and executed on a computer—to perform a method for creating or calculating a progressive spectacle lens design or a design for a progressive spectacle lens as well as optionally for calculating or optimizing the spectacle lens on the basis of the calculated design.

The computer program product 200 can be stored on a physical storage medium or program carrier 210 or be provided as a program signal.

The computer program product 200 comprises program instructions and optionally data causing the processor 110, among others, to perform the exemplary method disclosed herein and/or preferred embodiments thereof. In other words, the computer program 200 defines the function of the computer 100 and its interaction with the network system 300. For example, the computer program product 200 can be provided as a source code in an arbitrary programming language and/or as a binary code in a compiled form (i.e. machine-readable form). A skilled person is able to use the computer program product 200 in connection with any of the above-explained support components (e.g. compiler, interpreter, operating system).

Even though the computer program product 200 is shown as being stored in the memory 120, the computer program product 100 may as well be stored elsewhere. The computer program product 200 can also be stored on the storage medium or program carrier 170. Likewise, the starting or basic design and/or design and/or spectacle lens-specific parameter and/or framework conditions must not be stored in the memory 120, but elsewhere as desired, e.g. on the storage medium 170.

The storage medium 170 is exemplarily shown to be external to the computer 100. In order to transfer the computer program product 200 to the computer 100, the storage medium 170 can be inserted into the input device 140. The storage medium 170 can be implemented as an arbitrary computer-readably carrier, for example as one of the above-explained media (cf. memory 120). The program signal 180, which is preferably transferred to the computer 100 via the network 300, can also include the computer program product 200 or be a part of it.

Interfaces for coupling the individual components of the computer system 10 are also known. The interfaces are not shown for the sake of simplification. An interface can e.g. have a serial interface, a parallel interface, a gameport, a universal serial bus (USB), an internal or external modem, a graphics adapter and/or a soundcard.

Furthermore, the apparatus for creating or calculating a progressive spectacle lens design or a design for a progressive spectacle lens as well as optionally for calculating or optimizing the spectacle lens on the basis of the calculated design can comprise machining means for finishing the spectacle lens. The machining means can comprise e.g. CNC machines for direct machining of a blank according to the determined data of the spectacle lens.

It should be understood that while the foregoing has been described in conjunction with exemplary embodiments, it is understood that the term "exemplary" is merely meant as an example, rather than the best or optimal. Accordingly, the disclosure herein is intended to cover alternatives, modifications and equivalents, which may be included within the spirit and scope of the disclosed apparatus and method.

Additionally, in the preceding detailed description, numerous specific details have been set forth in order to provide a thorough understanding of the present disclosure. However, it should be apparent to one of ordinary skill in the art that the embodiments described herein may be practiced without these specific details. In other instances, well-known methods, procedures, components, and circuits have not been described in detail so as not to unnecessarily obscure aspects of the disclosure herein.

LIST OF REFERENCE NUMERALS

10 principal line
12 nasal base target isoastigmatism line
14 nasal additional target isoastigmatism line
16 first control point of the nasal base target isoastigmatism line in the distance zone
18 second control point of the nasal base target isoastigmatism line in the distance zone
20 first control point of the additional nasal target isoastigmatism line in the distance zone
22 second control point of the additional nasal target isoastigmatism line in the distance zone
24 first control point of the base target isoastigmatism line in the near zone
26 to 34 straight lines along which the respective control point can move
36 graphical user interface
38 to 46 sections of the graphical user interface 36
48 graphical user interface for inputting or presenting the local weightings
50 to 54 sections of the graphical user interface 48
56, 58 graphical user interfaces for inputting the parameters of the base target isoastigmatism line
60 section of the graphical user interface 58
62, 64 straight lines
66 to 76 graphical user interfaces for inputting and changing the control points
78 graphical user interface for obtaining customer preferences
80 starting design
90 computer system
100, 10*q* computer
110 processor
120 memory
130 bus
140 input device
150 output device
160 user interface
170 storage medium or carrier
180 program signal
200 computer program product
300 network

The invention claimed is:

1. A method for creating a progressive spectacle lens design comprising:
    defining a starting design that comprises specifications for the course of a principal line and specification of at least one base target isoastigmatism line with a constant base target astigmatism, wherein the base target isoastigmatism line passes through at least a first predetermined control point $\vec{r}_1=(u_1,y_1)$, the at least one base target isoastigmatism line includes a base target isoastigmatism line on the nasal side of the spectacle lens and a base target isoastigmatism line on the temporal side of the spectacle lens, each of the base target isoastigmatism lines passing through its corresponding first control point, each course of base target isoastigmatism line being transformed such that is passes through the respective shifted first control point in the step of modifying the course of the basr target isoastigmatism line;
    shifting the first contril point $\vec{r}_1=(u_1,y_1)$ along a predetermined or predeterminable curve, taking into account at least one of design and spectacle lens wearer-specific data;
    modifying the course of the base target isoastigmatism line such that it passes through the shifted first control point $\vec{r}_1(u'_1,y'_1)$;

calculating a target astigmatism distribution A(u,y), which exhibits the modified base target isoastigmatism line, wherein:

x designates the horizontal coordinate, y designates the vertical coordinate, and u designates the horizontal distance of a point (x,y) from the principal line, and wherein the target astigmatism in the base target isoastigmatism line has a value which is between 0.125 and 1.0 diopteers.

2. The method according to claim 1, wherein at least one of the design and the spectacle lens wearer-specific data comprises data relating to at least one of the weighting of the distance and near zones, the focuses of use of the spectacle lens and frame and centration data.

3. The method according to claim 1, wherein the curve along which the at least one control point $\vec{r}_1=(u_1,y_1)$ is shifted is a straight line, such that $$\vec{r}'_1 = \vec{r}_1 + t\vec{v}_{a,i}, \text{ wherein}$$

$\vec{v}_a$ designates the outward direction vector of the straight line, $\vec{v}_i$ designates the inward direction vector of the straight line, and t designates the shift along the straight line with the direction vector $\vec{v}_{a,i}$.

4. The method according to claim 3, wherein the parameter t is calculated by the formula:

$$t = mt_{a,i} = \left(\frac{g_{F,N}}{50} - 1\right)t_{a,i},$$

wherein $0 \leq g_{F,N} \leq 100$, for Error! Objects cannot be created from editing field codes. $\vec{r}'_1 = \vec{r}_1 + mt_a\vec{v}_a$, and for $0 \leq g_{F,N} < 50$ $\vec{r}'_1 = \vec{r}_1 + mt_i\vec{v}_i$, and wherein $g_F$ designates the weighting of the distance zone in percent, $g_N$ designates the weighting of the near zone in percent, $t_a$ designates the maximally admissible outward shift, and $t_i$ designates the maximally admissible inward shift.

5. The method according to claim 4, further comprising adapting the maximum target astigmatism value $A_{max}$ depending on at least one of the weighting of the distance and one or more of the near zones.

6. The method according to claim 5, wherein the adapted maximum target astigmatism value $A'_{max}=n(g_F,g_N)A_{max}$, wherein $$n(g_F, g_N) = 1 + \frac{p_{Astmax}}{100}\frac{(g_F + g_N - 100)}{100}$$

is a scaling factor, $g_F$ is the weighting of the distance zone in percent and $0 \leq g_F \leq 100$, $g_N$ is the weighting of the near zone in percent and $0 \leq g_N \leq 100$, and $p_{Ast\ max}$ is the maximally admissible adaptation in percent and $0 \leq p_{Ast\ max} \leq 50$.

7. The method according to claim 4, wherein the weighting of the distance zone $g_F$ and the weighting of the near zone $g_N$ are defined depending on at least one of the customer preferences and frame data.

8. The method according to claim 1, wherein the target astigmatism values A(u,y=const) in the points of each horizontal section for which the conditions $u \geq u_1$ or $u \leq -u_1$ are met, are multiplied by a scaling factor s(u,y).

9. The method according to claim 8, wherein $f_2(y)$ is a double-asymptote function with parameters a,b,c,d,m, wherein $$f_2(y) = b + \frac{a}{(1 + e^{c(y+d)})^m}$$

holds, and $$s(u, y) = f_0\left(1 + \frac{f_2(y) - 1}{u_2 - u_1}(u - u_1)\right),$$

wherein $|u_2| > |u_1|$.

10. The method according to claim 1, wherein the course of the base target isoastigmatism line is defined by a one-dimensional function $u_G(y)$ and the course of the modified base target isoastigmatism line is defined by a one-dimensional function $u'_G(y)$, and wherein the base target isoastigmatism line passes through at least one pivotal or fixed point $\vec{r}_0=(u_0,y_0)$, wherein $$u_G(y_0) = u'_G(y_0)$$

$$\frac{du_G(y_0)}{dy} = \frac{du'_G(y_0)}{dy}.$$

11. The method according to claim 1, wherein the starting design comprises specifications for the target astigmatism values $A_0(u=0,y)$ on the principal line, and wherein the calculation of a target astigmatism distribution A(u,y) comprises an interpolation between the target astigmatism values A(u=0,y) on the principal line and the target astigmatism values on the modified base target isoastigmatism line, such that $A(u=0,y)=A_0(u=0,y)$.

12. The method according to claim 1, wherein the interpolation is a linear, quadrangular, or cubic interpolation.

13. The method according to claim 1, further comprising obtaining individual parameters of the spectacle wearer.

14. An apparatus for creating a progressive spectacle lens design by transforming a predetermined starting design that includes specifications for the course of a principal line and specifications for the course of at least one base target isoastigmatism line with a constant base target astigmatism, wherein the base target isoastigmatism line passes through at least a first predetermined control point $\vec{r}_1=(u_1,y_1)$, the at least one base target isoastigmatism line includes a base target isoastigmatism line on the nasal side of the spectacle lens and a base target isoastigmatism line in the temporal side of the spectacle lens, each of the base target isoatigmatism lines passing through its corresponding first control point, each course of base target isoatigmatism line being trasformed such that it passes through the repective shifted first control point in the step of modifying the course of the base target isoatigmatism line, the apparatus comprising:

a control point changing unit configured to perform a shift of the position of the first control point $\vec{r}_1=(u_1,y_1)$ along a predetermined or predeterminable curve, taking into account at least one of design and spectacle lens wearer-specific data;

a base target isoastigmatism line calculating unit configured to calculate a modified base target isoastigmatism line such that it passes through the shifted first control point $\vec{r}'_1(u'_1,y'_1)$; and a calculating unit configured to calculate a target astigmatism distribution A(u,y), which exhibits the modified base target isoastigmatism line, wherein:

x designates the horizontal coordinate, y designates the vertical coordinate, and u designates the horizontal distance of a point (x,y) from the principal line, and wherein the target astigmatism in the base target isoatigmatism line has a value which is between 0.125 and 1.0 diopters.

15. A non-transitory computer program product for calculating a progressive spectacle lens design, which when loaded on a computer and executed by a processor of the computer, causes the processor to:

define a starting design that comprises specifications for the course of a principal line and specification of at least one base target isoastigmatism line with a constant base target astigmatism, wherein the base target isoastigmatism line passes through at least a first predetermined control point $\vec{r}_1=(u_1,y_1)$; the at least one base target isoastigmatism line includes a base target isoastigmatism line on the nasal side of the spectacle lens and a base target isoastigmatism line on the temporal side of the spectacle lens, each of the base target isoastigmatism lines passing through its corresponding first control point, each course of base target isoastigmatism line being transformed such t it passes through the respective shifted first control point in the step of modifying the course of the base target isoastigmatism line;

shift the first control point $\vec{r}_1=(u_1,y_1)$ along a predetermined or predeterminable curve, taking into account at least one of design and spectacle lens wearer-specific data;

modify the course of the base target isoastigmatism line such that it passes through the shifted first control point $\vec{r}'_1(u'_1,y'_1)$; and calculate a target astigmatism distribution A(u,y), which exhibits the modified base target isoastigmatism line, wherein:

x designates the horizontal coordinate, y designates the vertical coordinate, and u designates the horizontal distance of a point (x,y) from the principal line, and wherein the target astigmatism on the base target isoastigmatism line has a value which is between 0.125 and 1.0 diopters.

16. A non-transitory storage medium with a computer program stored thereon for calculating a progressive spectacle lens design, which when loaded on a computer and executed by a processor of the computer, causes the processor to:

define a starting design that comprises specifications for the course of a principal line and specification of at least one base target isoastigmatism line with a constant base target astigmatism, wherein the base target isoastigmatism line passes through at least a first predetermined control point $\vec{r}_1=(u_1,y_1)$; the at least one base target isoastigmatism line includes a base target isoastigmatism line on the nasal side of the spectacle lens and a base target isoastigmatism line on the temporal side of the spectacle lens, each of the base target isoastigmatisrm lines passing through its corresponding first control point, each course of base target isoastigmatism line being transformed such that it passes through the respective shifted first control point in the step of modifying the course of the base target isoastigmatism line;

shift the first control point $\vec{r}_1=(u_1,y_1)$ along a predetermined or predeterminable curve, taking into account at least one of design and spectacle lens wearer-specific data;

modify the course of the base target isoastigmatism line such that it passes through the shifted first control point $\vec{r}'_1(u'_1,y'_1)$; and calculate a target astigmatism distribution A(u,y), which exhibits the modified base target isoastigmatism line, wherein:

x designates the horizontal coordinate, y designates the vertical coordinate, and u designates the horizontal distance of a point (x,y) from the principal line, and wherein the target astigmatism in the base target isoastigmatism line has a value which is between 0.125 and 1.0 diopters.

17. The method according to claim 1, wherein the step of calculating the spectacle lens comprises minimizing the target function:

$$F(\vec{x}) = \sum_{i=1}^{m} [g_{i,Ast}(Ast_i - Ast_{i,target})^2 + ...]$$

wherein $Ast_{i,target}$ designates the target value of the local astigmatic deviation or the local astigmatic error at the $i^{th}$ evaluation point, $Ast_i$ designates the actual value of the local astigmatic deviation or the actual local astigmatic error at the $i^{th}$ evaluation point, and $g_{i,Ast}$ designates the local weighting of the astigmatic deviation or the local astigmatic error at the $i^{th}$ evaluation point.

18. The method according to claim 17, wherein $$g_{i,Ast} = \frac{1}{Ast_{i,target}^p}.$$

19. The method according to claim 1, wherein the step of calculating the spectacle lens takes into account individual data of the spectacle wearer.

20. The apparatus according to claim 14, further comprising:

a second calculating unit configured to calculate a spectacle lens on the basis of the calculated design.

21. The non-transitory computer program product of claim 14, which when executed by the processor, further causes the processor to:

calculate a spectacle lens on the basis of the calculated individual design.

22. The non-transitory storage medium with a computer program stored thereon of claim 15, which when executed by the processor, further causes the processor to
calculate a progressive spectacle lens on the basis of the calculated spectacle lens design.

\* \* \* \* \*